United States Patent
Muthaiah et al.

(10) Patent No.: US 10,227,920 B2
(45) Date of Patent: Mar. 12, 2019

(54) GAS TURBINE OXIDANT SEPARATION SYSTEM

(71) Applicants: General Electric Company, Schenectady, NY (US); ExxonMobil Upstream Research Company, Houston, TX (US)

(72) Inventors: Veerappan Muthaiah, Karnataka (IN); Ashok Kumar Anand, Niskayuna, NY (US); Sanyaswara Rao Ganti, Karnataka (IN)

(73) Assignees: General Electric Company, Schenectady, NY (US); ExxonMobil Upstream Research Company, Spring, TX (US)

( * ) Notice: Subject to any disclaimer, the term of this patent is extended or adjusted under 35 U.S.C. 154(b) by 735 days.

(21) Appl. No.: 14/574,053

(22) Filed: Dec. 17, 2014

(65) Prior Publication Data
US 2015/0198089 A1   Jul. 16, 2015

Related U.S. Application Data

(60) Provisional application No. 61/927,822, filed on Jan. 15, 2014.

(51) Int. Cl.
*F02C 3/30* (2006.01)
*F01D 25/30* (2006.01)
(Continued)

(52) U.S. Cl.
CPC .............. *F02C 3/30* (2013.01); *F01D 15/10* (2013.01); *F01D 25/30* (2013.01); *F02C 3/04* (2013.01);
(Continued)

(58) Field of Classification Search
CPC ...... F02C 3/04; F02C 3/30; F02C 3/34; F01D 15/10; F01D 25/30; B01D 2256/12;
(Continued)

(56) References Cited

U.S. PATENT DOCUMENTS 2,488,911 A  11/1949  Hepburn et al.
2,884,758 A   5/1959  Oberle
(Continued)

FOREIGN PATENT DOCUMENTS

CA      2231749      9/1998
CA      2645450      9/2007
(Continued)

OTHER PUBLICATIONS

U.S. Appl. No. 14/771,450, filed Feb. 28, 2013, Valeev et al.
(Continued)

*Primary Examiner* — Phutthiwat Wongwian
*Assistant Examiner* — Loren Edwards
(74) *Attorney, Agent, or Firm* — Fletcher Yoder P.C.

(57) ABSTRACT

In one embodiment, a system includes a gas turbine system, having: a turbine driven by combustion products produced by a turbine combustion system; and a separation unit positioned between turbine stages of the turbine, wherein the separation unit separates oxygen out of the combustion products. The separation unit may include an ion transport membrane.

17 Claims, 10 Drawing Sheets

(51) Int. Cl.
  *F02C 3/04* (2006.01)
  *F02C 3/34* (2006.01)
  *F01D 15/10* (2006.01)
  *C10J 3/00* (2006.01)

(52) U.S. Cl.
  CPC ............ *F02C 3/34* (2013.01); *B01D 2256/12* (2013.01); *C10J 3/00* (2013.01); *C10J 2300/0959* (2013.01); *C10J 2300/1612* (2013.01); *F05D 2220/32* (2013.01); *F05D 2260/61* (2013.01); *Y02E 20/16* (2013.01)

(58) Field of Classification Search
  CPC ........ B01D 2257/104; C10J 2300/0959; F05D 2220/32; F05D 2260/61; Y02E 20/16
  USPC .......................................................... 60/772
  See application file for complete search history.

(56) References Cited

U.S. PATENT DOCUMENTS

| | | |
|---|---|---|
| 3,631,672 A | 1/1972 | Gentile et al. |
| 3,643,430 A | 2/1972 | Emory et al. |
| 3,705,492 A | 12/1972 | Vickers |
| 3,785,145 A * | 1/1974 | Amann ............ F02C 9/16 60/39.24 |
| 3,841,382 A | 10/1974 | Gravis et al. |
| 3,890,088 A * | 6/1975 | Ferri ............ F23D 99/00 431/351 |
| 3,949,548 A | 4/1976 | Lockwood |
| 4,018,046 A | 4/1977 | Hurley |
| 4,043,395 A | 8/1977 | Every et al. |
| 4,050,239 A | 9/1977 | Kappler et al. |
| 4,066,214 A | 1/1978 | Johnson |
| 4,077,206 A | 3/1978 | Ayyagari |
| 4,085,578 A | 4/1978 | Kydd |
| 4,092,095 A | 5/1978 | Straitz |
| 4,101,294 A | 7/1978 | Kimura |
| 4,112,676 A | 9/1978 | DeCorso |
| 4,117,671 A | 10/1978 | Neal et al. |
| 4,160,640 A | 7/1979 | Maev et al. |
| 4,165,609 A | 8/1979 | Rudolph |
| 4,171,349 A | 10/1979 | Cucuiat et al. |
| 4,204,401 A | 5/1980 | Earnest |
| 4,222,240 A | 9/1980 | Castellano |
| 4,224,991 A | 9/1980 | Sowa et al. |
| 4,236,378 A | 12/1980 | Vogt |
| 4,253,301 A | 3/1981 | Vogt |
| 4,271,664 A | 6/1981 | Earnest |
| 4,344,486 A | 8/1982 | Parrish |
| 4,345,426 A | 8/1982 | Egnell et al. |
| 4,352,269 A | 10/1982 | Dineen |
| 4,380,895 A | 4/1983 | Adkins |
| 4,399,652 A | 8/1983 | Cole et al. |
| 4,414,334 A | 11/1983 | Hitzman |
| 4,434,613 A | 3/1984 | Stahl |
| 4,435,153 A | 3/1984 | Hashimoto et al. |
| 4,442,665 A | 4/1984 | Fick et al. |
| 4,445,842 A | 5/1984 | Syska |
| 4,479,484 A | 10/1984 | Davis |
| 4,480,985 A | 11/1984 | Davis |
| 4,488,865 A | 12/1984 | Davis |
| 4,498,288 A | 2/1985 | Vogt |
| 4,498,289 A | 2/1985 | Osgerby |
| 4,528,811 A | 7/1985 | Stahl |
| 4,543,784 A | 10/1985 | Kirker |
| 4,548,034 A | 10/1985 | Maguire |
| 4,561,245 A | 12/1985 | Ball |
| 4,569,310 A | 2/1986 | Davis |
| 4,577,462 A | 3/1986 | Robertson |
| 4,602,614 A | 7/1986 | Percival et al. |
| 4,606,721 A | 8/1986 | Livingston |
| 4,613,299 A | 9/1986 | Backheim |
| 4,637,792 A | 1/1987 | Davis |
| 4,651,712 A | 3/1987 | Davis |
| 4,653,278 A | 3/1987 | Vinson et al. |
| 4,681,678 A | 7/1987 | Leaseburge et al. |
| 4,684,465 A | 8/1987 | Leaseburge et al. |
| 4,753,666 A | 6/1988 | Pastor et al. |
| 4,762,543 A | 8/1988 | Pantermuehl et al. |
| 4,817,387 A | 4/1989 | Lashbrook |
| 4,858,428 A | 8/1989 | Paul |
| 4,895,710 A | 1/1990 | Hartmann et al. |
| 4,898,001 A | 2/1990 | Kuroda et al. |
| 4,946,597 A | 8/1990 | Sury |
| 4,976,100 A | 12/1990 | Lee |
| 5,014,785 A | 5/1991 | Puri et al. |
| 5,044,932 A | 9/1991 | Martin et al. |
| 5,073,105 A | 12/1991 | Martin et al. |
| 5,084,438 A | 1/1992 | Matsubara et al. |
| 5,085,274 A | 2/1992 | Puri et al. |
| 5,098,282 A | 3/1992 | Schwartz et al. |
| 5,123,248 A | 6/1992 | Monty et al. |
| 5,135,387 A | 8/1992 | Martin et al. |
| 5,141,049 A | 8/1992 | Larsen et al. |
| 5,142,866 A | 9/1992 | Yanagihara et al. |
| 5,147,111 A | 9/1992 | Montgomery |
| 5,154,596 A | 10/1992 | Schwartz et al. |
| 5,183,232 A | 2/1993 | Gale |
| 5,195,884 A | 3/1993 | Schwartz et al. |
| 5,197,289 A | 3/1993 | Glevicky et al. |
| 5,238,395 A | 8/1993 | Schwartz et al. |
| 5,255,506 A | 10/1993 | Wilkes et al. |
| 5,265,410 A | 11/1993 | Hisatome |
| 5,271,905 A | 12/1993 | Owen et al. |
| 5,275,552 A | 1/1994 | Schwartz et al. |
| 5,295,350 A | 3/1994 | Child et al. |
| 5,304,362 A | 4/1994 | Madsen |
| 5,325,660 A | 7/1994 | Taniguchi et al. |
| 5,332,036 A | 7/1994 | Shirley et al. |
| 5,344,307 A | 9/1994 | Schwartz et al. |
| 5,345,756 A | 9/1994 | Jahnke et al. |
| 5,355,668 A | 10/1994 | Weil et al. |
| 5,359,847 A | 11/1994 | Pillsbury et al. |
| 5,361,586 A | 11/1994 | McWhirter et al. |
| 5,388,395 A | 2/1995 | Scharpf et al. |
| 5,394,688 A | 3/1995 | Amos |
| 5,402,847 A | 4/1995 | Wilson et al. |
| 5,444,971 A | 8/1995 | Holenberger |
| 5,457,951 A | 10/1995 | Johnson et al. |
| 5,458,481 A | 10/1995 | Surbey et al. |
| 5,468,270 A | 11/1995 | Borszynski |
| 5,490,378 A | 2/1996 | Berger et al. |
| 5,542,840 A | 8/1996 | Surbey et al. |
| 5,566,756 A | 10/1996 | Chaback et al. |
| 5,572,862 A | 11/1996 | Mowill |
| 5,581,998 A | 12/1996 | Craig |
| 5,584,182 A | 12/1996 | Althaus et al. |
| 5,590,518 A | 1/1997 | Janes |
| 5,628,182 A | 5/1997 | Mowill |
| 5,634,329 A | 6/1997 | Andersson et al. |
| 5,638,675 A | 6/1997 | Zysman et al. |
| 5,640,840 A | 6/1997 | Briesch |
| 5,657,631 A | 8/1997 | Androsov |
| 5,680,764 A | 10/1997 | Viteri |
| 5,685,158 A | 11/1997 | Lenahan et al. |
| 5,709,077 A | 1/1998 | Beichel |
| 5,713,206 A | 2/1998 | McWhirter et al. |
| 5,715,673 A | 2/1998 | Beichel |
| 5,724,805 A | 3/1998 | Golomb et al. |
| 5,725,054 A | 3/1998 | Shayegi et al. |
| 5,740,786 A | 4/1998 | Gartner |
| 5,743,079 A | 4/1998 | Walsh et al. |
| 5,765,363 A | 6/1998 | Mowill |
| 5,771,867 A | 6/1998 | Amstutz et al. |
| 5,771,868 A | 6/1998 | Khair |
| 5,819,540 A | 10/1998 | Massarani |
| 5,832,712 A | 11/1998 | Ronning et al. |
| 5,836,164 A | 11/1998 | Tsukahara et al. |
| 5,839,283 A | 11/1998 | Dobbeling |
| 5,850,732 A | 12/1998 | Willis et al. |
| 5,852,925 A * | 12/1998 | Prasad ............ B01D 53/22 60/39.52 |
| 5,894,720 A | 4/1999 | Willis et al. |

(56) References Cited

U.S. PATENT DOCUMENTS

| | | |
|---|---|---|
| 5,901,547 A | 5/1999 | Smith et al. |
| 5,924,275 A | 7/1999 | Cohen et al. |
| 5,930,990 A | 8/1999 | Zachary et al. |
| 5,937,634 A | 8/1999 | Etheridge et al. |
| 5,950,417 A | 9/1999 | Robertson et al. |
| 5,956,937 A | 9/1999 | Beichel |
| 5,968,349 A | 10/1999 | Duyvesteyn et al. |
| 5,974,780 A | 11/1999 | Santos |
| 5,992,388 A | 11/1999 | Seger |
| 6,016,658 A | 1/2000 | Willis et al. |
| 6,032,465 A | 3/2000 | Regnier |
| 6,035,641 A | 3/2000 | Lokhandwala |
| 6,062,026 A | 5/2000 | Woollenweber et al. |
| 6,079,974 A | 6/2000 | Thompson |
| 6,082,093 A | 7/2000 | Greenwood et al. |
| 6,089,855 A | 7/2000 | Becker et al. |
| 6,094,916 A | 8/2000 | Puri et al. |
| 6,101,983 A | 8/2000 | Anand et al. |
| 6,148,602 A | 11/2000 | Demetri |
| 6,170,264 B1 | 1/2001 | Viteri et al. |
| 6,183,241 B1 | 2/2001 | Bohn et al. |
| 6,201,029 B1 | 3/2001 | Waycuilis |
| 6,202,400 B1 | 3/2001 | Utamura et al. |
| 6,202,442 B1 | 3/2001 | Brugerolle |
| 6,202,574 B1 | 3/2001 | Liljedahl et al. |
| 6,209,325 B1 | 4/2001 | Alkabie |
| 6,216,459 B1 | 4/2001 | Daudel et al. |
| 6,216,549 B1 | 4/2001 | Davis et al. |
| 6,230,103 B1 | 5/2001 | DeCorso et al. |
| 6,237,339 B1 | 5/2001 | Åsen et al. |
| 6,247,315 B1 | 6/2001 | Marin et al. |
| 6,247,316 B1 | 6/2001 | Viteri |
| 6,248,794 B1 | 6/2001 | Gieskes |
| 6,253,555 B1 | 7/2001 | Willis |
| 6,256,976 B1 | 7/2001 | Kataoka et al. |
| 6,256,994 B1 | 7/2001 | Dillon, IV |
| 6,263,659 B1 | 7/2001 | Dillon, IV et al. |
| 6,266,954 B1 | 7/2001 | McCallum et al. |
| 6,269,882 B1 | 8/2001 | Wellington et al. |
| 6,276,171 B1 | 8/2001 | Brugerolle |
| 6,282,901 B1 | 9/2001 | Marin et al. |
| 6,283,087 B1 | 9/2001 | Isaksen |
| 6,289,677 B1 | 9/2001 | Prociw et al. |
| 6,293,084 B1 * | 9/2001 | Drnevich ............ B01D 53/22 60/39.17 |
| 6,298,652 B1 | 10/2001 | Mittricker et al. |
| 6,298,654 B1 | 10/2001 | Vermes et al. |
| 6,298,664 B1 | 10/2001 | Åsen et al. |
| 6,301,888 B1 | 10/2001 | Gray |
| 6,301,889 B1 | 10/2001 | Gladden et al. |
| 6,305,929 B1 | 10/2001 | Chung et al. |
| 6,314,721 B1 | 11/2001 | Mathews et al. |
| 6,324,867 B1 | 12/2001 | Fanning et al. |
| 6,332,313 B1 | 12/2001 | Willis et al. |
| 6,345,493 B1 | 2/2002 | Smith et al. |
| 6,360,528 B1 | 3/2002 | Brausch et al. |
| 6,363,709 B2 | 4/2002 | Kataoka et al. |
| 6,367,258 B1 | 4/2002 | Wen et al. |
| 6,370,870 B1 | 4/2002 | Kamijo et al. |
| 6,374,591 B1 | 4/2002 | Johnson et al. |
| 6,374,594 B1 | 4/2002 | Kraft et al. |
| 6,383,461 B1 | 5/2002 | Lang |
| 6,389,814 B2 | 5/2002 | Viteri et al. |
| 6,405,536 B1 | 6/2002 | Ho et al. |
| 6,412,278 B1 | 7/2002 | Matthews |
| 6,412,302 B1 | 7/2002 | Foglietta |
| 6,412,559 B1 | 7/2002 | Gunter et al. |
| 6,418,725 B1 | 7/2002 | Maeda et al. |
| 6,429,020 B1 | 8/2002 | Thornton et al. |
| 6,449,954 B2 | 9/2002 | Bachmann |
| 6,450,256 B2 | 9/2002 | Mones |
| 6,461,147 B1 | 10/2002 | Sonju et al. |
| 6,467,270 B2 | 10/2002 | Mulloy et al. |
| 6,470,682 B2 | 10/2002 | Gray |
| 6,477,859 B2 | 11/2002 | Wong et al. |
| 6,484,503 B1 | 11/2002 | Raz |
| 6,484,507 B1 | 11/2002 | Pradt |
| 6,487,863 B1 | 12/2002 | Chen et al. |
| 6,499,990 B1 | 12/2002 | Zink et al. |
| 6,502,383 B1 | 1/2003 | Janardan et al. |
| 6,505,567 B1 | 1/2003 | Anderson et al. |
| 6,505,683 B2 | 1/2003 | Minkkinen et al. |
| 6,508,209 B1 | 1/2003 | Collier |
| 6,523,349 B2 | 2/2003 | Viteri |
| 6,532,745 B1 | 3/2003 | Neary |
| 6,539,716 B2 | 4/2003 | Finger et al. |
| 6,584,775 B1 | 7/2003 | Schneider et al. |
| 6,598,398 B2 | 7/2003 | Viteri et al. |
| 6,598,399 B2 | 7/2003 | Liebig |
| 6,598,402 B2 | 7/2003 | Kataoka et al. |
| 6,606,861 B2 | 8/2003 | Snyder |
| 6,612,291 B2 | 9/2003 | Sakamoto |
| 6,615,576 B2 | 9/2003 | Sheoran et al. |
| 6,615,589 B2 | 9/2003 | Allam et al. |
| 6,622,470 B2 | 9/2003 | Viteri et al. |
| 6,622,645 B2 | 9/2003 | Havlena |
| 6,637,183 B2 | 10/2003 | Viteri et al. |
| 6,644,041 B1 | 11/2003 | Eyermann |
| 6,655,150 B1 | 12/2003 | Åsen et al. |
| 6,668,541 B2 | 12/2003 | Rice et al. |
| 6,672,863 B2 | 1/2004 | Doebbeling et al. |
| 6,675,579 B1 | 1/2004 | Yang |
| 6,684,643 B2 | 2/2004 | Frutschi |
| 6,694,735 B2 | 2/2004 | Sumser et al. |
| 6,698,412 B2 | 3/2004 | Betta |
| 6,702,570 B2 | 3/2004 | Shah et al. |
| 6,722,436 B2 | 4/2004 | Krill |
| 6,725,665 B2 | 4/2004 | Tuschy et al. |
| 6,731,501 B1 | 5/2004 | Cheng |
| 6,732,531 B2 | 5/2004 | Dickey |
| 6,742,506 B1 | 6/2004 | Grandin |
| 6,743,829 B2 | 6/2004 | Fischer-Calderon et al. |
| 6,745,573 B2 | 6/2004 | Marin et al. |
| 6,745,624 B2 | 6/2004 | Porter et al. |
| 6,748,004 B2 | 6/2004 | Jepson |
| 6,752,620 B2 | 6/2004 | Heier et al. |
| 6,767,527 B1 | 7/2004 | Åsen et al. |
| 6,772,583 B2 | 8/2004 | Bland |
| 6,790,030 B2 | 9/2004 | Fischer et al. |
| 6,805,483 B2 | 10/2004 | Tomlinson et al. |
| 6,810,673 B2 | 11/2004 | Snyder |
| 6,813,889 B2 | 11/2004 | Inoue et al. |
| 6,817,187 B2 | 11/2004 | Yu |
| 6,820,428 B2 | 11/2004 | Wylie |
| 6,821,501 B2 | 11/2004 | Matzakos et al. |
| 6,823,852 B2 | 11/2004 | Collier |
| 6,824,710 B2 | 11/2004 | Viteri et al. |
| 6,826,912 B2 | 12/2004 | Levy et al. |
| 6,826,913 B2 | 12/2004 | Wright |
| 6,838,071 B1 | 1/2005 | Olsvik et al. |
| 6,851,413 B1 | 2/2005 | Tamol |
| 6,868,677 B2 | 3/2005 | Viteri et al. |
| 6,886,334 B2 | 5/2005 | Shirakawa |
| 6,887,069 B1 | 5/2005 | Thornton et al. |
| 6,899,859 B1 | 5/2005 | Olsvik |
| 6,901,760 B2 | 6/2005 | Dittmann et al. |
| 6,904,815 B2 | 6/2005 | Widmer |
| 6,907,737 B2 | 6/2005 | Mittricker et al. |
| 6,910,335 B2 | 6/2005 | Viteri et al. |
| 6,923,915 B2 | 8/2005 | Alford et al. |
| 6,939,130 B2 | 9/2005 | Abbasi et al. |
| 6,945,029 B2 | 9/2005 | Viteri |
| 6,945,052 B2 | 9/2005 | Frutschi et al. |
| 6,945,087 B2 | 9/2005 | Porter et al. |
| 6,945,089 B2 | 9/2005 | Barie et al. |
| 6,946,419 B2 | 9/2005 | Kaefer |
| 6,969,123 B2 | 11/2005 | Vinegar et al. |
| 6,971,242 B2 | 12/2005 | Boardman |
| 6,981,358 B2 | 1/2006 | Bellucci et al. |
| 6,988,549 B1 | 1/2006 | Babcock |
| 6,993,901 B2 | 2/2006 | Shirakawa |
| 6,993,916 B2 | 2/2006 | Johnson et al. |
| 6,994,491 B2 | 2/2006 | Kittle |
| 7,007,487 B2 | 3/2006 | Belokon et al. |

(56) References Cited

U.S. PATENT DOCUMENTS

| | | |
|---|---|---|
| 7,010,921 B2 | 3/2006 | Intile et al. |
| 7,011,154 B2 | 3/2006 | Maher et al. |
| 7,015,271 B2 | 3/2006 | Bice et al. |
| 7,032,388 B2 | 4/2006 | Healy |
| 7,040,400 B2 | 5/2006 | de Rouffignac et al. |
| 7,043,898 B2 | 5/2006 | Rago |
| 7,043,920 B2 | 5/2006 | Viteri et al. |
| 7,045,553 B2 | 5/2006 | Hershkowitz |
| 7,053,128 B2 | 5/2006 | Hershkowitz |
| 7,056,482 B2 | 6/2006 | Hakka et al. |
| 7,059,152 B2 | 6/2006 | Oakey et al. |
| 7,065,953 B1 | 6/2006 | Kopko |
| 7,065,972 B2 | 6/2006 | Zupanc et al. |
| 7,074,033 B2 | 7/2006 | Neary |
| 7,077,199 B2 | 7/2006 | Vinegar et al. |
| 7,089,743 B2 | 8/2006 | Frutschi et al. |
| 7,096,942 B1 | 8/2006 | de Rouffignac et al. |
| 7,097,925 B2 | 8/2006 | Keefer |
| 7,104,319 B2 | 9/2006 | Vinegar et al. |
| 7,104,784 B1 | 9/2006 | Hasegawa et al. |
| 7,124,589 B2 | 10/2006 | Neary |
| 7,137,256 B1 | 11/2006 | Stuttaford et al. |
| 7,137,623 B2 | 11/2006 | Mockry et al. |
| 7,143,572 B2 | 12/2006 | Ooka et al. |
| 7,143,606 B2 | 12/2006 | Tranier |
| 7,146,969 B2 | 12/2006 | Weirich |
| 7,147,461 B2 | 12/2006 | Neary |
| 7,148,261 B2 | 12/2006 | Hershkowitz et al. |
| 7,152,409 B2 | 12/2006 | Yee et al. |
| 7,162,875 B2 | 1/2007 | Fletcher et al. |
| 7,168,265 B2 | 1/2007 | Briscoe et al. |
| 7,168,488 B2 | 1/2007 | Olsvik et al. |
| 7,183,328 B2 | 2/2007 | Hershkowitz et al. |
| 7,185,497 B2 | 3/2007 | Dudebout et al. |
| 7,194,869 B2 | 3/2007 | McQuiggan et al. |
| 7,197,880 B2 | 4/2007 | Thornton et al. |
| 7,217,303 B2 | 5/2007 | Hershkowitz et al. |
| 7,225,623 B2 | 6/2007 | Koshoffer |
| 7,237,385 B2 | 7/2007 | Carrea |
| 7,284,362 B2 | 10/2007 | Marin et al. |
| 7,299,619 B2 | 11/2007 | Briesch et al. |
| 7,299,868 B2 | 11/2007 | Zapadinski |
| 7,302,801 B2 | 12/2007 | Chen |
| 7,305,817 B2 | 12/2007 | Blodgett et al. |
| 7,305,831 B2 | 12/2007 | Carrea et al. |
| 7,313,916 B2 | 1/2008 | Pellizzari |
| 7,318,317 B2 | 1/2008 | Carrea |
| 7,343,742 B2 | 3/2008 | Wimmer et al. |
| 7,353,655 B2 | 4/2008 | Bolis et al. |
| 7,357,857 B2 | 4/2008 | Hart et al. |
| 7,363,756 B2 | 4/2008 | Carrea et al. |
| 7,363,764 B2 | 4/2008 | Griffin et al. |
| 7,381,393 B2 | 6/2008 | Lynn |
| 7,401,577 B2 | 7/2008 | Saucedo et al. |
| 7,410,525 B1 | 8/2008 | Liu et al. |
| 7,416,137 B2 | 8/2008 | Hagen et al. |
| 7,434,384 B2 | 10/2008 | Lord et al. |
| 7,438,744 B2 | 10/2008 | Beaumont |
| 7,467,942 B2 | 12/2008 | Carroni et al. |
| 7,468,173 B2 | 12/2008 | Hughes et al. |
| 7,472,550 B2 | 1/2009 | Lear et al. |
| 7,481,048 B2 | 1/2009 | Harmon et al. |
| 7,481,275 B2 | 1/2009 | Olsvik et al. |
| 7,482,500 B2 | 1/2009 | Johann et al. |
| 7,485,761 B2 | 2/2009 | Schindler et al. |
| 7,488,857 B2 | 2/2009 | Johann et al. |
| 7,490,472 B2 | 2/2009 | Lynghjem et al. |
| 7,491,250 B2 | 2/2009 | Hershkowitz et al. |
| 7,492,054 B2 | 2/2009 | Catlin |
| 7,493,769 B2 | 2/2009 | Jangili |
| 7,498,009 B2 | 3/2009 | Leach et al. |
| 7,503,178 B2 | 3/2009 | Bucker et al. |
| 7,503,948 B2 | 3/2009 | Hershkowitz et al. |
| 7,506,501 B2 | 3/2009 | Anderson et al. |
| 7,513,099 B2 | 4/2009 | Nuding et al. |
| 7,513,100 B2 | 4/2009 | Motter et al. |
| 7,516,626 B2 | 4/2009 | Brox et al. |
| 7,520,134 B2 | 4/2009 | Durbin et al. |
| 7,523,603 B2 | 4/2009 | Hagen et al. |
| 7,536,252 B1 | 5/2009 | Hibshman et al. |
| 7,536,873 B2 | 5/2009 | Nohlen |
| 7,540,150 B2 | 6/2009 | Schmid et al. |
| 7,559,977 B2 | 7/2009 | Fleischer et al. |
| 7,562,519 B1 | 7/2009 | Harris et al. |
| 7,562,529 B2 | 7/2009 | Kuspert et al. |
| 7,566,394 B2 | 7/2009 | Koseoglu |
| 7,574,856 B2 | 8/2009 | Mak |
| 7,591,866 B2 | 9/2009 | Bose |
| 7,594,386 B2 | 9/2009 | Narayanan et al. |
| 7,610,752 B2 | 11/2009 | Betta et al. |
| 7,610,759 B2 | 11/2009 | Yoshida et al. |
| 7,611,681 B2 | 11/2009 | Kaefer |
| 7,614,352 B2 | 11/2009 | Anthony et al. |
| 7,618,606 B2 | 11/2009 | Fan et al. |
| 7,631,493 B2 | 12/2009 | Shirakawa et al. |
| 7,634,915 B2 | 12/2009 | Hoffmann et al. |
| 7,635,408 B2 | 12/2009 | Mak et al. |
| 7,637,093 B2 | 12/2009 | Rao |
| 7,644,573 B2 | 1/2010 | Smith et al. |
| 7,650,744 B2 | 1/2010 | Varatharajan et al. |
| 7,654,320 B2 | 2/2010 | Payton |
| 7,654,330 B2 | 2/2010 | Zubrin et al. |
| 7,655,071 B2 | 2/2010 | De Vreede |
| 7,670,135 B1 | 3/2010 | Zink et al. |
| 7,673,454 B2 | 3/2010 | Saito et al. |
| 7,673,685 B2 | 3/2010 | Shaw et al. |
| 7,674,443 B1 | 3/2010 | Davis |
| 7,677,309 B2 | 3/2010 | Shaw et al. |
| 7,681,394 B2 | 3/2010 | Haugen |
| 7,682,597 B2 | 3/2010 | Blumenfeld et al. |
| 7,690,204 B2 | 4/2010 | Drnevich et al. |
| 7,691,788 B2 | 4/2010 | Tan et al. |
| 7,695,703 B2 | 4/2010 | Sobolevskiy et al. |
| 7,717,173 B2 | 5/2010 | Grott |
| 7,721,543 B2 | 5/2010 | Massey et al. |
| 7,726,114 B2 | 6/2010 | Evulet |
| 7,734,408 B2 | 6/2010 | Shiraki |
| 7,739,864 B2 | 6/2010 | Finkenrath et al. |
| 7,749,311 B2 | 7/2010 | Saito et al. |
| 7,752,848 B2 | 7/2010 | Balan et al. |
| 7,752,850 B2 | 7/2010 | Laster et al. |
| 7,753,039 B2 | 7/2010 | Harima et al. |
| 7,753,972 B2 | 7/2010 | Zubrin et al. |
| 7,762,084 B2 | 7/2010 | Martis et al. |
| 7,763,163 B2 | 7/2010 | Koseoglu |
| 7,763,227 B2 | 7/2010 | Wang |
| 7,765,810 B2 | 8/2010 | Pfefferle |
| 7,788,897 B2 | 9/2010 | Campbell et al. |
| 7,789,159 B1 | 9/2010 | Bader |
| 7,789,658 B2 | 9/2010 | Towler et al. |
| 7,789,944 B2 | 9/2010 | Saito et al. |
| 7,793,494 B2 | 9/2010 | Wirth et al. |
| 7,802,434 B2 | 9/2010 | Varatharajan et al. |
| 7,815,873 B2 | 10/2010 | Sankaranarayanan et al. |
| 7,815,892 B2 | 10/2010 | Hershkowitz et al. |
| 7,819,951 B2 | 10/2010 | White et al. |
| 7,824,179 B2 | 11/2010 | Hasegawa et al. |
| 7,827,778 B2 | 11/2010 | Finkenrath et al. |
| 7,827,794 B1 | 11/2010 | Pronske et al. |
| 7,841,186 B2 | 11/2010 | So et al. |
| 7,845,406 B2 | 12/2010 | Nitschke |
| 7,846,401 B2 | 12/2010 | Hershkowitz et al. |
| 7,861,511 B2 | 1/2011 | Chillar et al. |
| 7,874,140 B2 | 1/2011 | Fan et al. |
| 7,874,350 B2 | 1/2011 | Pfefferle |
| 7,875,402 B2 | 1/2011 | Hershkowitz et al. |
| 7,882,692 B2 | 2/2011 | Pronske et al. |
| 7,886,522 B2 | 2/2011 | Kammel |
| 7,895,822 B2 | 3/2011 | Hoffmann et al. |
| 7,896,105 B2 | 3/2011 | Dupriest |
| 7,906,304 B2 | 3/2011 | Kohr |
| 7,909,898 B2 | 3/2011 | White et al. |
| 7,914,749 B2 | 3/2011 | Carstens et al. |
| 7,914,764 B2 | 3/2011 | Hershkowitz et al. |

(56) References Cited

U.S. PATENT DOCUMENTS

| | | | |
|---|---|---|---|
| 7,918,906 B2 | 4/2011 | Zubrin et al. |
| 7,921,633 B2 | 4/2011 | Rising |
| 7,922,871 B2 | 4/2011 | Price et al. |
| 7,926,292 B2 | 4/2011 | Rabovitser et al. |
| 7,931,712 B2 | 4/2011 | Zubrin et al. |
| 7,931,731 B2 | 4/2011 | Van Heeringen et al. |
| 7,931,888 B2 | 4/2011 | Drnevich et al. |
| 7,934,926 B2 | 5/2011 | Kornbluth et al. |
| 7,942,003 B2 | 5/2011 | Baudoin et al. |
| 7,942,008 B2 | 5/2011 | Joshi et al. |
| 7,943,097 B2 | 5/2011 | Golden et al. |
| 7,955,403 B2 | 6/2011 | Ariyapadi et al. |
| 7,966,822 B2 | 6/2011 | Myers et al. |
| 7,976,803 B2 | 7/2011 | Hooper et al. |
| 7,980,312 B1 | 7/2011 | Hill et al. |
| 7,985,399 B2 | 7/2011 | Drnevich et al. |
| 7,988,750 B2 | 8/2011 | Lee et al. |
| 8,001,789 B2 | 8/2011 | Vega et al. |
| 8,029,273 B2 | 10/2011 | Paschereit et al. |
| 8,036,813 B2 | 10/2011 | Tonetti et al. |
| 8,038,416 B2 | 10/2011 | Ono et al. |
| 8,038,746 B2 | 10/2011 | Clark |
| 8,038,773 B2 | 10/2011 | Ochs et al. |
| 8,046,986 B2 | 11/2011 | Chillar et al. |
| 8,047,007 B2 | 11/2011 | Zubrin et al. |
| 8,051,638 B2 | 11/2011 | Aljabari et al. |
| 8,061,120 B2 | 11/2011 | Hwang |
| 8,062,617 B2 | 11/2011 | Stakhev et al. |
| 8,065,870 B2 | 11/2011 | Jobson et al. |
| 8,065,874 B2 | 11/2011 | Fong et al. |
| 8,074,439 B2 | 12/2011 | Foret |
| 8,080,225 B2 | 12/2011 | Dickinson et al. |
| 8,083,474 B2 | 12/2011 | Hashimoto et al. |
| 8,097,230 B2 | 1/2012 | Mesters et al. |
| 8,101,146 B2 | 1/2012 | Fedeyko et al. |
| 8,105,559 B2 | 1/2012 | Melville et al. |
| 8,110,012 B2 | 2/2012 | Chiu et al. |
| 8,117,825 B2 | 2/2012 | Griffin et al. |
| 8,117,846 B2 | 2/2012 | Wilbraham |
| 8,127,558 B2 | 3/2012 | Bland et al. |
| 8,127,936 B2 | 3/2012 | Liu et al. |
| 8,127,937 B2 | 3/2012 | Liu et al. |
| 8,133,298 B2 | 3/2012 | Lanyi et al. |
| 8,166,766 B2 | 5/2012 | Draper |
| 8,167,960 B2 | 5/2012 | Gil |
| 8,176,982 B2 | 5/2012 | Gil et al. |
| 8,191,360 B2 | 6/2012 | Fong et al. |
| 8,191,361 B2 | 6/2012 | Fong et al. |
| 8,196,387 B2 | 6/2012 | Shah et al. |
| 8,196,413 B2 | 6/2012 | Mak |
| 8,201,402 B2 | 6/2012 | Fong et al. |
| 8,205,455 B2 | 6/2012 | Popovic |
| 8,206,669 B2 | 6/2012 | Schaffer et al. |
| 8,209,192 B2 | 6/2012 | Gil et al. |
| 8,215,105 B2 | 7/2012 | Fong et al. |
| 8,220,247 B2 | 7/2012 | Wijmans et al. |
| 8,220,248 B2 | 7/2012 | Wijmans et al. |
| 8,220,268 B2 | 7/2012 | Callas |
| 8,225,600 B2 | 7/2012 | Theis |
| 8,226,912 B2 | 7/2012 | Kloosterman et al. |
| 8,240,142 B2 | 8/2012 | Fong et al. |
| 8,240,153 B2 | 8/2012 | Childers et al. |
| 8,245,492 B2 | 8/2012 | Draper |
| 8,245,493 B2 | 8/2012 | Minto |
| 8,247,462 B2 | 8/2012 | Boshoff et al. |
| 8,257,476 B2 | 9/2012 | White et al. |
| 8,261,823 B1 | 9/2012 | Hill et al. |
| 8,262,343 B2 | 9/2012 | Hagen |
| 8,266,883 B2 | 9/2012 | Ouellet et al. |
| 8,266,913 B2 | 9/2012 | Snook et al. |
| 8,268,044 B2 | 9/2012 | Wright et al. |
| 8,281,596 B1 | 10/2012 | Rohrssen et al. |
| 8,316,665 B2 | 11/2012 | Mak |
| 8,316,784 B2 | 11/2012 | D'Agostini |
| 8,337,613 B2 | 12/2012 | Zauderer |
| 8,347,600 B2 | 1/2013 | Wichmann et al. |
| 8,348,551 B2 | 1/2013 | Baker et al. |
| 8,371,100 B2 | 2/2013 | Draper |
| 8,372,251 B2 | 2/2013 | Goller et al. |
| 8,377,184 B2 | 2/2013 | Fujikawa et al. |
| 8,377,401 B2 | 2/2013 | Darde et al. |
| 8,388,919 B2 | 3/2013 | Hooper et al. |
| 8,397,482 B2 | 3/2013 | Kraemer et al. |
| 8,398,757 B2 | 3/2013 | Iijima et al. |
| 8,409,307 B2 | 4/2013 | Drnevich et al. |
| 8,414,694 B2 | 4/2013 | Iijima et al. |
| 8,424,282 B2 | 4/2013 | Vollmer et al. |
| 8,424,601 B2 | 4/2013 | Betzer-Zilevitch |
| 8,436,489 B2 | 5/2013 | Stahlkopf et al. |
| 8,453,461 B2 | 6/2013 | Draper |
| 8,453,462 B2 | 6/2013 | Wichmann et al. |
| 8,453,583 B2 | 6/2013 | Malavasi et al. |
| 8,454,350 B2 | 6/2013 | Berry et al. |
| 8,475,160 B2 | 7/2013 | Campbell et al. |
| 8,539,749 B1 | 9/2013 | Wichmann et al. |
| 8,567,200 B2 | 10/2013 | Brook et al. |
| 8,616,294 B2 | 12/2013 | Zubrin et al. |
| 8,627,643 B2 | 1/2014 | Chillar et al. |
| 2001/0000049 A1 | 3/2001 | Kataoka et al. |
| 2001/0029732 A1 | 10/2001 | Bachmann |
| 2001/0045090 A1 | 11/2001 | Gray |
| 2002/0043063 A1 | 4/2002 | Kataoka et al. |
| 2002/0053207 A1 | 5/2002 | Finger et al. |
| 2002/0069648 A1 | 6/2002 | Levy et al. |
| 2002/0100271 A1* | 8/2002 | Viteri .................. F01K 21/047 60/39.182 |
| 2002/0187449 A1 | 12/2002 | Doebbeling et al. |
| 2003/0005698 A1 | 1/2003 | Keller |
| 2003/0131582 A1 | 7/2003 | Anderson et al. |
| 2003/0134241 A1 | 7/2003 | Marin et al. |
| 2003/0221409 A1 | 12/2003 | McGowan |
| 2004/0006994 A1 | 1/2004 | Walsh et al. |
| 2004/0068981 A1 | 4/2004 | Siefker et al. |
| 2004/0166034 A1 | 8/2004 | Kaefer |
| 2004/0170559 A1 | 9/2004 | Hershkowitz et al. |
| 2004/0223408 A1 | 11/2004 | Mathys et al. |
| 2004/0238654 A1 | 12/2004 | Hagen et al. |
| 2005/0028529 A1 | 2/2005 | Bartlett et al. |
| 2005/0144961 A1 | 7/2005 | Colibaba-Evulet et al. |
| 2005/0197267 A1 | 9/2005 | Zaki et al. |
| 2005/0229585 A1 | 10/2005 | Webster |
| 2005/0236602 A1 | 10/2005 | Viteri et al. |
| 2006/0112675 A1 | 6/2006 | Anderson et al. |
| 2006/0158961 A1 | 7/2006 | Ruscheweyh et al. |
| 2006/0183009 A1 | 8/2006 | Berlowitz et al. |
| 2006/0196812 A1 | 9/2006 | Beetge et al. |
| 2006/0248888 A1 | 11/2006 | Geskes |
| 2007/0000242 A1 | 1/2007 | Harmon et al. |
| 2007/0044475 A1 | 3/2007 | Leser et al. |
| 2007/0044479 A1 | 3/2007 | Brandt et al. |
| 2007/0089425 A1 | 4/2007 | Motter et al. |
| 2007/0107430 A1 | 5/2007 | Schmid et al. |
| 2007/0144747 A1 | 6/2007 | Steinberg |
| 2007/0231233 A1 | 10/2007 | Bose |
| 2007/0234702 A1 | 10/2007 | Hagen et al. |
| 2007/0245736 A1 | 10/2007 | Barnicki |
| 2007/0249738 A1 | 10/2007 | Haynes et al. |
| 2007/0272201 A1 | 11/2007 | Amano et al. |
| 2008/0000229 A1 | 1/2008 | Kuspert et al. |
| 2008/0006561 A1 | 1/2008 | Moran et al. |
| 2008/0010967 A1 | 1/2008 | Griffin et al. |
| 2008/0034727 A1 | 2/2008 | Sutikno |
| 2008/0038598 A1 | 2/2008 | Berlowitz et al. |
| 2008/0047280 A1 | 2/2008 | Dubar |
| 2008/0066443 A1 | 3/2008 | Frutschi et al. |
| 2008/0115478 A1 | 5/2008 | Sullivan |
| 2008/0118310 A1 | 5/2008 | Graham |
| 2008/0127632 A1 | 6/2008 | Finkenrath et al. |
| 2008/0155984 A1 | 7/2008 | Liu et al. |
| 2008/0178611 A1 | 7/2008 | Ding |
| 2008/0202123 A1 | 8/2008 | Sullivan et al. |
| 2008/0223038 A1 | 9/2008 | Lutz et al. |
| 2008/0250795 A1 | 10/2008 | Katdare et al. |
| 2008/0251234 A1 | 10/2008 | Wilson et al. |

(56) References Cited

U.S. PATENT DOCUMENTS

| | | |
|---|---|---|
| 2008/0290719 A1 | 11/2008 | Kaminsky et al. |
| 2008/0309087 A1 | 12/2008 | Evulet et al. |
| 2009/0000762 A1 | 1/2009 | Wilson et al. |
| 2009/0025390 A1 | 1/2009 | Christensen et al. |
| 2009/0038247 A1 | 2/2009 | Taylor et al. |
| 2009/0056342 A1 | 3/2009 | Kirzhner |
| 2009/0064653 A1 | 3/2009 | Hagen et al. |
| 2009/0071166 A1 | 3/2009 | Hagen et al. |
| 2009/0107141 A1 | 4/2009 | Chillar et al. |
| 2009/0117024 A1 | 5/2009 | Weedon et al. |
| 2009/0120087 A1 | 5/2009 | Sumser et al. |
| 2009/0157230 A1 | 6/2009 | Hibshman et al. |
| 2009/0193809 A1 | 8/2009 | Schroder et al. |
| 2009/0205334 A1 | 8/2009 | Aljabari et al. |
| 2009/0218821 A1 | 9/2009 | ElKady et al. |
| 2009/0223227 A1 | 9/2009 | Lipinski et al. |
| 2009/0229263 A1 | 9/2009 | Ouellet et al. |
| 2009/0235637 A1 | 9/2009 | Foret |
| 2009/0241506 A1 | 10/2009 | Nilsson |
| 2009/0255242 A1 | 10/2009 | Paterson et al. |
| 2009/0262599 A1 | 10/2009 | Kohrs et al. |
| 2009/0284013 A1 | 11/2009 | Anand et al. |
| 2009/0301054 A1 | 12/2009 | Simpson et al. |
| 2009/0301099 A1 | 12/2009 | Nigro |
| 2010/0003123 A1 | 1/2010 | Smith |
| 2010/0018218 A1 | 1/2010 | Riley et al. |
| 2010/0058732 A1 | 3/2010 | Kaufmann et al. |
| 2010/0115960 A1 | 5/2010 | Brautsch et al. |
| 2010/0126176 A1 | 5/2010 | Kim |
| 2010/0126906 A1 | 5/2010 | Sury |
| 2010/0162703 A1 | 7/2010 | Li et al. |
| 2010/0170253 A1 | 7/2010 | Berry et al. |
| 2010/0180565 A1 | 7/2010 | Draper |
| 2010/0244461 A1 * | 9/2010 | Delf .................... F01D 15/10 290/40 F |
| 2010/0300102 A1 | 12/2010 | Bathina et al. |
| 2010/0310439 A1 | 12/2010 | Brok et al. |
| 2010/0322759 A1 | 12/2010 | Tanioka |
| 2010/0326084 A1 | 12/2010 | Anderson et al. |
| 2011/0000221 A1 | 1/2011 | Minta et al. |
| 2011/0000671 A1 | 1/2011 | Hershkowitz et al. |
| 2011/0036082 A1 | 2/2011 | Collinot |
| 2011/0048002 A1 | 3/2011 | Taylor et al. |
| 2011/0048010 A1 | 3/2011 | Balcezak et al. |
| 2011/0072779 A1 | 3/2011 | ElKady et al. |
| 2011/0088379 A1 | 4/2011 | Nanda |
| 2011/0110759 A1 | 5/2011 | Sanchez et al. |
| 2011/0126512 A1 | 6/2011 | Anderson |
| 2011/0138766 A1 | 6/2011 | ElKady et al. |
| 2011/0162353 A1 | 7/2011 | Vanvolsem et al. |
| 2011/0205837 A1 | 8/2011 | Gentgen |
| 2011/0226010 A1 | 9/2011 | Baxter |
| 2011/0227346 A1 | 9/2011 | Klenven |
| 2011/0232545 A1 | 9/2011 | Clements |
| 2011/0239653 A1 | 10/2011 | Valeev et al. |
| 2011/0265447 A1 | 11/2011 | Cunningham |
| 2011/0300493 A1 | 12/2011 | Mittricker et al. |
| 2012/0023954 A1 | 2/2012 | Wichmann |
| 2012/0023955 A1 | 2/2012 | Draper |
| 2012/0023956 A1 | 2/2012 | Popovic |
| 2012/0023957 A1 | 2/2012 | Draper et al. |
| 2012/0023958 A1 | 2/2012 | Snook et al. |
| 2012/0023960 A1 | 2/2012 | Minto |
| 2012/0023962 A1 | 2/2012 | Wichmann et al. |
| 2012/0023963 A1 | 2/2012 | Wichmann et al. |
| 2012/0023966 A1 | 2/2012 | Ouellet et al. |
| 2012/0031581 A1 | 2/2012 | Chillar et al. |
| 2012/0032810 A1 | 2/2012 | Chillar et al. |
| 2012/0085100 A1 | 4/2012 | Hughes et al. |
| 2012/0096870 A1 | 4/2012 | Wichmann et al. |
| 2012/0119512 A1 | 5/2012 | Draper |
| 2012/0131925 A1 | 5/2012 | Mittricker et al. |
| 2012/0144837 A1 | 6/2012 | Rasmussen et al. |
| 2012/0185144 A1 | 7/2012 | Draper |
| 2012/0192565 A1 | 8/2012 | Tretyakov et al. |
| 2012/0247105 A1 | 10/2012 | Nelson et al. |
| 2012/0260660 A1 | 10/2012 | Kraemer et al. |
| 2013/0086916 A1 | 4/2013 | Oelfke et al. |
| 2013/0086917 A1 | 4/2013 | Slobodyanskiy et al. |
| 2013/0091853 A1 | 4/2013 | Denton et al. |
| 2013/0091854 A1 | 4/2013 | Gupta et al. |
| 2013/0104562 A1 | 5/2013 | Oelfke et al. |
| 2013/0104563 A1 | 5/2013 | Oelfke et al. |
| 2013/0125554 A1 | 5/2013 | Mittricker et al. |
| 2013/0125555 A1 | 5/2013 | Mittricker et al. |
| 2013/0232980 A1 | 9/2013 | Chen et al. |
| 2013/0269310 A1 | 10/2013 | Wichmann et al. |
| 2013/0269311 A1 | 10/2013 | Wichmann et al. |
| 2013/0269355 A1 | 10/2013 | Wichmann et al. |
| 2013/0269356 A1 | 10/2013 | Butkiewicz et al. |
| 2013/0269357 A1 | 10/2013 | Wichmann et al. |
| 2013/0269358 A1 | 10/2013 | Wichmann et al. |
| 2013/0269360 A1 | 10/2013 | Wichmann et al. |
| 2013/0269361 A1 | 10/2013 | Wichmann et al. |
| 2013/0269362 A1 | 10/2013 | Wichmann et al. |
| 2013/0283808 A1 | 10/2013 | Kolvick |
| 2014/0000271 A1 | 1/2014 | Mittricker et al. |
| 2014/0000273 A1 | 1/2014 | Mittricker et al. |
| 2014/0007590 A1 | 1/2014 | Huntington et al. |
| 2014/0013766 A1 | 1/2014 | Mittricker et al. |
| 2014/0020398 A1 | 1/2014 | Mittricker et al. |
| 2014/0060073 A1 | 3/2014 | Slobodyanskiy et al. |
| 2014/0123620 A1 | 5/2014 | Huntington et al. |
| 2014/0123624 A1 | 5/2014 | Minto |
| 2014/0123659 A1 | 5/2014 | Biyani et al. |
| 2014/0123660 A1 | 5/2014 | Stoia et al. |
| 2014/0123668 A1 | 5/2014 | Huntington et al. |
| 2014/0123669 A1 | 5/2014 | Huntington et al. |
| 2014/0123672 A1 | 5/2014 | Huntington et al. |
| 2014/0150445 A1 | 6/2014 | Huntington et al. |
| 2014/0182298 A1 | 7/2014 | Krull et al. |
| 2014/0182299 A1 | 7/2014 | Woodall et al. |
| 2014/0182301 A1 | 7/2014 | Angelyn et al. |
| 2014/0182302 A1 | 7/2014 | Angelyn et al. |
| 2014/0182303 A1 | 7/2014 | Angelyn et al. |
| 2014/0182304 A1 | 7/2014 | Angelyn et al. |
| 2014/0182305 A1 | 7/2014 | Angelyn et al. |
| 2014/0196464 A1 | 7/2014 | Biyani et al. |
| 2014/0216011 A1 | 8/2014 | Muthaiah et al. |
| 2015/0000292 A1 | 1/2015 | Subramaniyan |
| 2015/0000293 A1 | 1/2015 | Thatcher et al. |
| 2015/0000294 A1 | 1/2015 | Minto et al. |
| 2015/0000299 A1 | 1/2015 | Zuo et al. |
| 2015/0033748 A1 | 2/2015 | Vaezi |
| 2015/0033749 A1 | 2/2015 | Slobodyanskiy et al. |
| 2015/0033751 A1 | 2/2015 | Andrew |
| 2015/0033757 A1 | 2/2015 | White et al. |
| 2015/0040574 A1 | 2/2015 | Wichmann et al. |
| 2015/0059350 A1 | 3/2015 | Kolvick et al. |
| 2015/0075171 A1 | 3/2015 | Sokolov et al. |
| 2015/0152791 A1 | 6/2015 | White |
| 2015/0198089 A1 | 7/2015 | Muthaiah et al. |
| 2015/0204239 A1 | 7/2015 | Minto et al. |
| 2015/0214879 A1 | 7/2015 | Huntington et al. |
| 2015/0226133 A1 | 8/2015 | Minto et al. |

FOREIGN PATENT DOCUMENTS

| | | |
|---|---|---|
| EP | 0770771 | 5/1997 |
| GB | 0776269 | 6/1957 |
| GB | 2117053 | 10/1983 |
| WO | WO1999006674 | 2/1999 |
| WO | WO1999063210 | 12/1999 |
| WO | WO2007068682 | 6/2007 |
| WO | WO2008142009 | 11/2008 |
| WO | WO2011003606 | 1/2011 |
| WO | WO2012003489 | 1/2012 |
| WO | WO2012128928 | 9/2012 |
| WO | WO2012128929 | 9/2012 |
| WO | WO2012170114 | 12/2012 |
| WO | WO2013147632 | 10/2013 |
| WO | WO2013147633 | 10/2013 |
| WO | WO2013155214 | 10/2013 |
| WO | WO2013163045 | 10/2013 |

(56) References Cited

FOREIGN PATENT DOCUMENTS

| WO | WO2014071118 | 5/2014 |
|---|---|---|
| WO | WO2014071215 | 5/2014 |
| WO | WO2014133406 | 9/2014 |

OTHER PUBLICATIONS

U.S. Appl. No. 14/067,552, filed Sep. 9, 2014, Huntington et al.
U.S. Appl. No. 14/553,458, filed Nov. 25, 2014, Huntington et al.
U.S. Appl. No. 14/599,750, filed Jan. 19, 2015, O'Dea et al.
U.S. Appl. No. 14/712,723, filed May 14, 2015, Manchikanti et al.
U.S. Appl. No. 14/726,001, filed May 29, 2015, Della-Fera et al.
U.S. Appl. No. 14/741,189, filed Jun. 16, 2015, Minto et al.
Ahmed, S. et al. (1998) "Catalytic Partial Oxidation Reforming of Hydrocarbon Fuels," 1998 Fuel Cell Seminar, 7 pgs.
Air Products and Chemicals, Inc. (2008) "Air Separation Technology—Ion Transport Membrane (ITM)," www.airproducts.com/ASUsales, 3 pgs.
Air Products and Chemicals, Inc. (2011) "Air Separation Technology Ion Transport Membrane (ITM)," www.airproducts.com/gasification, 4 pgs.
Anderson, R. E. (2006) "Durability and Reliability Demonstration of a Near-Zero-Emission Gas-Fired Power Plant," California Energy Comm., CEC 500-2006-074, 80 pgs.
Baxter, E. et al. (2003) "Fabricate and Test an Advanced Non-Polluting Turbine Drive Gas Generator," U. S. Dept. of Energy, Nat'l Energy Tech. Lab., DE-FC26-00NT 40804, 51 pgs.
Bolland, O. et al. (1998) "Removal of CO2 From Gas Turbine Power Plants Evaluation of Pre-and Postcombustion Methods," SINTEF Group, www.energy.sintef.no/publ/xergi/98/3/art-8engelsk.htm, 11 pgs.
BP Press Release (2006) "BP and Edison Mission Group Plan Major Hydrogen Power Project for California," www.bp.com/hydrogenpower, 2 pgs.
Bryngelsson, M. et al. (2005) "Feasibility Study of $CO_2$ Removal From Pressurized Flue Gas in a Fully Fired Combined Cycle—The Sargas Project," KTH—Royal Institute of Technology, Dept. of Chemical Engineering and Technology, 9 pgs.
Clark, Hal (2002) "Development of a Unique Gas Generator for a Non-Polluting Power Plant," California Energy Commission Feasibility Analysis, P500-02-011F, 42 pgs.
Foy, Kirsten et al. (2005) "Comparison of Ion Transport Membranes" Fourth Annual Conference on Carbon Capture and Sequestration, DOE/NETL; 11 pgs.
Cho, J. H. et al. (2005) "Marrying LNG and Power Generation," Energy Markets; 10, 8; ABI/INFORM Trade & Industry, 5 pgs.
Ciulia, Vincent. (2001-2003) "Auto Repair. How the Engine Works," http://autorepair.about.com/cs/generalinfo/a/aa060500a.htm, 1 page.
Corti, A. et al. (1988) "Athabasca Mineable Oil Sands: The RTR/Gulf Extraction Process Theoretical Model of Bitumen Detachment," $4^{th}$ UNITAR/UNDP Int'l Conf. on Heavy Crude and Tar Sands Proceedings, v.5, paper No. 81, Edmonton, AB, Canada, 4 pgs.
Science Clarified (2012) "Cryogenics," http://www.scienceclarified.com/Co-Di/Cryogenics.html; 6 pgs.
Defrate, L. A. et al. (1959) "Optimum Design of Ejector Using Digital Computers" Chem. Eng. Prog. Symp. Ser., 55 (21), 12 pgs.
Ditaranto, M. et al. (2006) "Combustion Instabilities in Sudden Expansion Oxy-Fuel Flames," ScienceDirect, Combustion and Flame, v.146, 20 pgs.
Elwell, L. C. et al. (2005) "Technical Overview of Carbon Dioxide Capture Technologies for Coal-Fired Power Plants," MPR Associates, Inc., www.mpr.com/uploads/news/co2-capture-coal-fired.pdf, 15 pgs.
Eriksson, Sara. (2005) "Development of Methane Oxidation Catalysts for Different Gas Turbine Combustor Concepts." KTH—The Royal Institute of Technology, Department of Chemical Engineering and Technology, Chemical Technology, Licentiate Thesis, Stockholm Sweden; 45 pgs.
Ertesvag, I. S. et al. (2005) "Exergy Analysis of a Gas-Turbine Combined-Cycle Power Plant With Precombustion $CO_2$ Capture," Elsevier, 35 pgs.
Elkady, Ahmed. M. et al. (2009) "Application of Exhaust Gas Recirculation in a DLN F-Class Combustion System for Postcombustion Carbon Capture," ASME J. Engineering for Gas Turbines and Power, vol. 131, 6 pgs.
Evulet, Andrei T. et al. (2009) "On the Performance and Operability of GE's Dry Low $NO_x$ Combustors utilizing Exhaust Gas Recirculation for Post-Combustion Carbon Capture" Energy Procedia I, 8 pgs.
Caldwell Energy Company (2011) "Wet Compression"; IGTI 2011—CTIC Wet Compression, http://www.turbineinletcooling.org/resources/papers/CTIC_WetCompression_Shepherd_ASMETurboExpo2011.pdf , 22 pgs.
Luby, P. et al. (2003) "Zero Carbon Power Generation: IGCC as the Premium Option," Powergen International, 19 pgs.
MacAdam, S. et al. (2007) "Coal-Based Oxy-Fuel System Evaluation and Combustor Development," Clean Energy Systems, Inc.; presented at the $2^{nd}$ International Freiberg Conference on IGCC & xtl Technologies, 6 pgs.
Morehead, H. (2007) "Siemens Global Gasification and IGCC Update," Siemens, Coal-Gen, 17 pgs.
Nanda, R. et al. (2007) "Utilizing Air Based Technologies as Heat Source for LNG Vaporization," presented at the $86^{th}$ Annual convention of the Gas Processors of America (GPA 2007), San Antonio, TX; 13 pgs.
Reeves, S. R. (2001) "Geological Sequestration of $CO_2$ in Deep, Unmineable Coalbeds: An Integrated Research and Commercial-Scale Field Demonstration Project," SPE 71749; presented at the 2001 SPE Annual Technical Conference and Exhibition, New Orleans, Louisiana, 10 pgs.
Reeves, S. R. (2003) "Enhanced Coalbed Methane Recovery," Society of Petroleum Engineers 101466-DL; SPE Distinguished Lecture Series, 8 pgs.
Richards, Geo A., et al. (2001) "Advanced Steam Generators," National Energy Technology Lab., Pittsburgh, PA, and Morgantown. WV; NASA Glenn Research Center (US), 7 pgs.
Rosetta, M. J. et al. (2006) "Integrating Ambient Air Vaporization Technology with Waste Heat Recovery—A Fresh Approach to LNG Vaporization," presented at the $85^{th}$ annual convention of the Gas Processors of America (GPA 2006), Grapevine, Texas, 22 pgs.
Snarheim, D. et al. (2006) "Control Design for a Gas Turbine Cycle With $CO_2$ Capture Capabilities," Modeling, Identification and Control, vol. 00; presented at the $16^{th}$ IFAC World Congress, Prague, Czech Republic, 10 pgs.
Ulfsnes, R. E. et al. (2003) "Investigation of Physical Properties for $CO_2/H_2O$ Mixtures for use in Semi-Closed $O_2/CO_2$ Gas Turbine Cycle With $CO_2$-Capture," Department of Energy and Process Eng., Norwegian Univ. of Science and Technology, 9 pgs.
Van Hemert, P. et al. (2006) "Adsorption of Carbon Dioxide and a Hydrogen-Carbon Dioxide Mixture," Intn'l Coalbed Methane Symposium (Tuscaloosa, AL) Paper 0615, 9 pgs.
Zhu, J. et al. (2002) "Recovery of Coalbed Methane by Gas Injection," Society of Petroleum Engineers 75255; presented at the 2002 SPE Annual Technical Conference and Exhibition, Tulsa, Oklahoma, 15 pgs.

\* cited by examiner

GAS TURBINE OXIDANT SEPARATION SYSTEM

CROSS-REFERENCE TO RELATED APPLICATIONS

This application claims priority to and benefit of U.S. Provisional Patent Application No. 61/927,822 filed Jan. 14, 2014, entitled "GAS TURBINE OXIDANT SEPARATION SYSTEM," which is herein incorporated by reference in its entirety for all purposes.

BACKGROUND

The subject matter disclosed herein relates to gas turbine engines.

Gas turbine engines are used in a wide variety of applications, such as power generation, aircraft, and various machinery. Gas turbine engines generally combust a fuel with an oxidant (e.g., air) in a combustor section to generate hot combustion products, which then drive one or more turbine stages of a turbine section. The turbine stages, when driven by the hot combustion products, transfer rotational power to a shaft. The rotating shaft, in turn, drives one or more compressor stages of a compressor section to compress a gas (e.g., oxidant) for intake into the combustor section, and can also drive an electrical generator to produce electrical energy.

Combustor sections of gas turbine engines generally include more than one combustor, where each combustor combusts a fuel/oxidant mixture. The fuel/oxidant mixture has a ratio of fuel to oxidant. In gas turbine systems, such a ratio is often represented by an equivalence ratio, or phi ($\Phi$), which is used to represent the ratio of the actual fuel/oxidant ratio relative to the stoichiometric fuel/oxidant ratio. An equivalence ratio of greater than 1.0 results in a fuel-rich combustion of the fuel and oxidant, where fuel is left uncombusted in the combustion products. On the other hand, an equivalence ratio of less than 1.0 results in a fuel-lean combustion of the fuel and oxidant, where oxidant is left unused in the combustion products.

Because of the relatively large number of variables involved in the combustion process, there may be difficulties in controlling the composition of the combustion products. In situations where the exhaust gas is in certain oxidant-sensitive processes, it may be desirable to maintain the oxidant concentration of the combustion products below a certain threshold.

BRIEF DESCRIPTION

Certain embodiments commensurate in scope with the originally claimed subject matter are summarized below. These embodiments are not intended to limit the scope of the claimed invention, but rather these embodiments are intended only to provide a brief summary of possible forms of the invention. Indeed, the present disclosure may encompass a variety of forms that may be similar to or different from the embodiments set forth below.

In one embodiment, a system includes a gas turbine system, having: a turbine driven by combustion products produced by a turbine combustion system; and a separation unit positioned between turbine stages of the turbine, wherein the separation unit separates oxygen out of the combustion products.

In another embodiment, a system includes a gas turbine system, having: a turbine combustion system comprising one or more turbine combustors configured to combust a fuel/oxidant mixture in the presence of an exhaust gas diluent to generate combustion products; a turbine driven by the combustion products; a flow path extending from the turbine combustion system and through the turbine; and a separation unit positioned along the flow path, wherein the separation unit separates oxygen out of the combustion products.

In a further embodiment, a system includes a gas turbine system, having: a turbine combustion system comprising one or more turbine combustors configured to combust a fuel/oxidant mixture in the presence of an exhaust gas diluent to generate combustion products; a turbine driven by the combustion products; an exhaust gas compressor driven by the turbine, wherein the exhaust gas compressor is configured to compress a recirculated exhaust gas recirculated from an outlet of the turbine to generate the exhaust gas diluent; an exhaust gas flow path extending from the exhaust gas compressor to the turbine combustion system; and a separation unit positioned along the exhaust gas diluent flow path, wherein the separation unit comprises a membrane that separates oxygen out of the exhaust gas diluent.

In another embodiment, a system includes a gas turbine system, having: a turbine combustion system that combusts a fuel-oxidant mixture in the presence of an exhaust gas to produce combustion products; a turbine driven by the combustion products received along a combustion products path extending from the turbine combustion system to the turbine; a compressor that compresses a recirculated exhaust gas received from a recirculation path to supply the exhaust gas to the turbine combustion system along a compressed exhaust gas path, wherein the recirculation path extends from the turbine to the compressor and the compressed exhaust gas path extends from the compressor to the combustor; and a separation unit positioned along a path of the turbine, along the combustion products path, along the recirculation path, along the compressed exhaust gas path, or any combination thereof, wherein the separation unit selectively removes oxygen from fluid flowing along the respective path.

DRAWINGS

These and other features, aspects, and advantages of the present invention will become better understood when the following detailed description is read with reference to the accompanying drawings in which like characters represent like parts throughout the drawings, wherein.

Figure 1:
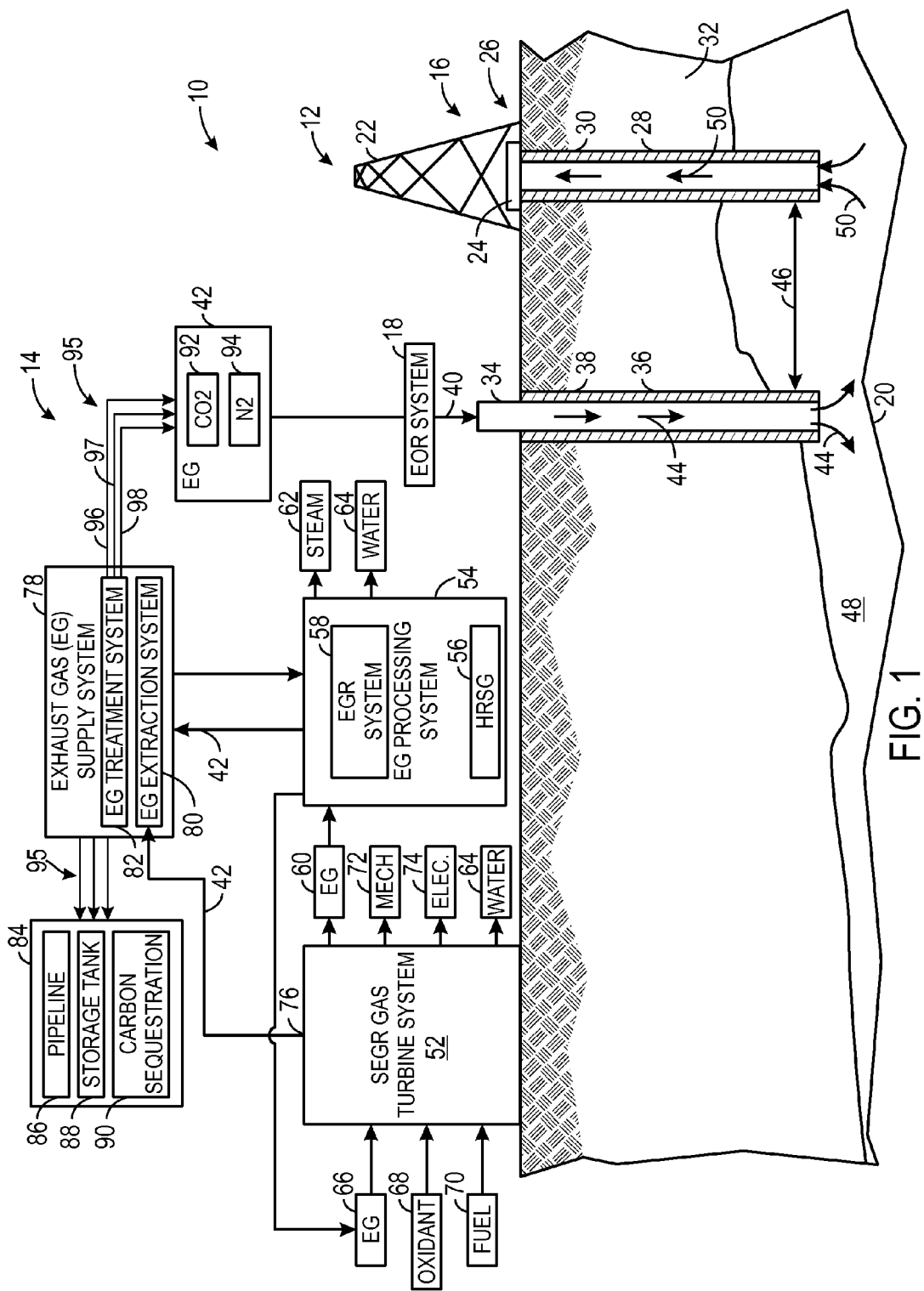
FIG. 1 is a diagram of an embodiment of a system having a turbine-based service system coupled to a hydrocarbon production system.
Figure 2:
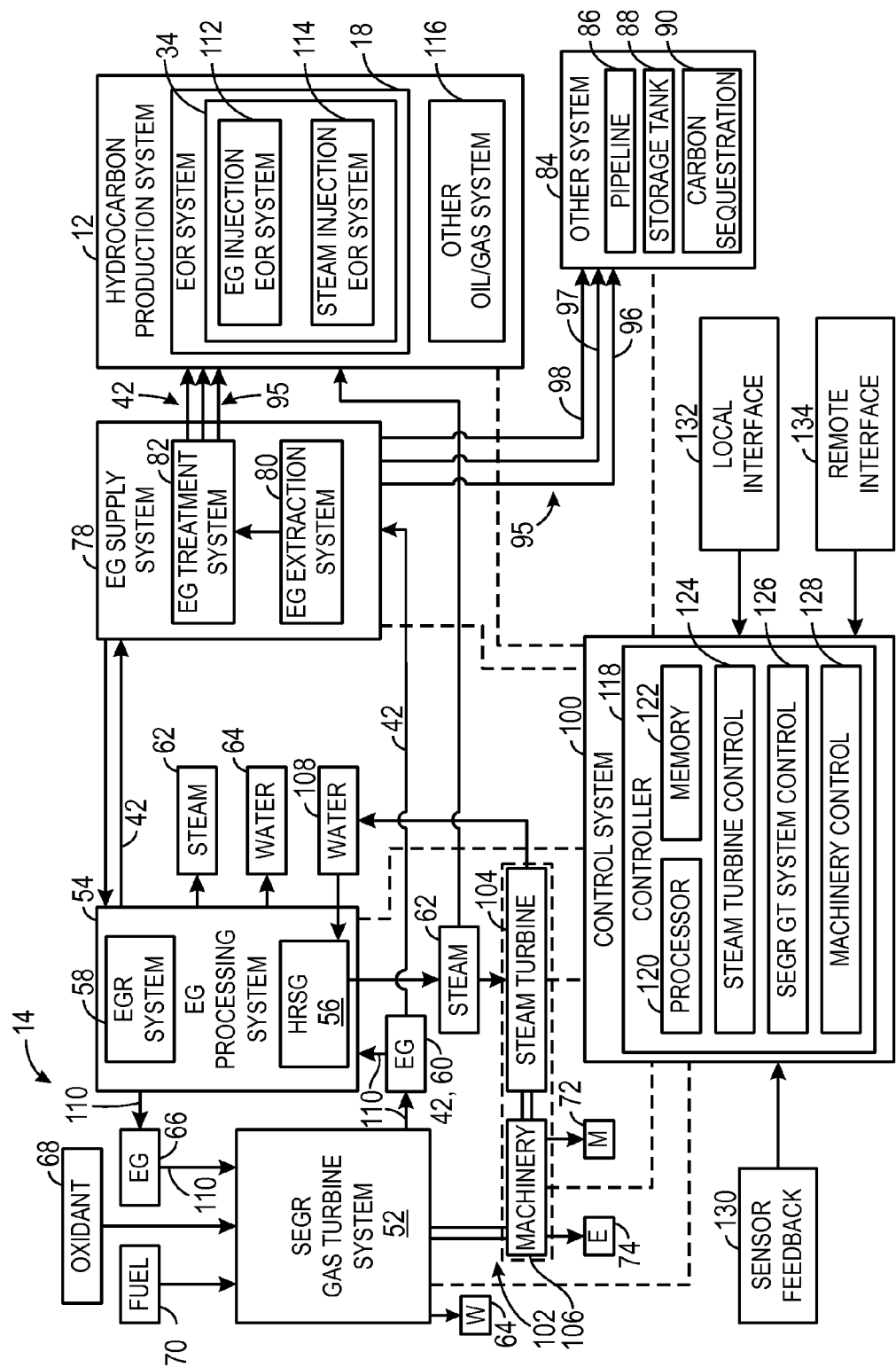
FIG. 2 is a diagram of an embodiment of the system of FIG. 1, further illustrating a control system and a combined cycle system.
Figure 3:
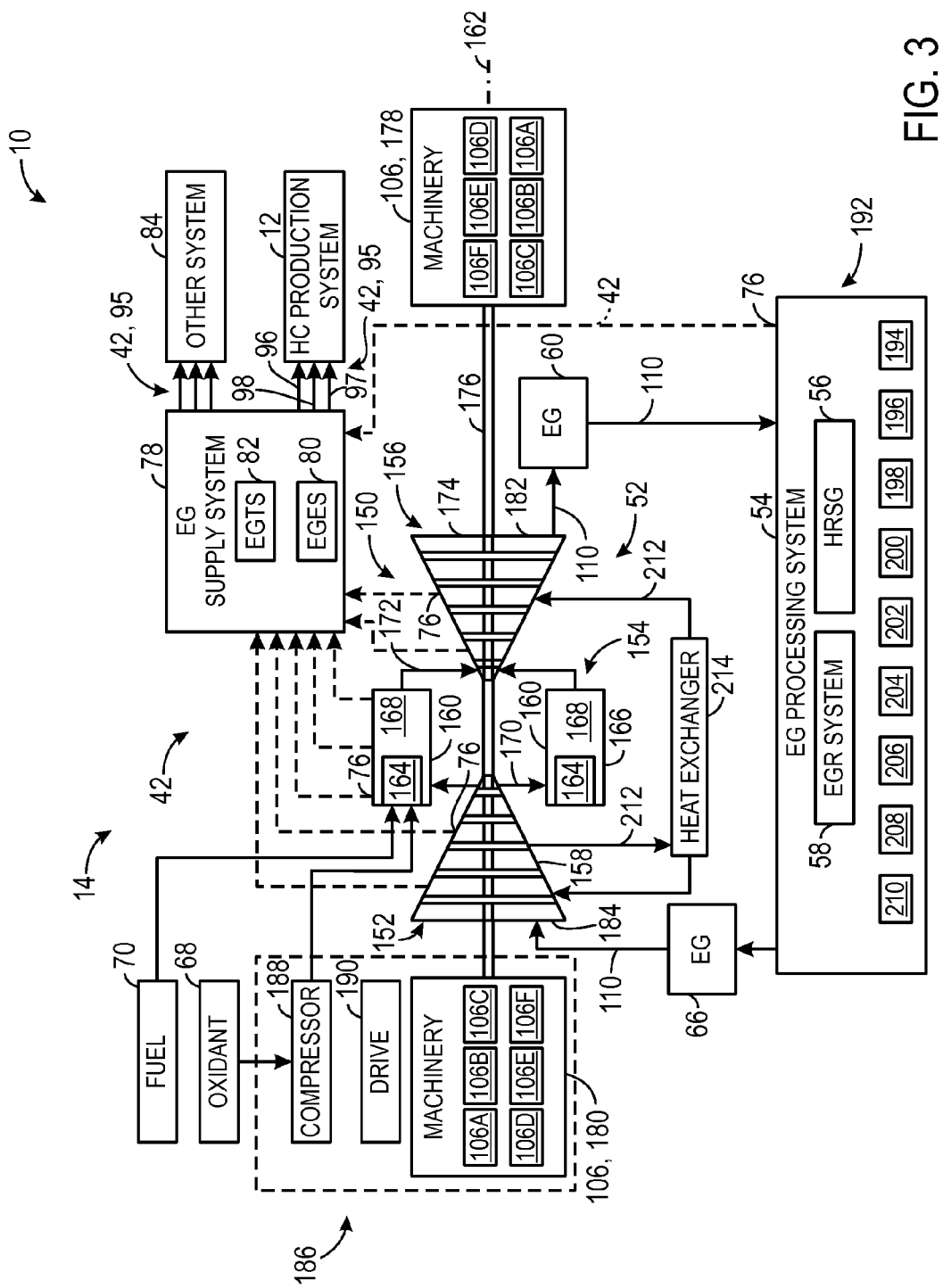
FIG. 3 is a diagram of an embodiment of the system of FIGS. 1 and 2, further illustrating details of a gas turbine engine, exhaust gas supply system, and exhaust gas processing system.
Figure 7:
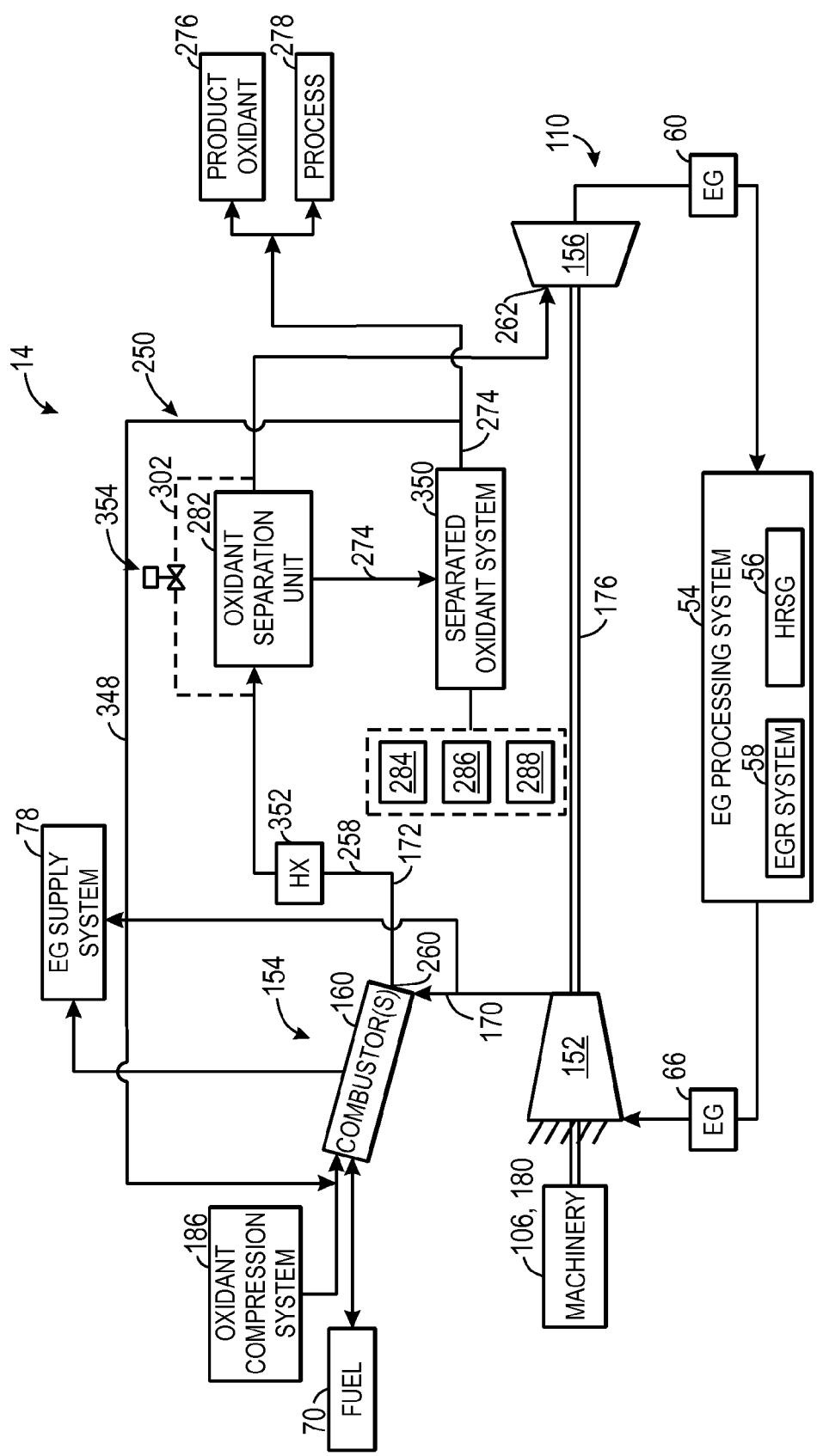
FIG. 7 is a schematic illustration of an embodiment of the turbine-based service system of FIGS. 1-3 having an oxidant separation unit positioned along a combustion products flow path between a combustor section and a turbine section.
Figure 8:
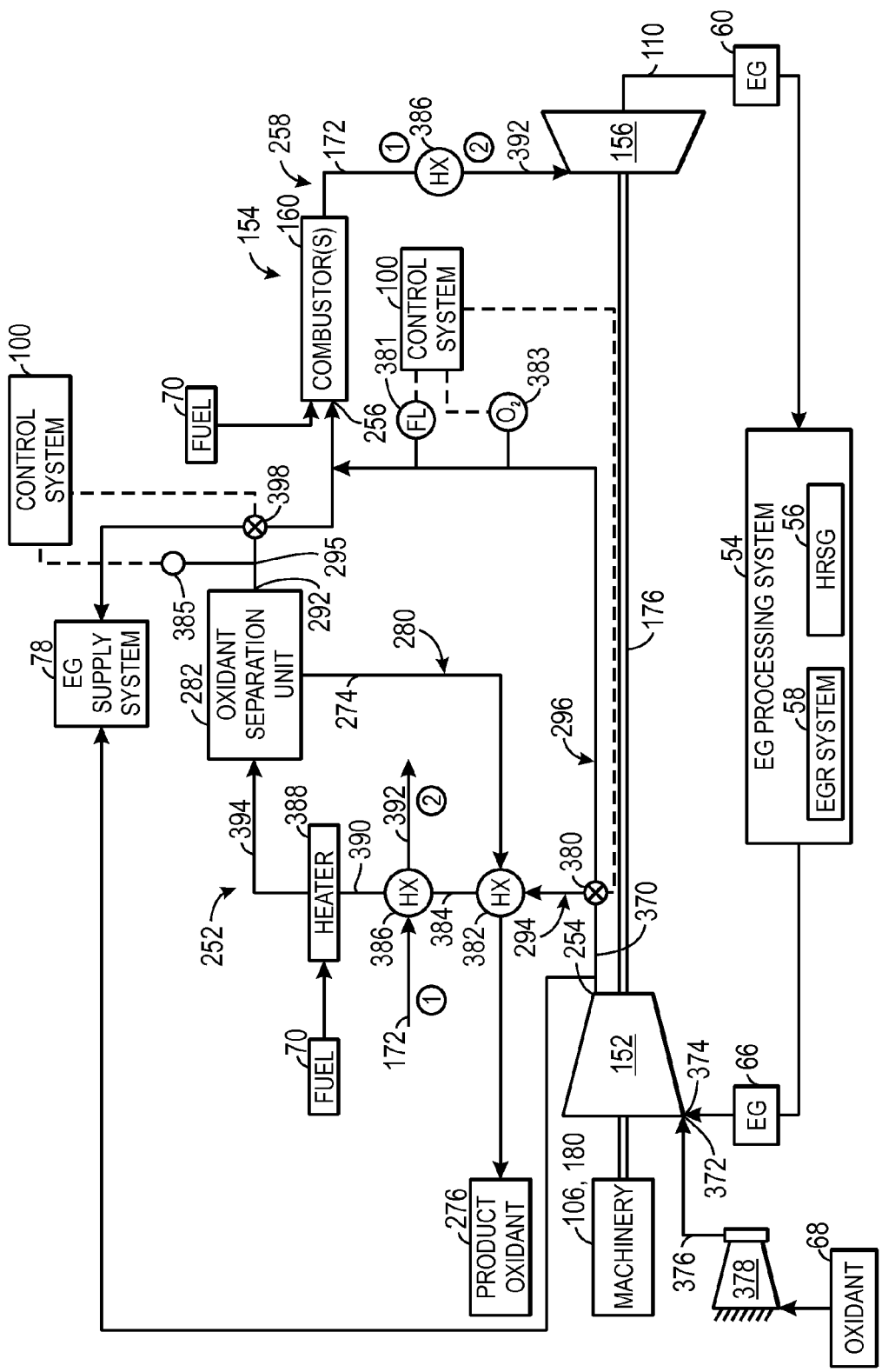
FIG. 8 is a schematic illustration of an embodiment of the turbine-based service system of FIGS. 1-3 having an oxidant separation unit positioned along a compressed fluid flow path between a compressor section and a combustor section.
Figure 9:
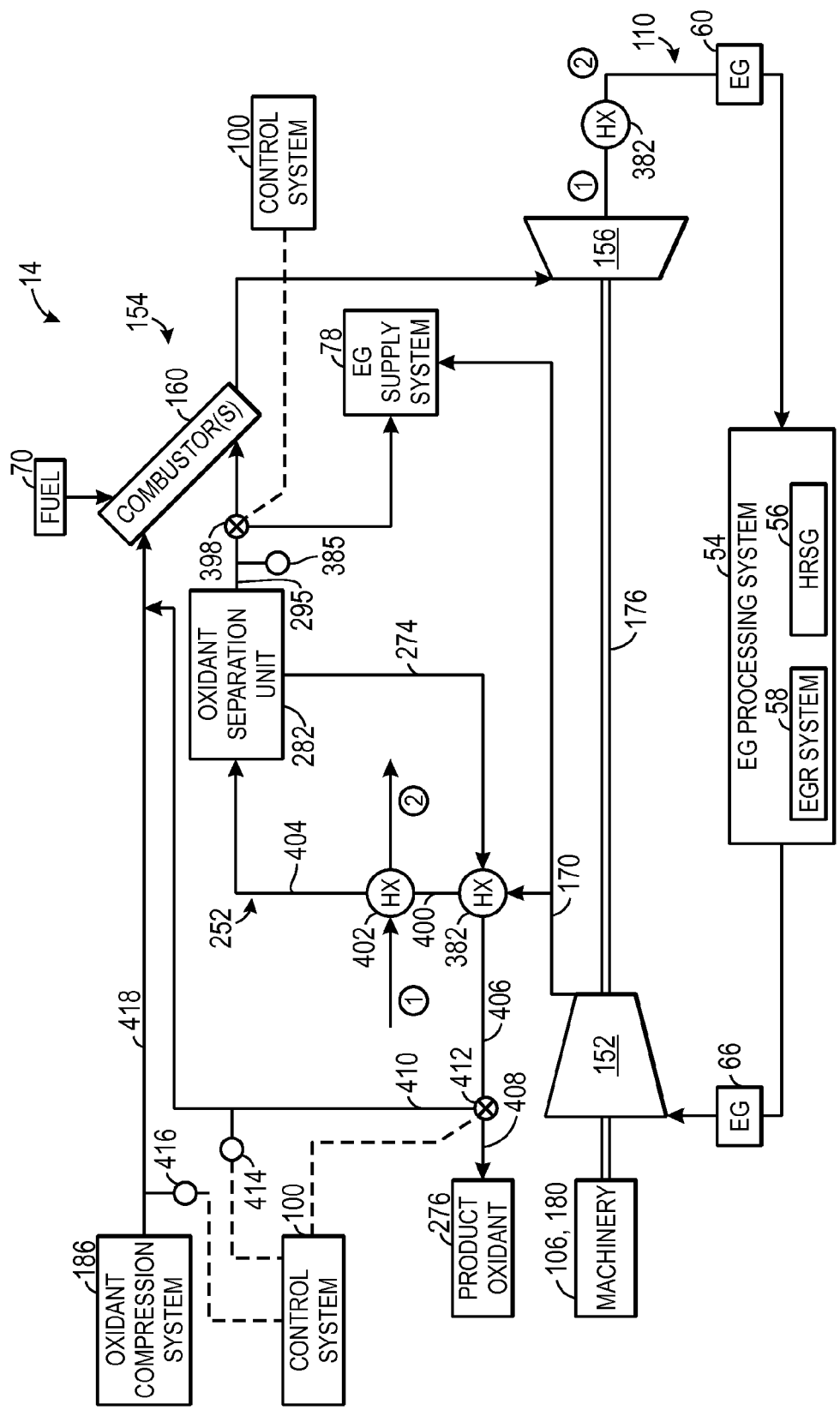
Figure 10:
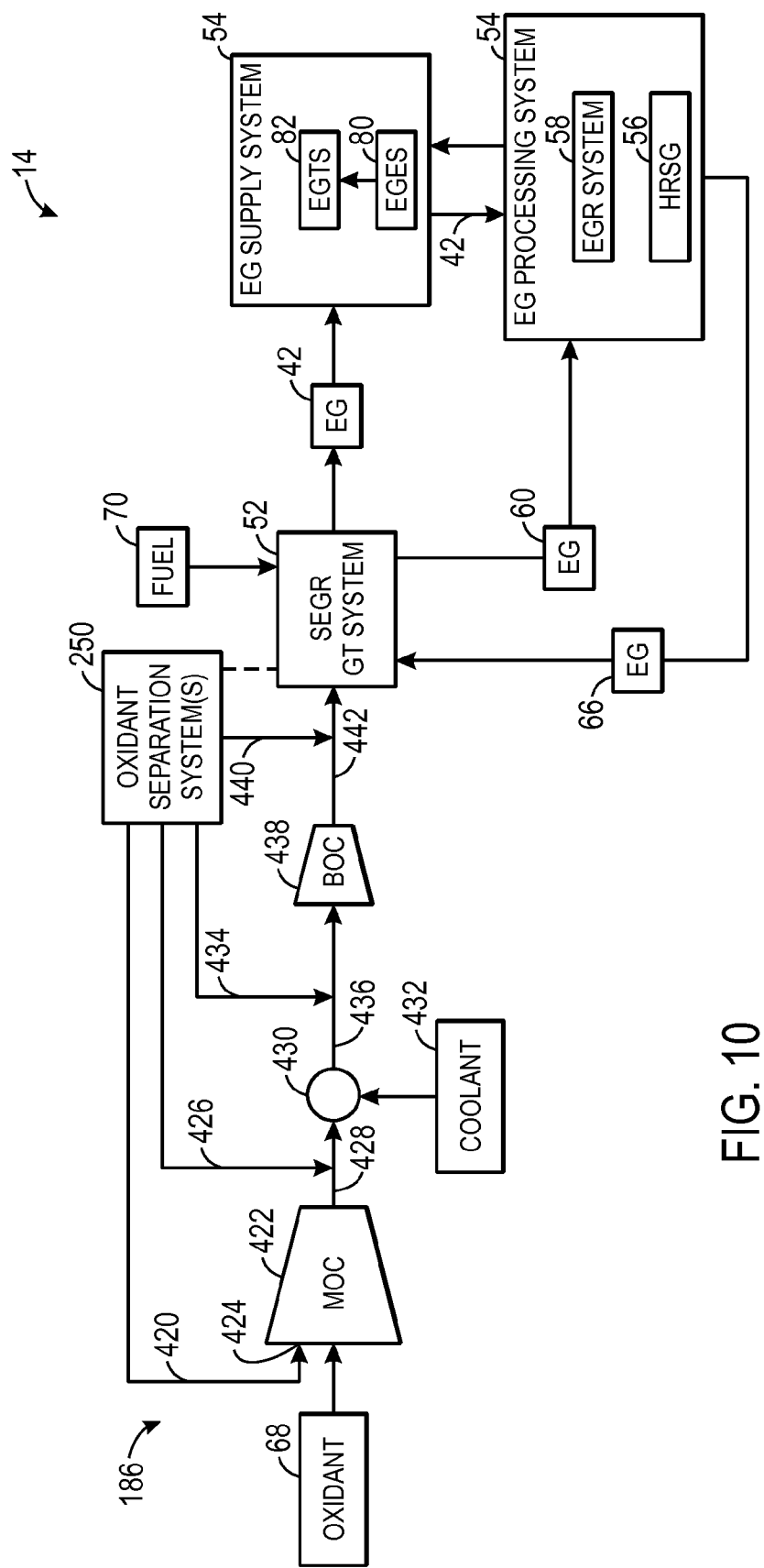

FIG. 9 is a schematic illustration of an embodiment of the turbine-based service system of FIGS. 1-3 having an oxidant separation unit positioned along a compressed exhaust gas flow path between a compressor section and a combustor section; and FIG. 10 is a schematic illustration of an example of the manner in which the separated oxidant generated by the oxidant separation systems of FIGS. 5-9 may be incorporated into the oxidant compression system of FIGS. 3-9.

DETAILED DESCRIPTION

One or more specific embodiments of the present invention will be described below. In an effort to provide a concise description of these embodiments, all features of an actual implementation may not be described in the specification. It should be appreciated that in the development of any such actual implementation, as in an engineering or design project, numerous implementation-specific decisions are made to achieve the specific goals, such as compliance with system-related and/or business-related constraints, which may vary from one implementation to another. Moreover, it should be appreciated that such effort might be complex and time consuming, but would nevertheless be a routine undertaking of design, fabrication, and manufacture for those of ordinary skill having the benefit of this disclosure.

Detailed example embodiments are disclosed herein. However, specific structural and functional details disclosed herein are merely representative for purposes of describing example embodiments. Embodiments of the present invention may, however, be embodied in many alternate forms, and should not be construed as limited to only the embodiments set forth herein.

Accordingly, while example embodiments are capable of various modifications and alternative forms, embodiments thereof are illustrated by way of example in the figures and will herein be described in detail. It should be understood, however, that there is no intent to limit example embodiments to the particular forms disclosed, but to the contrary, example embodiments are to cover all modifications, equivalents, and alternatives falling within the scope of the present invention.

The terminology used herein is for describing particular embodiments only and is not intended to be limiting of example embodiments. As used herein, the singular forms "a", "an" and "the" are intended to include the plural forms as well, unless the context clearly indicates otherwise. The terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Although the terms first, second, primary, secondary, etc. may be used herein to describe various elements, these elements should not be limited by these terms. These terms are only used to distinguish one element from another. For example, but not limiting to, a first element could be termed a second element, and, similarly, a second element could be termed a first element, without departing from the scope of example embodiments. As used herein, the term "and/or" includes any, and all, combinations of one or more of the associated listed items.

Certain terminology may be used herein for the convenience of the reader only and is not to be taken as a limitation on the scope of the invention. For example, words such as "upper," "lower," "left," "right," "front," "rear," "top," "bottom," "horizontal," "vertical," "upstream," "downstream," "fore," "aft," and the like; merely describe the configuration shown in the FIGS. Indeed, the element or elements of an embodiment of the present invention may be oriented in any direction and the terminology, therefore, should be understood as encompassing such variations unless specified otherwise.

As discussed in detail below, the disclosed embodiments relate generally to gas turbine systems with exhaust gas recirculation (EGR), and particularly stoichiometric operation of the gas turbine systems using EGR. For example, the gas turbine systems may be configured to recirculate the exhaust gas along an exhaust recirculation path, stoichiometrically combust fuel and oxidant along with at least some of the recirculated exhaust gas, and capture the exhaust gas for use in various target systems. In addition to controlling the flow of the fuel and/or oxidant, the recirculation of the exhaust gas along with stoichiometric combustion may help to increase the concentration level of $CO_2$ in the exhaust gas, which can then be post treated to separate and purify the $CO_2$ and nitrogen ($N_2$) for use in various target systems. The gas turbine systems also may employ various exhaust gas processing (e.g., heat recovery, catalyst reactions, etc.) along the exhaust recirculation path, thereby increasing the concentration level of $CO_2$, reducing concentration levels of other emissions (e.g., carbon monoxide, nitrogen oxides, and unburnt hydrocarbons), and increasing energy recovery (e.g., with heat recovery units).

In addition, although stoichiometric operation of the gas turbine systems may be desirable to effect low residual oxidant in a product gas exported by the systems, present embodiments also enable the generation of stoichiometric-like product gas even in situations where the systems are not operated under stoichiometric conditions. Specifically, certain of the embodiments described below enable the operation of the systems set forth with respect to FIGS. 1-4 (e.g., EGR gas turbine systems, such as stoichiometric EGR (SEGR) gas turbine systems) under non-stoichiometric conditions, while still producing product gas suitable for the same use as product gas produced within a SEGR system. Specifically, the embodiments discussed below with respect to FIGS. 5-9, which correspond to more specific embodiments of the systems of FIGS. 1-4, include one or more oxidant separation systems positioned throughout the gas turbine system. The oxidant separation systems enable the removal of oxidant (e.g., oxygen) from the products of combustion produced under non-stoichiometric combustion conditions, such that a vitiated stream produced by such separation is stoichiometric-like in composition.

FIG. 1 is a diagram of an embodiment of a system 10 having an hydrocarbon production system 12 associated with a turbine-based service system 14. As discussed in further detail below, various embodiments of the turbine-based service system 14 are configured to provide various services, such as electrical power, mechanical power, and fluids (e.g., exhaust gas), to the hydrocarbon production system 12 to facilitate the production or retrieval of oil and/or gas. In the illustrated embodiment, the hydrocarbon production system 12 includes an oil/gas extraction system 16 and an enhanced oil recovery (EOR) system 18, which are coupled to a subterranean reservoir 20 (e.g., an oil, gas, or hydrocarbon reservoir). The oil/gas extraction system 16 includes a variety of surface equipment 22, such as a Christmas tree or production tree 24, coupled to an oil/gas well 26. Furthermore, the well 26 may include one or more tubulars 28 extending through a drilled bore 30 in the earth 32 to the subterranean reservoir 20. The tree 24 includes one or more valves, chokes, isolation sleeves, blowout preventers, and various flow control devices, which regulate pressures and control flows to and from the subterranean reservoir 20. While the tree 24 is generally used to control the flow of the production fluid (e.g., oil or gas) out of the subterranean reservoir 20, the EOR system 18 may increase the production of oil or gas by injecting one or more fluids into the subterranean reservoir 20.

Accordingly, the EOR system 18 may include a fluid injection system 34, which has one or more tubulars 36 extending through a bore 38 in the earth 32 to the subterranean reservoir 20. For example, the EOR system 18 may route one or more fluids 40, such as gas, steam, water, chemicals, or any combination thereof, into the fluid injection system 34. For example, as discussed in further detail below, the EOR system 18 may be coupled to the turbine-based service system 14, such that the system 14 routes an exhaust gas 42 (e.g., substantially or entirely free of oxygen) to the EOR system 18 for use as the injection fluid 40. The fluid injection system 34 routes the fluid 40 (e.g., the exhaust gas 42) through the one or more tubulars 36 into the subterranean reservoir 20, as indicated by arrows 44. The injection fluid 40 enters the subterranean reservoir 20 through the tubular 36 at an offset distance 46 away from the tubular 28 of the oil/gas well 26. Accordingly, the injection fluid 40 displaces the oil/gas 48 disposed in the subterranean reservoir 20, and drives the oil/gas 48 up through the one or more tubulars 28 of the hydrocarbon production system 12, as indicated by arrows 50. As discussed in further detail below, the injection fluid 40 may include the exhaust gas 42 originating from the turbine-based service system 14, which is able to generate the exhaust gas 42 on-site as needed by the hydrocarbon production system 12. In other words, the turbine-based system 14 may simultaneously generate one or more services (e.g., electrical power, mechanical power, steam, water (e.g., desalinated water), and exhaust gas (e.g., substantially free of oxygen)) for use by the hydrocarbon production system 12, thereby reducing or eliminating the reliance on external sources of such services.

In the illustrated embodiment, the turbine-based service system 14 includes a stoichiometric exhaust gas recirculation (SEGR) gas turbine system 52 and an exhaust gas (EG) processing system 54. The gas turbine system 52 may be configured to operate in a stoichiometric combustion mode of operation (e.g., a stoichiometric control mode) and a non-stoichiometric combustion mode of operation (e.g., a non-stoichiometric control mode), such as a fuel-lean control mode or a fuel-rich control mode. In the stoichiometric control mode, the combustion generally occurs in a substantially stoichiometric ratio of a fuel and oxidant, thereby resulting in substantially stoichiometric combustion. In particular, stoichiometric combustion generally involves consuming substantially all of the fuel and oxidant in the combustion reaction, such that the products of combustion are substantially or entirely free of unburnt fuel and oxidant. One measure of stoichiometric combustion is the equivalence ratio, or phi ($\Phi$), which is the ratio of the actual fuel/oxidant ratio relative to the stoichiometric fuel/oxidant ratio. An equivalence ratio of greater than 1.0 results in a fuel-rich combustion of the fuel and oxidant, whereas an equivalence ratio of less than 1.0 results in a fuel-lean combustion of the fuel and oxidant. In contrast, an equivalence ratio of 1.0 results in combustion that is neither fuel-rich nor fuel-lean, thereby substantially consuming all of the fuel and oxidant in the combustion reaction. In context of the disclosed embodiments, the term stoichiometric or substantially stoichiometric may refer to an equivalence ratio of approximately 0.95 to approximately 1.05. However, the disclosed embodiments may also include an equivalence ratio of 1.0 plus or minus 0.01, 0.02, 0.03, 0.04, 0.05, or more. Again, the stoichiometric combustion of fuel and oxidant in the turbine-based service system 14 may result in products of combustion or exhaust gas (e.g., 42) with substantially no unburnt fuel or oxidant remaining. For example, the exhaust gas 42 may have less than 1, 2, 3, 4, or 5 percent by volume of oxidant (e.g., oxygen), unburnt fuel or hydrocarbons (e.g., HCs), nitrogen oxides (e.g., $NO_X$), carbon monoxide (CO), sulfur oxides (e.g., $SO_X$), hydrogen, and other products of incomplete combustion. By further example, the exhaust gas 42 may have less than approximately 10, 20, 30, 40, 50, 60, 70, 80, 90, 100, 200, 300, 400, 500, 1000, 2000, 3000, 4000, or 5000 parts per million by volume (ppmv) of oxidant (e.g., oxygen), unburnt fuel or hydrocarbons (e.g., HCs), nitrogen oxides (e.g., $NO_X$), carbon monoxide (CO), sulfur oxides (e.g., $SO_X$), hydrogen, and other products of incomplete combustion. However, the disclosed embodiments also may produce other ranges of residual fuel, oxidant, and other emissions levels in the exhaust gas 42. As used herein, the terms emissions, emissions levels, and emissions targets may refer to concentration levels of certain products of combustion (e.g., $NO_X$, CO, $SO_X$, $O_2$, $N_2$, $H_2$, HCs, etc.), which may be present in recirculated gas streams, vented gas streams (e.g., exhausted into the atmosphere), and gas streams used in various target systems (e.g., the hydrocarbon production system 12).

Although the SEGR gas turbine system 52 and the EG processing system 54 may include a variety of components in different embodiments, the illustrated EG processing system 54 includes a heat recovery steam generator (HRSG) 56 and an exhaust gas recirculation (EGR) system 58, which receive and process an exhaust gas 60 originating from the SEGR gas turbine system 52. The HRSG 56 may include one or more heat exchangers, condensers, and various heat recovery equipment, which collectively function to transfer heat from the exhaust gas 60 to a stream of water, thereby generating steam 62. The steam 62 may be used in one or more steam turbines, the EOR system 18, or any other portion of the hydrocarbon production system 12. For example, the HRSG 56 may generate low pressure, medium pressure, and/or high pressure steam 62, which may be selectively applied to low, medium, and high pressure steam turbine stages, or different applications of the EOR system 18. In addition to the steam 62, a treated water 64, such as a desalinated water, may be generated by the HRSG 56, the EGR system 58, and/or another portion of the EG processing system 54 or the SEGR gas turbine system 52. The treated water 64 (e.g., desalinated water) may be particularly useful in areas with water shortages, such as inland or desert regions. The treated water 64 may be generated, at least in part, due to the large volume of air driving combustion of fuel within the SEGR gas turbine system 52. While the on-site generation of steam 62 and water 64 may be beneficial in many applications (including the hydrocarbon production system 12), the on-site generation of exhaust gas 42, 60 may be particularly beneficial for the EOR system 18, due to its low oxygen content, high pressure, and heat derived from the SEGR gas turbine system 52. Accordingly, the HRSG 56, the EGR system 58, and/or another portion of the EG processing system 54 may output or recirculate an exhaust gas 66 into the SEGR gas turbine system 52, while also routing the exhaust gas 42 to the EOR system 18 for use with the hydrocarbon production system 12. Likewise, the exhaust gas 42 may be extracted directly from the SEGR gas turbine system 52 (i.e., without passing through the EG processing system 54) for use in the EOR system 18 of the hydrocarbon production system 12.

The exhaust gas recirculation is handled by the EGR system 58 of the EG processing system 54. For example, the EGR system 58 includes one or more conduits, valves, blowers, exhaust gas treatment systems (e.g., filters, particulate removal units, gas separation units, gas purification units, heat exchangers, heat recovery units, moisture removal units, catalyst units, chemical injection units, or any combination thereof), and controls to recirculate the exhaust gas along an exhaust gas circulation path from an output (e.g., discharged exhaust gas 60) to an input (e.g., intake exhaust gas 66) of the SEGR gas turbine system 52. In the illustrated embodiment, the SEGR gas turbine system 52 intakes the exhaust gas 66 into a compressor section having one or more compressors, thereby compressing the exhaust gas 66 for use in a combustor section along with an intake of an oxidant 68 and one or more fuels 70. The oxidant 68 may include ambient air, pure oxygen, oxygen-enriched air, oxygen-reduced air, oxygen-nitrogen mixtures, or any suitable oxidant that facilitates combustion of the fuel 70. The fuel 70 may include one or more gas fuels, liquid fuels, or any combination thereof. For example, the fuel 70 may include natural gas, liquefied natural gas (LNG), syngas, methane, ethane, propane, butane, naphtha, kerosene, diesel fuel, ethanol, methanol, biofuel, or any combination thereof.

The SEGR gas turbine system 52 mixes and combusts the exhaust gas 66, the oxidant 68, and the fuel 70 in the combustor section, thereby generating hot combustion gases or exhaust gas 60 to drive one or more turbine stages in a turbine section. In certain embodiments, each combustor in the combustor section includes one or more premix fuel nozzles, one or more diffusion fuel nozzles, or any combination thereof. For example, each premix fuel nozzle may be configured to mix the oxidant 68 and the fuel 70 internally within the fuel nozzle and/or partially upstream of the fuel nozzle, thereby injecting an oxidant-fuel mixture from the fuel nozzle into the combustion zone for a premixed combustion (e.g., a premixed flame). By further example, each diffusion fuel nozzle may be configured to isolate the flows of oxidant 68 and fuel 70 within the fuel nozzle, thereby separately injecting the oxidant 68 and the fuel 70 from the fuel nozzle into the combustion zone for diffusion combustion (e.g., a diffusion flame). In particular, the diffusion combustion provided by the diffusion fuel nozzles delays mixing of the oxidant 68 and the fuel 70 until the point of initial combustion, i.e., the flame region. In embodiments employing the diffusion fuel nozzles, the diffusion flame may provide increased flame stability, because the diffusion flame generally forms at the point of stoichiometry between the separate streams of oxidant 68 and fuel 70 (i.e., as the oxidant 68 and fuel 70 are mixing). In certain embodiments, one or more diluents (e.g., the exhaust gas 60, steam, nitrogen, or another inert gas) may be pre-mixed with the oxidant 68, the fuel 70, or both, in either the diffusion fuel nozzle or the premix fuel nozzle. In addition, one or more diluents (e.g., the exhaust gas 60, steam, nitrogen, or another inert gas) may be injected into the combustor at or downstream from the point of combustion within each combustor. The use of these diluents may help temper the flame (e.g., premix flame or diffusion flame), thereby helping to reduce $NO_X$ emissions, such as nitrogen monoxide (NO) and nitrogen dioxide ($NO_2$). Regardless of the type of flame, the combustion produces hot combustion gases or exhaust gas 60 to drive one or more turbine stages. As each turbine stage is driven by the exhaust gas 60, the SEGR gas turbine system 52 generates a mechanical power 72 and/or an electrical power 74 (e.g., via an electrical generator). The system 52 also outputs the exhaust gas 60, and may further output water 64. Again, the water 64 may be a treated water, such as a desalinated water, which may be useful in a variety of applications on-site or off-site.

Exhaust extraction is also provided by the SEGR gas turbine system 52 using one or more extraction points 76. For example, the illustrated embodiment includes an exhaust gas (EG) supply system 78 having an exhaust gas (EG) extraction system 80 and an exhaust gas (EG) treatment system 82, which receive exhaust gas 42 from the extraction points 76, treat the exhaust gas 42, and then supply or distribute the exhaust gas 42 to various target systems. The target systems may include the EOR system 18 and/or other systems, such as a pipeline 86, a storage tank 88, or a carbon sequestration system 90. The EG extraction system 80 may include one or more conduits, valves, controls, and flow separations, which facilitate isolation of the exhaust gas 42 from the oxidant 68, the fuel 70, and other contaminants, while also controlling the temperature, pressure, and flow rate of the extracted exhaust gas 42. The EG treatment system 82 may include one or more heat exchangers (e.g., heat recovery units such as heat recovery steam generators, condensers, coolers, or heaters), catalyst systems (e.g., oxidation catalyst systems), particulate and/or water removal systems (e.g., gas dehydration units, inertial separators, coalescing filters, water impermeable filters, and other filters), chemical injection systems, solvent based treatment systems (e.g., absorbers, flash tanks, etc.), carbon capture systems, gas separation systems, gas purification systems, and/or a solvent based treatment system, exhaust gas compressors, any combination thereof. These subsystems of the EG treatment system 82 enable control of the temperature, pressure, flow rate, moisture content (e.g., amount of water removal), particulate content (e.g., amount of particulate removal), and gas composition (e.g., percentage of $CO_2$, $N_2$, etc.).

The extracted exhaust gas 42 is treated by one or more subsystems of the EG treatment system 82, depending on the target system. For example, the EG treatment system 82 may direct all or part of the exhaust gas 42 through a carbon capture system, a gas separation system, a gas purification system, and/or a solvent based treatment system, which is controlled to separate and purify a carbonaceous gas (e.g., carbon dioxide) 92 and/or nitrogen ($N_2$) 94 for use in the various target systems. For example, embodiments of the EG treatment system 82 may perform gas separation and purification to produce a plurality of different streams 95 of exhaust gas 42, such as a first stream 96, a second stream 97, and a third stream 98. The first stream 96 may have a first composition that is rich in carbon dioxide and/or lean in nitrogen (e.g., a $CO_2$ rich, $N_2$ lean stream). The second stream 97 may have a second composition that has intermediate concentration levels of carbon dioxide and/or nitrogen (e.g., intermediate concentration $CO_2$, $N_2$ stream). The third stream 98 may have a third composition that is lean in carbon dioxide and/or rich in nitrogen (e.g., a $CO_2$ lean, $N_2$ rich stream). Each stream 95 (e.g., 96, 97, and 98) may include a gas dehydration unit, a filter, a gas compressor, or any combination thereof, to facilitate delivery of the stream 95 to a target system. In certain embodiments, the $CO_2$ rich, $N_2$ lean stream 96 may have a $CO_2$ purity or concentration level of greater than approximately 70, 75, 80, 85, 90, 95, 96, 97, 98, or 99 percent by volume, and a $N_2$ purity or concentration level of less than approximately 1, 2, 3, 4, 5, 10, 15, 20, 25, or 30 percent by volume. In contrast, the $CO_2$ lean, $N_2$ rich stream 98 may have a $CO_2$ purity or concentration level of less than approximately 1, 2, 3, 4, 5, 10, 15, 20, 25, or 30 percent by volume, and a $N_2$ purity or concentration level of greater than approximately 70, 75, 80, 85, 90, 95, 96, 97, 98, or 99 percent by volume. The intermediate concentration $CO_2$, $N_2$ stream 97 may have a $CO_2$ purity or concentration level and/or a $N_2$ purity or concentration level of between approximately 30 to 70, 35 to 65, 40 to 60, or 45 to 55 percent by volume. Although the foregoing ranges are merely non-limiting examples, the $CO_2$ rich, $N_2$ lean stream 96 and the $CO_2$ lean, $N_2$ rich stream 98 may be particularly well suited for use with the EOR system 18 and the other systems 84. However, any of these rich, lean, or intermediate concentration $CO_2$ streams 95 may be used, alone or in various combinations, with the EOR system 18 and the other systems 84. For example, the EOR system 18 and the other systems 84 (e.g., the pipeline 86, storage tank 88, and the carbon sequestration system 90) each may receive one or more $CO_2$ rich, $N_2$ lean streams 96, one or more $CO_2$ lean, $N_2$ rich streams 98, one or more intermediate concentration $CO_2$, $N_2$ streams 97, and one or more untreated exhaust gas 42 streams (i.e., bypassing the EG treatment system 82).

The EG extraction system 80 extracts the exhaust gas 42 at one or more extraction points 76 along the compressor section, the combustor section, and/or the turbine section, such that the exhaust gas 42 may be used in the EOR system 18 and other systems 84 at suitable temperatures and pressures. The EG extraction system 80 and/or the EG treatment system 82 also may circulate fluid flows (e.g., exhaust gas 42) to and from the EG processing system 54. For example, a portion of the exhaust gas 42 passing through the EG processing system 54 may be extracted by the EG extraction system 80 for use in the EOR system 18 and the other systems 84. In certain embodiments, the EG supply system 78 and the EG processing system 54 may be independent or integral with one another, and thus may use independent or common subsystems. For example, the EG treatment system 82 may be used by both the EG supply system 78 and the EG processing system 54. Exhaust gas 42 extracted from the EG processing system 54 may undergo multiple stages of gas treatment, such as one or more stages of gas treatment in the EG processing system 54 followed by one or more additional stages of gas treatment in the EG treatment system 82.

At each extraction point 76, the extracted exhaust gas 42 may be substantially free of oxidant 68 and fuel 70 (e.g., unburnt fuel or hydrocarbons) due to substantially stoichiometric combustion and/or gas treatment in the EG processing system 54. Furthermore, depending on the target system, the extracted exhaust gas 42 may undergo further treatment in the EG treatment system 82 of the EG supply system 78, thereby further reducing any residual oxidant 68, fuel 70, or other undesirable products of combustion. For example, either before or after treatment in the EG treatment system 82, the extracted exhaust gas 42 may have less than 1, 2, 3, 4, or 5 percent by volume of oxidant (e.g., oxygen), unburnt fuel or hydrocarbons (e.g., HCs), nitrogen oxides (e.g., $NO_X$), carbon monoxide (CO), sulfur oxides (e.g., $SO_X$), hydrogen, and other products of incomplete combustion. By further example, either before or after treatment in the EG treatment system 82, the extracted exhaust gas 42 may have less than approximately 10, 20, 30, 40, 50, 60, 70, 80, 90, 100, 200, 300, 400, 500, 1000, 2000, 3000, 4000, or 5000 parts per million by volume (ppmv) of oxidant (e.g., oxygen), unburnt fuel or hydrocarbons (e.g., HCs), nitrogen oxides (e.g., $NO_X$), carbon monoxide (CO), sulfur oxides (e.g., $SO_X$), hydrogen, and other products of incomplete combustion. Thus, the exhaust gas 42 is particularly well suited for use with the EOR system 18.

The EGR operation of the turbine system 52 specifically enables the exhaust extraction at a multitude of locations 76. For example, the compressor section of the system 52 may be used to compress the exhaust gas 66 without any oxidant 68 (i.e., only compression of the exhaust gas 66), such that a substantially oxygen-free exhaust gas 42 may be extracted from the compressor section and/or the combustor section prior to entry of the oxidant 68 and the fuel 70. The extraction points 76 may be located at interstage ports between adjacent compressor stages, at ports along the compressor discharge casing, at ports along each combustor in the combustor section, or any combination thereof. In certain embodiments, the exhaust gas 66 may not mix with the oxidant 68 and fuel 70 until it reaches the head end portion and/or fuel nozzles of each combustor in the combustor section. Furthermore, one or more flow separators (e.g., walls, dividers, baffles, or the like) may be used to isolate the oxidant 68 and the fuel 70 from the extraction points 76. With these flow separators, the extraction points 76 may be disposed directly along a wall of each combustor in the combustor section.

Once the exhaust gas 66, oxidant 68, and fuel 70 flow through the head end portion (e.g., through fuel nozzles) into the combustion portion (e.g., combustion chamber) of each combustor, the SEGR gas turbine system 52 is controlled to provide a substantially stoichiometric combustion of the exhaust gas 66, oxidant 68, and fuel 70. For example, the system 52 may maintain an equivalence ratio of approximately 0.95 to approximately 1.05. As a result, the products of combustion of the mixture of exhaust gas 66, oxidant 68, and fuel 70 in each combustor is substantially free of oxygen and unburnt fuel. Thus, the products of combustion (or exhaust gas) may be extracted from the turbine section of the SEGR gas turbine system 52 for use as the exhaust gas 42 routed to the EOR system 18. Along the turbine section, the extraction points 76 may be located at any turbine stage, such as interstage ports between adjacent turbine stages. Thus, using any of the foregoing extraction points 76, the turbine-based service system 14 may generate, extract, and deliver the exhaust gas 42 to the hydrocarbon production system 12 (e.g., the EOR system 18) for use in the production of oil/gas 48 from the subterranean reservoir 20.

FIG. 2 is a diagram of an embodiment of the system 10 of FIG. 1, illustrating a control system 100 coupled to the turbine-based service system 14 and the hydrocarbon production system 12. In the illustrated embodiment, the turbine-based service system 14 includes a combined cycle system 102, which includes the SEGR gas turbine system 52 as a topping cycle, a steam turbine 104 as a bottoming cycle, and the HRSG 56 to recover heat from the exhaust gas 60 to generate the steam 62 for driving the steam turbine 104. Again, the SEGR gas turbine system 52 receives, mixes, and stoichiometrically combusts the exhaust gas 66, the oxidant 68, and the fuel 70 (e.g., premix and/or diffusion flames), thereby producing the exhaust gas 60, the mechanical power 72, the electrical power 74, and/or the water 64. For example, the SEGR gas turbine system 52 may drive one or more loads or machinery 106, such as an electrical generator, an oxidant compressor (e.g., a main air compressor), a gear box, a pump, equipment of the hydrocarbon production system 12, or any combination thereof. In some embodiments, the machinery 106 may include other drives, such as electrical motors or steam turbines (e.g., the steam turbine 104), in tandem with the SEGR gas turbine system 52. Accordingly, an output of the machinery 106 driven by the SEGR gas turbines system 52 (and any additional drives) may include the mechanical power 72 and the electrical power 74. The mechanical power 72 and/or the electrical power 74 may be used on-site for powering the hydrocarbon production system 12, the electrical power 74 may be distributed to the power grid, or any combination thereof. The output of the machinery 106 also may include a compressed fluid, such as a compressed oxidant 68 (e.g., air or oxygen), for intake into the combustion section of the SEGR gas turbine system 52. Each of these outputs (e.g., the exhaust gas 60, the mechanical power 72, the electrical power 74, and/or the water 64) may be considered a service of the turbine-based service system 14.

The SEGR gas turbine system 52 produces the exhaust gas 42, 60, which may be substantially free of oxygen, and routes this exhaust gas 42, 60 to the EG processing system 54 and/or the EG supply system 78. The EG supply system 78 may treat and delivery the exhaust gas 42 (e.g., streams 95) to the hydrocarbon production system 12 and/or the other systems 84. As discussed above, the EG processing system 54 may include the HRSG 56 and the EGR system 58. The HRSG 56 may include one or more heat exchangers, condensers, and various heat recovery equipment, which may be used to recover or transfer heat from the exhaust gas 60 to water 108 to generate the steam 62 for driving the steam turbine 104. Similar to the SEGR gas turbine system 52, the steam turbine 104 may drive one or more loads or machinery 106, thereby generating the mechanical power 72 and the electrical power 74. In the illustrated embodiment, the SEGR gas turbine system 52 and the steam turbine 104 are arranged in tandem to drive the same machinery 106. However, in other embodiments, the SEGR gas turbine system 52 and the steam turbine 104 may separately drive different machinery 106 to independently generate mechanical power 72 and/or electrical power 74. As the steam turbine 104 is driven by the steam 62 from the HRSG 56, the steam 62 gradually decreases in temperature and pressure. Accordingly, the steam turbine 104 recirculates the used steam 62 and/or water 108 back into the HRSG 56 for additional steam generation via heat recovery from the exhaust gas 60. In addition to steam generation, the HRSG 56, the EGR system 58, and/or another portion of the EG processing system 54 may produce the water 64, the exhaust gas 42 for use with the hydrocarbon production system 12, and the exhaust gas 66 for use as an input into the SEGR gas turbine system 52. For example, the water 64 may be a treated water 64, such as a desalinated water for use in other applications. The desalinated water may be particularly useful in regions of low water availability. Regarding the exhaust gas 60, embodiments of the EG processing system 54 may be configured to recirculate the exhaust gas 60 through the EGR system 58 with or without passing the exhaust gas 60 through the HRSG 56.

In the illustrated embodiment, the SEGR gas turbine system 52 has an exhaust recirculation path 110, which extends from an exhaust outlet to an exhaust inlet of the system 52. Along the path 110, the exhaust gas 60 passes through the EG processing system 54, which includes the HRSG 56 and the EGR system 58 in the illustrated embodiment. The EGR system 58 may include one or more conduits, valves, blowers, gas treatment systems (e.g., filters, particulate removal units, gas separation units, gas purification units, heat exchangers, heat recovery units such as heat recovery steam generators, moisture removal units, catalyst units, chemical injection units, or any combination thereof) in series and/or parallel arrangements along the path 110. In other words, the EGR system 58 may include any flow control components, pressure control components, temperature control components, moisture control components, and gas composition control components along the exhaust recirculation path 110 between the exhaust outlet and the exhaust inlet of the system 52. Accordingly, in embodiments with the HRSG 56 along the path 110, the HRSG 56 may be considered a component of the EGR system 58. However, in certain embodiments, the HRSG 56 may be disposed along an exhaust path independent from the exhaust recirculation path 110. Regardless of whether the HRSG 56 is along a separate path or a common path with the EGR system 58, the HRSG 56 and the EGR system 58 intake the exhaust gas 60 and output either the recirculated exhaust gas 66, the exhaust gas 42 for use with the EG supply system 78 (e.g., for the hydrocarbon production system 12 and/or other systems 84), or another output of exhaust gas. Again, the SEGR gas turbine system 52 intakes, mixes, and stoichiometrically combusts the exhaust gas 66, the oxidant 68, and the fuel 70 (e.g., premixed and/or diffusion flames) to produce a substantially oxygen-free and fuel-free exhaust gas 60 for distribution to the EG processing system 54, the hydrocarbon production system 12, or other systems 84.

As noted above with reference to FIG. 1, the hydrocarbon production system 12 may include a variety of equipment to facilitate the recovery or production of oil/gas 48 from a subterranean reservoir 20 through an oil/gas well 26. For example, the hydrocarbon production system 12 may include the EOR system 18 having the fluid injection system 34. In the illustrated embodiment, the fluid injection system 34 includes an exhaust gas injection EOR system 112 and a steam injection EOR system 114. Although the fluid injection system 34 may receive fluids from a variety of sources, the illustrated embodiment may receive the exhaust gas 42 and the steam 62 from the turbine-based service system 14. The exhaust gas 42 and/or the steam 62 produced by the turbine-based service system 14 also may be routed to the hydrocarbon production system 12 for use in other oil/gas systems 116.

The quantity, quality, and flow of the exhaust gas 42 and/or the steam 62 may be controlled by the control system 100. The control system 100 may be dedicated entirely to the turbine-based service system 14, or the control system 100 may optionally also provide control (or at least some data to facilitate control) for the hydrocarbon production system 12 and/or other systems 84. In the illustrated embodiment, the control system 100 includes a controller 118 having a processor 120, a memory 122, a steam turbine control 124, a SEGR gas turbine system control 126, and a machinery control 128. The processor 120 may include a single processor or two or more redundant processors, such as triple redundant processors for control of the turbine-based service system 14. The memory 122 may include volatile and/or non-volatile memory. For example, the memory 122 may include one or more hard drives, flash memory, read-only memory, random access memory, or any combination thereof. The controls 124, 126, and 128 may include software and/or hardware controls. For example, the controls 124, 126, and 128 may include various instructions or code stored on the memory 122 and executable by the processor 120. The control 124 is configured to control operation of the steam turbine 104, the SEGR gas turbine system control 126 is configured to control the system 52, and the machinery control 128 is configured to control the machinery 106. Thus, the controller 118 (e.g., controls 124, 126, and 128) may be configured to coordinate various sub-systems of the turbine-based service system 14 to provide a suitable stream of the exhaust gas 42 to the hydrocarbon production system 12.

In certain embodiments of the control system 100, each element (e.g., system, subsystem, and component) illustrated in the drawings or described herein includes (e.g., directly within, upstream, or downstream of such element) one or more industrial control features, such as sensors and control devices, which are communicatively coupled with one another over an industrial control network along with the controller 118. For example, the control devices associated with each element may include a dedicated device controller (e.g., including a processor, memory, and control instructions), one or more actuators, valves, switches, and industrial control equipment, which enable control based on sensor feedback 130, control signals from the controller 118, control signals from a user, or any combination thereof. Thus, any of the control functionality described herein may be implemented with control instructions stored and/or executable by the controller 118, dedicated device controllers associated with each element, or a combination thereof.

In order to facilitate such control functionality, the control system 100 includes one or more sensors distributed throughout the system 10 to obtain the sensor feedback 130 for use in execution of the various controls, e.g., the controls 124, 126, and 128. For example, the sensor feedback 130 may be obtained from sensors distributed throughout the SEGR gas turbine system 52, the machinery 106, the EG processing system 54, the steam turbine 104, the hydrocarbon production system 12, or any other components throughout the turbine-based service system 14 or the hydrocarbon production system 12. For example, the sensor feedback 130 may include temperature feedback, pressure feedback, flow rate feedback, flame temperature feedback, combustion dynamics feedback, intake oxidant composition feedback, intake fuel composition feedback, exhaust composition feedback, the output level of mechanical power 72, the output level of electrical power 74, the output quantity of the exhaust gas 42, 60, the output quantity or quality of the water 64, or any combination thereof. For example, the sensor feedback 130 may include a composition of the exhaust gas 42, 60 to facilitate stoichiometric combustion in the SEGR gas turbine system 52. For example, the sensor feedback 130 may include feedback from one or more intake oxidant sensors along an oxidant supply path of the oxidant 68, one or more intake fuel sensors along a fuel supply path of the fuel 70, and one or more exhaust emissions sensors disposed along the exhaust recirculation path 110 and/or within the SEGR gas turbine system 52. The intake oxidant sensors, intake fuel sensors, and exhaust emissions sensors may include temperature sensors, pressure sensors, flow rate sensors, and composition sensors. The emissions sensors may includes sensors for nitrogen oxides (e.g., $NO_X$ sensors), carbon oxides (e.g., CO sensors and $CO_2$ sensors), sulfur oxides (e.g., $SO_X$ sensors), hydrogen (e.g., $H_2$ sensors), oxygen (e.g., $O_2$ sensors), unburnt hydrocarbons (e.g., HC sensors), or other products of incomplete combustion, or any combination thereof.

Using this feedback 130, the control system 100 may adjust (e.g., increase, decrease, or maintain) the intake flow of exhaust gas 66, oxidant 68, and/or fuel 70 into the SEGR gas turbine system 52 (among other operational parameters) to maintain the equivalence ratio within a suitable range, e.g., between approximately 0.95 to approximately 1.05, between approximately 0.95 to approximately 1.0, between approximately 1.0 to approximately 1.05, or substantially at 1.0. For example, the control system 100 may analyze the feedback 130 to monitor the exhaust emissions (e.g., concentration levels of nitrogen oxides, carbon oxides such as CO and $CO_2$, sulfur oxides, hydrogen, oxygen, unburnt hydrocarbons, and other products of incomplete combustion) and/or determine the equivalence ratio, and then control one or more components to adjust the exhaust emissions (e.g., concentration levels in the exhaust gas 42) and/or the equivalence ratio. The controlled components may include any of the components illustrated and described with reference to the drawings, including but not limited to, valves along the supply paths for the oxidant 68, the fuel 70, and the exhaust gas 66; an oxidant compressor, a fuel pump, or any components in the EG processing system 54; any components of the SEGR gas turbine system 52, or any combination thereof. The controlled components may adjust (e.g., increase, decrease, or maintain) the flow rates, temperatures, pressures, or percentages (e.g., equivalence ratio) of the oxidant 68, the fuel 70, and the exhaust gas 66 that combust within the SEGR gas turbine system 52. The controlled components also may include one or more gas treatment systems, such as catalyst units (e.g., oxidation catalyst units), supplies for the catalyst units (e.g., oxidation fuel, heat, electricity, etc.), gas purification and/or separation units (e.g., solvent based separators, absorbers, flash tanks, etc.), and filtration units. The gas treatment systems may help reduce various exhaust emissions along the exhaust recirculation path 110, a vent path (e.g., exhausted into the atmosphere), or an extraction path to the EG supply system 78.

In certain embodiments, the control system 100 may analyze the feedback 130 and control one or more components to maintain or reduce emissions levels (e.g., concentration levels in the exhaust gas 42, 60, 95) to a target range, such as less than approximately 10, 20, 30, 40, 50, 100, 200, 300, 400, 500, 1000, 2000, 3000, 4000, 5000, or 10000 parts per million by volume (ppmv). These target ranges may be the same or different for each of the exhaust emissions, e.g., concentration levels of nitrogen oxides, carbon monoxide, sulfur oxides, hydrogen, oxygen, unburnt hydrocarbons, and other products of incomplete combustion. For example, depending on the equivalence ratio, the control system 100 may selectively control exhaust emissions (e.g., concentration levels) of oxidant (e.g., oxygen) within a target range of less than approximately 10, 20, 30, 40, 50, 60, 70, 80, 90, 100, 250, 500, 750, or 1000 ppmv; carbon monoxide (CO) within a target range of less than approximately 20, 50, 100, 200, 500, 1000, 2500, or 5000 ppmv; and nitrogen oxides ($NO_X$) within a target range of less than approximately 50, 100, 200, 300, 400, or 500 ppmv. In certain embodiments operating with a substantially stoichiometric equivalence ratio, the control system 100 may selectively control exhaust emissions (e.g., concentration levels) of oxidant (e.g., oxygen) within a target range of less than approximately 10, 20, 30, 40, 50, 60, 70, 80, 90, or 100 ppmv; and carbon monoxide (CO) within a target range of less than approximately 500, 1000, 2000, 3000, 4000, or 5000 ppmv. In certain embodiments operating with a fuel-lean equivalence ratio (e.g., between approximately 0.95 to 1.0), the control system 100 may selectively control exhaust emissions (e.g., concentration levels) of oxidant (e.g., oxygen) within a target range of less than approximately 500, 600, 700, 800, 900, 1000, 1100, 1200, 1300, 1400, or 1500 ppmv; carbon monoxide (CO) within a target range of less than approximately 10, 20, 30, 40, 50, 60, 70, 80, 90, 100, 150, or 200 ppmv; and nitrogen oxides (e.g., $NO_x$) within a target range of less than approximately 50, 100, 150, 200, 250, 300, 350, or 400 ppmv. The foregoing target ranges are merely examples, and are not intended to limit the scope of the disclosed embodiments.

The control system 100 also may be coupled to a local interface 132 and a remote interface 134. For example, the local interface 132 may include a computer workstation disposed on-site at the turbine-based service system 14 and/or the hydrocarbon production system 12. In contrast, the remote interface 134 may include a computer workstation disposed off-site from the turbine-based service system 14 and the hydrocarbon production system 12, such as through an internet connection. These interfaces 132 and 134 facilitate monitoring and control of the turbine-based service system 14, such as through one or more graphical displays of sensor feedback 130, operational parameters, and so forth.

Again, as noted above, the controller 118 includes a variety of controls 124, 126, and 128 to facilitate control of the turbine-based service system 14. The steam turbine control 124 may receive the sensor feedback 130 and output control commands to facilitate operation of the steam turbine 104. For example, the steam turbine control 124 may receive the sensor feedback 130 from the HRSG 56, the machinery 106, temperature and pressure sensors along a path of the steam 62, temperature and pressure sensors along a path of the water 108, and various sensors indicative of the mechanical power 72 and the electrical power 74. Likewise, the SEGR gas turbine system control 126 may receive sensor feedback 130 from one or more sensors disposed along the SEGR gas turbine system 52, the machinery 106, the EG processing system 54, or any combination thereof. For example, the sensor feedback 130 may be obtained from temperature sensors, pressure sensors, clearance sensors, vibration sensors, flame sensors, fuel composition sensors, exhaust gas composition sensors, or any combination thereof, disposed within or external to the SEGR gas turbine system 52. Finally, the machinery control 128 may receive sensor feedback 130 from various sensors associated with the mechanical power 72 and the electrical power 74, as well as sensors disposed within the machinery 106. Each of these controls 124, 126, and 128 uses the sensor feedback 130 to improve operation of the turbine-based service system 14.

In the illustrated embodiment, the SEGR gas turbine system control 126 may execute instructions to control the quantity and quality of the exhaust gas 42, 60, 95 in the EG processing system 54, the EG supply system 78, the hydrocarbon production system 12, and/or the other systems 84. For example, the SEGR gas turbine system control 126 may maintain a level of oxidant (e.g., oxygen) and/or unburnt fuel in the exhaust gas 60 below a threshold suitable for use with the exhaust gas injection EOR system 112. In certain embodiments, the threshold levels may be less than 1, 2, 3, 4, or 5 percent of oxidant (e.g., oxygen) and/or unburnt fuel by volume of the exhaust gas 42, 60; or the threshold levels of oxidant (e.g., oxygen) and/or unburnt fuel (and other exhaust emissions) may be less than approximately 10, 20, 30, 40, 50, 60, 70, 80, 90, 100, 200, 300, 400, 500, 1000, 2000, 3000, 4000, or 5000 parts per million by volume (ppmv) in the exhaust gas 42, 60. By further example, in order to achieve these low levels of oxidant (e.g., oxygen) and/or unburnt fuel, the SEGR gas turbine system control 126 may maintain an equivalence ratio for combustion in the SEGR gas turbine system 52 between approximately 0.95 and approximately 1.05. The SEGR gas turbine system control 126 also may control the EG extraction system 80 and the EG treatment system 82 to maintain the temperature, pressure, flow rate, and gas composition of the exhaust gas 42, 60, 95 within suitable ranges for the exhaust gas injection EOR system 112, the pipeline 86, the storage tank 88, and the carbon sequestration system 90. As discussed above, the EG treatment system 82 may be controlled to purify and/or separate the exhaust gas 42 into one or more gas streams 95, such as the $CO_2$ rich, $N_2$ lean stream 96, the intermediate concentration $CO_2$, $N_2$ stream 97, and the $CO_2$ lean, $N_2$ rich stream 98. In addition to controls for the exhaust gas 42, 60, and 95, the controls 124, 126, and 128 may execute one or more instructions to maintain the mechanical power 72 within a suitable power range, or maintain the electrical power 74 within a suitable frequency and power range.

FIG. 3 is a diagram of embodiment of the system 10, further illustrating details of the SEGR gas turbine system 52 for use with the hydrocarbon production system 12 and/or other systems 84. In the illustrated embodiment, the SEGR gas turbine system 52 includes a gas turbine engine 150 coupled to the EG processing system 54. The illustrated gas turbine engine 150 includes a compressor section 152, a combustor section 154, and an expander section or turbine section 156. The compressor section 152 includes one or more exhaust gas compressors or compressor stages 158, such as 1 to 20 stages of rotary compressor blades disposed in a series arrangement. Likewise, the combustor section 154 includes one or more combustors 160, such as 1 to 20 combustors 160 distributed circumferentially about a rotational axis 162 of the SEGR gas turbine system 52. Furthermore, each combustor 160 may include one or more fuel nozzles 164 configured to inject the exhaust gas 66, the oxidant 68, and/or the fuel 70. For example, a head end portion 166 of each combustor 160 may house 1, 2, 3, 4, 5, 6, or more fuel nozzles 164, which may inject streams or mixtures of the exhaust gas 66, the oxidant 68, and/or the fuel 70 into a combustion portion 168 (e.g., combustion chamber) of the combustor 160.

The fuel nozzles 164 may include any combination of premix fuel nozzles 164 (e.g., configured to premix the oxidant 68 and fuel 70 for generation of an oxidant/fuel premix flame) and/or diffusion fuel nozzles 164 (e.g., configured to inject separate flows of the oxidant 68 and fuel 70 for generation of an oxidant/fuel diffusion flame). Embodiments of the premix fuel nozzles 164 may include swirl vanes, mixing chambers, or other features to internally mix the oxidant 68 and fuel 70 within the nozzles 164, prior to injection and combustion in the combustion chamber 168. The premix fuel nozzles 164 also may receive at least some partially mixed oxidant 68 and fuel 70. In certain embodiments, each diffusion fuel nozzle 164 may isolate flows of the oxidant 68 and the fuel 70 until the point of injection, while also isolating flows of one or more diluents (e.g., the exhaust gas 66, steam, nitrogen, or another inert gas) until the point of injection. In other embodiments, each diffusion fuel nozzle 164 may isolate flows of the oxidant 68 and the fuel 70 until the point of injection, while partially mixing one or more diluents (e.g., the exhaust gas 66, steam, nitrogen, or another inert gas) with the oxidant 68 and/or the fuel 70 prior to the point of injection. In addition, one or more diluents (e.g., the exhaust gas 66, steam, nitrogen, or another inert gas) may be injected into the combustor (e.g., into the hot products of combustion) either at or downstream from the combustion zone, thereby helping to reduce the temperature of the hot products of combustion and reduce emissions of $NO_X$ (e.g., NO and $NO_2$). Regardless of the type of fuel nozzle 164, the SEGR gas turbine system 52 may be controlled to provide substantially stoichiometric combustion of the oxidant 68 and fuel 70.

In diffusion combustion embodiments using the diffusion fuel nozzles 164, the fuel 70 and oxidant 68 generally do not mix upstream from the diffusion flame, but rather the fuel 70 and oxidant 68 mix and react directly at the flame surface and/or the flame surface exists at the location of mixing between the fuel 70 and oxidant 68. In particular, the fuel 70 and oxidant 68 separately approach the flame surface (or diffusion boundary/interface), and then diffuse (e.g., via molecular and viscous diffusion) along the flame surface (or diffusion boundary/interface) to generate the diffusion flame. It is noteworthy that the fuel 70 and oxidant 68 may be at a substantially stoichiometric ratio along this flame surface (or diffusion boundary/interface), which may result in a greater flame temperature (e.g., a peak flame temperature) along this flame surface. The stoichiometric fuel/oxidant ratio generally results in a greater flame temperature (e.g., a peak flame temperature), as compared with a fuel-lean or fuel-rich fuel/oxidant ratio. As a result, the diffusion flame may be substantially more stable than a premix flame, because the diffusion of fuel 70 and oxidant 68 helps to maintain a stoichiometric ratio (and greater temperature) along the flame surface. Although greater flame temperatures can also lead to greater exhaust emissions, such as $NO_X$ emissions, the disclosed embodiments use one or more diluents to help control the temperature and emissions while still avoiding any premixing of the fuel 70 and oxidant 68. For example, the disclosed embodiments may introduce one or more diluents separate from the fuel 70 and oxidant 68 (e.g., after the point of combustion and/or downstream from the diffusion flame), thereby helping to reduce the temperature and reduce the emissions (e.g., $NO_X$ emissions) produced by the diffusion flame.

In operation, as illustrated, the compressor section 152 receives and compresses the exhaust gas 66 from the EG processing system 54, and outputs a compressed exhaust gas 170 to each of the combustors 160 in the combustor section 154. Upon combustion of the fuel 60, oxidant 68, and exhaust gas 170 within each combustor 160, additional exhaust gas or products of combustion 172 (i.e., combustion gas) is routed into the turbine section 156. Similar to the compressor section 152, the turbine section 156 includes one or more turbines or turbine stages 174, which may include a series of rotary turbine blades. These turbine blades are then driven by the products of combustion 172 generated in the combustor section 154, thereby driving rotation of a shaft 176 coupled to the machinery 106. Again, the machinery 106 may include a variety of equipment coupled to either end of the SEGR gas turbine system 52, such as machinery 106, 178 coupled to the turbine section 156 and/or machinery 106, 180 coupled to the compressor section 152. In certain embodiments, the machinery 106, 178, 180 may include one or more electrical generators, oxidant compressors for the oxidant 68, fuel pumps for the fuel 70, gear boxes, or additional drives (e.g. steam turbine 104, electrical motor, etc.) coupled to the SEGR gas turbine system 52. Non-limiting examples are discussed in further detail below with reference to TABLE 1. As illustrated, the turbine section 156 outputs the exhaust gas 60 to recirculate along the exhaust recirculation path 110 from an exhaust outlet 182 of the turbine section 156 to an exhaust inlet 184 into the compressor section 152. Along the exhaust recirculation path 110, the exhaust gas 60 passes through the EG processing system 54 (e.g., the HRSG 56 and/or the EGR system 58) as discussed in detail above.

Again, each combustor 160 in the combustor section 154 receives, mixes, and stoichiometrically combusts the compressed exhaust gas 170, the oxidant 68, and the fuel 70 to produce the additional exhaust gas or products of combustion 172 to drive the turbine section 156. In certain embodiments, the oxidant 68 is compressed by an oxidant compression system 186, such as a main oxidant compression (MOC) system (e.g., a main air compression (MAC) system) having one or more oxidant compressors (MOCs). The oxidant compression system 186 includes an oxidant compressor 188 coupled to a drive 190. For example, the drive 190 may include an electric motor, a combustion engine, or any combination thereof. In certain embodiments, the drive 190 may be a turbine engine, such as the gas turbine engine 150. Accordingly, the oxidant compression system 186 may be an integral part of the machinery 106. In other words, the compressor 188 may be directly or indirectly driven by the mechanical power 72 supplied by the shaft 176 of the gas turbine engine 150. In such an embodiment, the drive 190 may be excluded, because the compressor 188 relies on the power output from the turbine engine 150. However, in certain embodiments employing more than one oxidant compressor is employed, a first oxidant compressor (e.g., a low pressure (LP) oxidant compressor) may be driven by the drive 190 while the shaft 176 drives a second oxidant compressor (e.g., a high pressure (HP) oxidant compressor), or vice versa. For example, in another embodiment, the HP MOC is driven by the drive 190 and the LP oxidant compressor is driven by the shaft 176. In the illustrated embodiment, the oxidant compression system 186 is separate from the machinery 106. In each of these embodiments, the compression system 186 compresses and supplies the oxidant 68 to the fuel nozzles 164 and the combustors 160. Accordingly, some or all of the machinery 106, 178, 180 may be configured to increase the operational efficiency of the compression system 186 (e.g., the compressor 188 and/or additional compressors).

The variety of components of the machinery 106, indicated by element numbers 106A, 106B, 106C, 106D, 106E, and 106F, may be disposed along the line of the shaft 176 and/or parallel to the line of the shaft 176 in one or more series arrangements, parallel arrangements, or any combination of series and parallel arrangements. For example, the machinery 106, 178, 180 (e.g., 106A through 106F) may include any series and/or parallel arrangement, in any order, of: one or more gearboxes (e.g., parallel shaft, epicyclic gearboxes), one or more compressors (e.g., oxidant compressors, booster compressors such as EG booster compressors), one or more power generation units (e.g., electrical generators), one or more drives (e.g., steam turbine engines, electrical motors), heat exchange units (e.g., direct or indirect heat exchangers), clutches, or any combination thereof. The compressors may include axial compressors, radial or centrifugal compressors, or any combination thereof, each having one or more compression stages. Regarding the heat exchangers, direct heat exchangers may include spray coolers (e.g., spray intercoolers), which inject a liquid spray into a gas flow (e.g., oxidant flow) for direct cooling of the gas flow. Indirect heat exchangers may include at least one wall (e.g., a shell and tube heat exchanger) separating first and second flows, such as a fluid flow (e.g., oxidant flow) separated from a coolant flow (e.g., water, air, refrigerant, or any other liquid or gas coolant), wherein the coolant flow transfers heat from the fluid flow without any direct contact. Examples of indirect heat exchangers include intercooler heat exchangers and heat recovery units, such as heat recovery steam generators. The heat exchangers also may include heaters. As discussed in further detail below, each of these machinery components may be used in various combinations as indicated by the non-limiting examples set forth in TABLE 1.

Generally, the machinery 106, 178, 180 may be configured to increase the efficiency of the compression system 186 by, for example, adjusting operational speeds of one or more oxidant compressors in the system 186, facilitating compression of the oxidant 68 through cooling, and/or extraction of surplus power. The disclosed embodiments are intended to include any and all permutations of the foregoing components in the machinery 106, 178, 180 in series and parallel arrangements, wherein one, more than one, all, or none of the components derive power from the shaft 176. As illustrated below, TABLE 1 depicts some non-limiting examples of arrangements of the machinery 106, 178, 180 disposed proximate and/or coupled to the compressor and turbine sections 152, 156.

TABLE 1

| 106A | 106B | 106C | 106D | 106E | 106F |
|------|------|------|------|------|------|
| MOC  | GEN  |      |      |      |      |
| MOC  | GBX  | GEN  |      |      |      |
| LP MOC | HP MOC | GEN |    |      |      |
| HP MOC | GBX | LP MOC | GEN |    |      |
| MOC MOC | GBX | GEN |     |      |      |
| HP MOC | GBX | GEN | LP MOC |  |      |
| MOC  | GBX  | GEN  |      |      |      |
| MOC  | GBX  | DRV  |      |      |      |
| DRV  | GBX  | LP MOC | HP MOC | GBX | GEN |
| DRV  | GBX  | HP MOC | LP MOC | GEN |    |
| HP MOC | GBX CLR | LP MOC | GEN |    |      |
| HP MOC | GBX CLR | LP MOC | GBX | GEN |    |
| HP MOC | GBX HTR STGN | LP MOC | GEN |  |    |
| MOC  | GEN  | DRV  |      |      |      |
| MOC  | DRV  | GEN  |      |      |      |
| DRV  | MOC  | GEN  |      |      |      |
| DRV  | CLU  | MOC  | GEN  |      |      |
| DRV  | CLU  | MOC  | GBX  | GEN  |      |

As illustrated above in TABLE 1, a cooling unit is represented as CLR, a clutch is represented as CLU, a drive is represented by DRV, a gearbox is represented as GBX, a generator is represented by GEN, a heating unit is represented by HTR, a main oxidant compressor unit is represented by MOC, with low pressure and high pressure variants being represented as LP MOC and HP MOC, respectively, and a steam generator unit is represented as STGN. Although TABLE 1 illustrates the machinery 106, 178, 180 in sequence toward the compressor section 152 or the turbine section 156, TABLE 1 is also intended to cover the reverse sequence of the machinery 106, 178, 180. In TABLE 1, any cell including two or more components is intended to cover a parallel arrangement of the components. TABLE 1 is not intended to exclude any non-illustrated permutations of the machinery 106, 178, 180. These components of the machinery 106, 178, 180 may enable feedback control of temperature, pressure, and flow rate of the oxidant 68 sent to the gas turbine engine 150. As discussed in further detail below, the oxidant 68 and the fuel 70 may be supplied to the gas turbine engine 150 at locations specifically selected to facilitate isolation and extraction of the compressed exhaust gas 170 without any oxidant 68 or fuel 70 degrading the quality of the exhaust gas 170.

The EG supply system 78, as illustrated in FIG. 3, is disposed between the gas turbine engine 150 and the target systems (e.g., the hydrocarbon production system 12 and the other systems 84). In particular, the EG supply system 78, e.g., the EG extraction system (EGES) 80), may be coupled to the gas turbine engine 150 at one or more extraction points 76 along the compressor section 152, the combustor section 154, and/or the turbine section 156. For example, the extraction points 76 may be located between adjacent compressor stages, such as 2, 3, 4, 5, 6, 7, 8, 9, or 10 interstage extraction points 76 between compressor stages. Each of these interstage extraction points 76 provides a different temperature and pressure of the extracted exhaust gas 42. Similarly, the extraction points 76 may be located between adjacent turbine stages, such as 2, 3, 4, 5, 6, 7, 8, 9, or 10 interstage extraction points 76 between turbine stages. Each of these interstage extraction points 76 provides a different temperature and pressure of the extracted exhaust gas 42. By further example, the extraction points 76 may be located at a multitude of locations throughout the combustor section 154, which may provide different temperatures, pressures, flow rates, and gas compositions. Each of these extraction points 76 may include an EG extraction conduit, one or more valves, sensors, and controls, which may be used to selectively control the flow of the extracted exhaust gas 42 to the EG supply system 78.

The extracted exhaust gas 42, which is distributed by the EG supply system 78, has a controlled composition suitable for the target systems (e.g., the hydrocarbon production system 12 and the other systems 84). For example, at each of these extraction points 76, the exhaust gas 170 may be substantially isolated from injection points (or flows) of the oxidant 68 and the fuel 70. In other words, the EG supply system 78 may be specifically designed to extract the exhaust gas 170 from the gas turbine engine 150 without any added oxidant 68 or fuel 70. Furthermore, in view of the stoichiometric combustion in each of the combustors 160, the extracted exhaust gas 42 may be substantially free of oxygen and fuel. The EG supply system 78 may route the extracted exhaust gas 42 directly or indirectly to the hydrocarbon production system 12 and/or other systems 84 for use in various processes, such as enhanced oil recovery, carbon sequestration, storage, or transport to an offsite location. However, in certain embodiments, the EG supply system 78 includes the EG treatment system (EGTS) 82 for further treatment of the exhaust gas 42, prior to use with the target systems. For example, the EG treatment system 82 may purify and/or separate the exhaust gas 42 into one or more streams 95, such as the $CO_2$ rich, $N_2$ lean stream 96, the intermediate concentration $CO_2$, $N_2$ stream 97, and the $CO_2$ lean, $N_2$ rich stream 98. These treated exhaust gas streams 95 may be used individually, or in any combination, with the hydrocarbon production system 12 and the other systems 84 (e.g., the pipeline 86, the storage tank 88, and the carbon sequestration system 90).

Similar to the exhaust gas treatments performed in the EG supply system 78, the EG processing system 54 may include a plurality of exhaust gas (EG) treatment components 192, such as indicated by element numbers 194, 196, 198, 200, 202, 204, 206, 208, and 210. These EG treatment components 192 (e.g., 194 through 210) may be disposed along the exhaust recirculation path 110 in one or more series arrangements, parallel arrangements, or any combination of series and parallel arrangements. For example, the EG treatment components 192 (e.g., 194 through 210) may include any series and/or parallel arrangement, in any order, of: one or more heat exchangers (e.g., heat recovery units such as heat recovery steam generators, condensers, coolers, or heaters), catalyst systems (e.g., oxidation catalyst systems), particulate and/or water removal systems (e.g., inertial separators, coalescing filters, water impermeable filters, and other filters), chemical injection systems, solvent based treatment systems (e.g., absorbers, flash tanks, etc.), carbon capture systems, gas separation systems, gas purification systems, and/or a solvent based treatment system, or any combination thereof. In certain embodiments, the catalyst systems may include an oxidation catalyst, a carbon monoxide reduction catalyst, a nitrogen oxides reduction catalyst, an aluminum oxide, a zirconium oxide, a silicone oxide, a titanium oxide, a platinum oxide, a palladium oxide, a cobalt oxide, or a mixed metal oxide, or a combination thereof. The disclosed embodiments are intended to include any and all permutations of the foregoing components 192 in series and parallel arrangements. As illustrated below, TABLE 2 depicts some non-limiting examples of arrangements of the components 192 along the exhaust recirculation path 110.

steam, nitrogen, or other inert gas) is represented by DIL. Although TABLE 2 illustrates the components 192 in sequence from the exhaust outlet 182 of the turbine section 156 toward the exhaust inlet 184 of the compressor section 152, TABLE 2 is also intended to cover the reverse sequence of the illustrated components 192. In TABLE 2, any cell including two or more components is intended to cover an integrated unit with the components, a parallel arrangement of the components, or any combination thereof. Furthermore, in context of TABLE 2, the HRU, the HRSG, and the COND are examples of the HE; the HRSG is an example of the HRU; the COND, WFIL, and CFIL are examples of the WRU; the INER, FIL, WFIL, and CFIL are examples of the PRU; and the WFIL and CFIL are examples of the FIL. Again, TABLE 2 is not intended to exclude any non-illustrated permutations of the components 192. In certain embodiments, the illustrated components 192 (e.g., 194 through 210) may be partially or completed integrated within the HRSG 56, the EGR system 58, or any combination thereof. These EG treatment components 192 may enable feedback control of temperature, pressure, flow rate, and gas composition, while also removing moisture and particulates from the exhaust gas 60. Furthermore, the treated exhaust gas 60 may be extracted at one or more extraction points 76 for use in the EG supply system 78 and/or recirculated to the exhaust inlet 184 of the compressor section 152.

As the treated, recirculated exhaust gas 66 passes through the compressor section 152, the SEGR gas turbine system 52 may bleed off a portion of the compressed exhaust gas along one or more lines 212 (e.g., bleed conduits or bypass

TABLE 2

| 194 | 196 | 198 | 200 | 202 | 204 | 206 | 208 | 210 |
|---|---|---|---|---|---|---|---|---|
| CU | HRU | BB | MRU | PRU | | | | |
| CU | HRU | HRU | BB | MRU | PRU | DIL | | |
| CU | HRSG | HRSG | BB | MRU | PRU | | | |
| OCU | HRU | OCU | HRU | OCU | BB | MRU | PRU | |
| HRU CU | HRU CU | BB | MRU | PRU | | | | |
| HRSG OCU | HRSG OCU | BB | MRU | PRU | DIL | | | |
| OCU | HRSG OCU | OCU | HRSG OCU | OCU | BB | MRU | PRU | DIL |
| OCU | HRSG ST | HRSG ST | BB | COND | INER | WFIL | CFIL | DIL |
| OCU HRSG ST | OCU HRSG ST | BB | COND | INER | FIL | DIL | | |
| OCU | HRSG ST | HRSG ST | OCU | BB | MRU HE COND | MRU WFIL | PRU INER | PRU FIL CFIL |
| CU | HRU COND | HRU COND | HRU COND | BB | MRU HE COND WFIL | PRU INER | PRU FIL CFIL | DIL |

As illustrated above in TABLE 2, a catalyst unit is represented by CU, an oxidation catalyst unit is represented by OCU, a booster blower is represented by BB, a heat exchanger is represented by HX, a heat recovery unit is represented by HRU, a heat recovery steam generator is represented by HRSG, a condenser is represented by COND, a steam turbine is represented by ST, a particulate removal unit is represented by PRU, a moisture removal unit is represented by MRU, a filter is represented by FIL, a coalescing filter is represented by CFIL, a water impermeable filter is represented by WFIL, an inertial separator is represented by INER, and a diluent supply system (e.g., conduits). Each line 212 may route the exhaust gas into one or more heat exchangers 214 (e.g., cooling units), thereby cooling the exhaust gas for recirculation back into the SEGR gas turbine system 52. For example, after passing through the heat exchanger 214, a portion of the cooled exhaust gas may be routed to the turbine section 156 along line 212 for cooling and/or sealing of the turbine casing, turbine shrouds, bearings, and other components. In such an embodiment, the SEGR gas turbine system 52 does not route any oxidant 68 (or other potential contaminants) through the turbine section 156 for cooling and/or sealing purposes, and thus any leakage of the cooled exhaust gas will not contaminate the hot products of combustion (e.g., working exhaust gas) flowing through and driving the turbine stages of the turbine section 156. By further example, after passing through the heat exchanger 214, a portion of the cooled exhaust gas may be routed along line 216 (e.g., return conduit) to an upstream compressor stage of the compressor section 152, thereby improving the efficiency of compression by the compressor section 152. In such an embodiment, the heat exchanger 214 may be configured as an interstage cooling unit for the compressor section 152. In this manner, the cooled exhaust gas helps to increase the operational efficiency of the SEGR gas turbine system 52, while simultaneously helping to maintain the purity of the exhaust gas (e.g., substantially free of oxidant and fuel).

Figure 4:
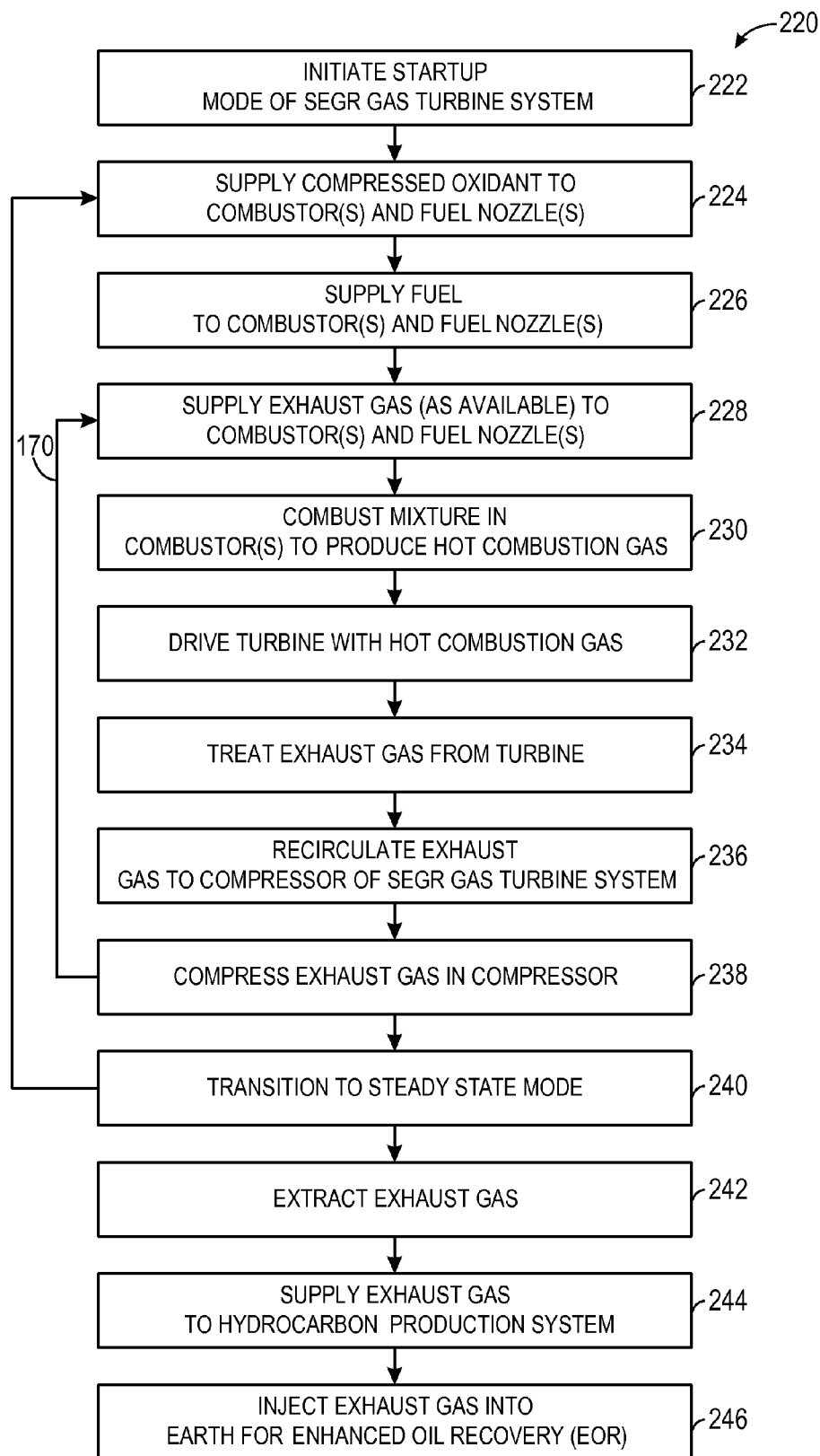
FIG. 4 is a flow chart of an embodiment of a process for operating the system of FIGS. 1-3.

FIG. 4 is a flow chart of an embodiment of an operational process 220 of the system 10 illustrated in FIGS. 1-3. In certain embodiments, the process 220 may be a computer implemented process, which accesses one or more instructions stored on the memory 122 and executes the instructions on the processor 120 of the controller 118 shown in FIG. 2. For example, each step in the process 220 may include instructions executable by the controller 118 of the control system 100 described with reference to FIG. 2.

The process 220 may begin by initiating a startup mode of the SEGR gas turbine system 52 of FIGS. 1-3, as indicated by block 222. For example, the startup mode may involve a gradual ramp up of the SEGR gas turbine system 52 to maintain thermal gradients, vibration, and clearance (e.g., between rotating and stationary parts) within acceptable thresholds. For example, during the startup mode 222, the process 220 may begin to supply a compressed oxidant 68 to the combustors 160 and the fuel nozzles 164 of the combustor section 154, as indicated by block 224. In certain embodiments, the compressed oxidant may include a compressed air, oxygen, oxygen-enriched air, oxygen-reduced air, oxygen-nitrogen mixtures, or any combination thereof. For example, the oxidant 68 may be compressed by the oxidant compression system 186 illustrated in FIG. 3. The process 220 also may begin to supply fuel to the combustors 160 and the fuel nozzles 164 during the startup mode 222, as indicated by block 226. During the startup mode 222, the process 220 also may begin to supply exhaust gas (as available) to the combustors 160 and the fuel nozzles 164, as indicated by block 228. For example, the fuel nozzles 164 may produce one or more diffusion flames, premix flames, or a combination of diffusion and premix flames. During the startup mode 222, the exhaust gas 60 being generated by the gas turbine engine 156 may be insufficient or unstable in quantity and/or quality. Accordingly, during the startup mode, the process 220 may supply the exhaust gas 66 from one or more storage units (e.g., storage tank 88), the pipeline 86, other SEGR gas turbine systems 52, or other exhaust gas sources.

The process 220 may then combust a mixture of the compressed oxidant, fuel, and exhaust gas in the combustors 160 to produce hot combustion gas 172, as indicated by block 230. In particular, the process 220 may be controlled by the control system 100 of FIG. 2 to facilitate stoichiometric combustion (e.g., stoichiometric diffusion combustion, premix combustion, or both) of the mixture in the combustors 160 of the combustor section 154. However, during the startup mode 222, it may be particularly difficult to maintain stoichiometric combustion of the mixture (and thus low levels of oxidant and unburnt fuel may be present in the hot combustion gas 172). As a result, in the startup mode 222, the hot combustion gas 172 may have greater amounts of residual oxidant 68 and/or fuel 70 than during a steady state mode as discussed in further detail below. For this reason, the process 220 may execute one or more control instructions to reduce or eliminate the residual oxidant 68 and/or fuel 70 in the hot combustion gas 172 during the startup mode.

The process 220 then drives the turbine section 156 with the hot combustion gas 172, as indicated by block 232. For example, the hot combustion gas 172 may drive one or more turbine stages 174 disposed within the turbine section 156. Downstream of the turbine section 156, the process 220 may treat the exhaust gas 60 from the final turbine stage 174, as indicated by block 234. For example, the exhaust gas treatment 234 may include filtration, catalytic reaction of any residual oxidant 68 and/or fuel 70, chemical treatment, heat recovery with the HRSG 56, and so forth. The process 220 may also recirculate at least some of the exhaust gas 60 back to the compressor section 152 of the SEGR gas turbine system 52, as indicated by block 236. For example, the exhaust gas recirculation 236 may involve passage through the exhaust recirculation path 110 having the EG processing system 54 as illustrated in FIGS. 1-3.

In turn, the recirculated exhaust gas 66 may be compressed in the compressor section 152, as indicated by block 238. For example, the SEGR gas turbine system 52 may sequentially compress the recirculated exhaust gas 66 in one or more compressor stages 158 of the compressor section 152. Subsequently, the compressed exhaust gas 170 may be supplied to the combustors 160 and fuel nozzles 164, as indicated by block 228. Steps 230, 232, 234, 236, and 238 may then repeat, until the process 220 eventually transitions to a steady state mode, as indicated by block 240. Upon the transition 240, the process 220 may continue to perform the steps 224 through 238, but may also begin to extract the exhaust gas 42 via the EG supply system 78, as indicated by block 242. For example, the exhaust gas 42 may be extracted from one or more extraction points 76 along the compressor section 152, the combustor section 154, and the turbine section 156 as indicated in FIG. 3. In turn, the process 220 may supply the extracted exhaust gas 42 from the EG supply system 78 to the hydrocarbon production system 12, as indicated by block 244. The hydrocarbon production system 12 may then inject the exhaust gas 42 into the earth 32 for enhanced oil recovery, as indicated by block 246. For example, the extracted exhaust gas 42 may be used by the exhaust gas injection EOR system 112 of the EOR system 18 illustrated in FIGS. 1-3.

As noted above, the SEGR gas turbine system 52 may be operated, in some embodiments, at a combustion equivalence ratio of between approximately 0.95 and 0.05. Such combustion may be desirable to reduce the levels of oxidant (e.g., oxygen) present within the combustion products 172 produced by the combustion process, for example to enable the combustion products 172 to be used as a product stream where oxidant may not be desirable (e.g., EOR applications). As discussed above before the description associated with FIG. 1, present embodiments also enable the separation of excess (e.g., unused) oxidant out of combustion products and/or, in certain embodiments, the separation of oxidant out of a compressed recirculated exhaust gas. Therefore, the present embodiments provide an additional level of control over the concentrations of oxidant that may be present within the combustion products 172. In addition, the present embodiments also enable greater flexibility in the operational range with respect to the combustion equivalence ratio, while still maintaining lower levels of oxidant in the combustion products 172.

For instance, the combustors 160 may be operated at equivalence ratios below approximately 0.95 (e.g., between approximately 0.2 and 0.9, such as between approximately 0.3 and 0.9, 0.4 and 0.9, 0.5 and 0.9, 0.6 and 0.9), which is fuel-lean and oxidant-rich. In such embodiments, substantially all of the fuel 70 is consumed, with unused oxidant 70 remaining in the combustion products 172. Present embodiments enable such operation while also enabling the combustion products 172 to be used in EOR applications (or other oxidant-lean applications) by separating the remaining oxidant 68 (e.g., oxygen) out of the combustion products 172.

In particular, and as discussed in detail below, present embodiments utilize one or more features capable of separating oxidant out of gas mixtures, such as an ion transport membrane (ITM), disposed along one or more combustion product flow paths of the SEGR GT system 52. It should be noted that while the system 52 may be referred to as a stoichiometric system, that the present embodiments are also intended to encompass non-stoichiometric operation, as discussed below.

Figure 5:
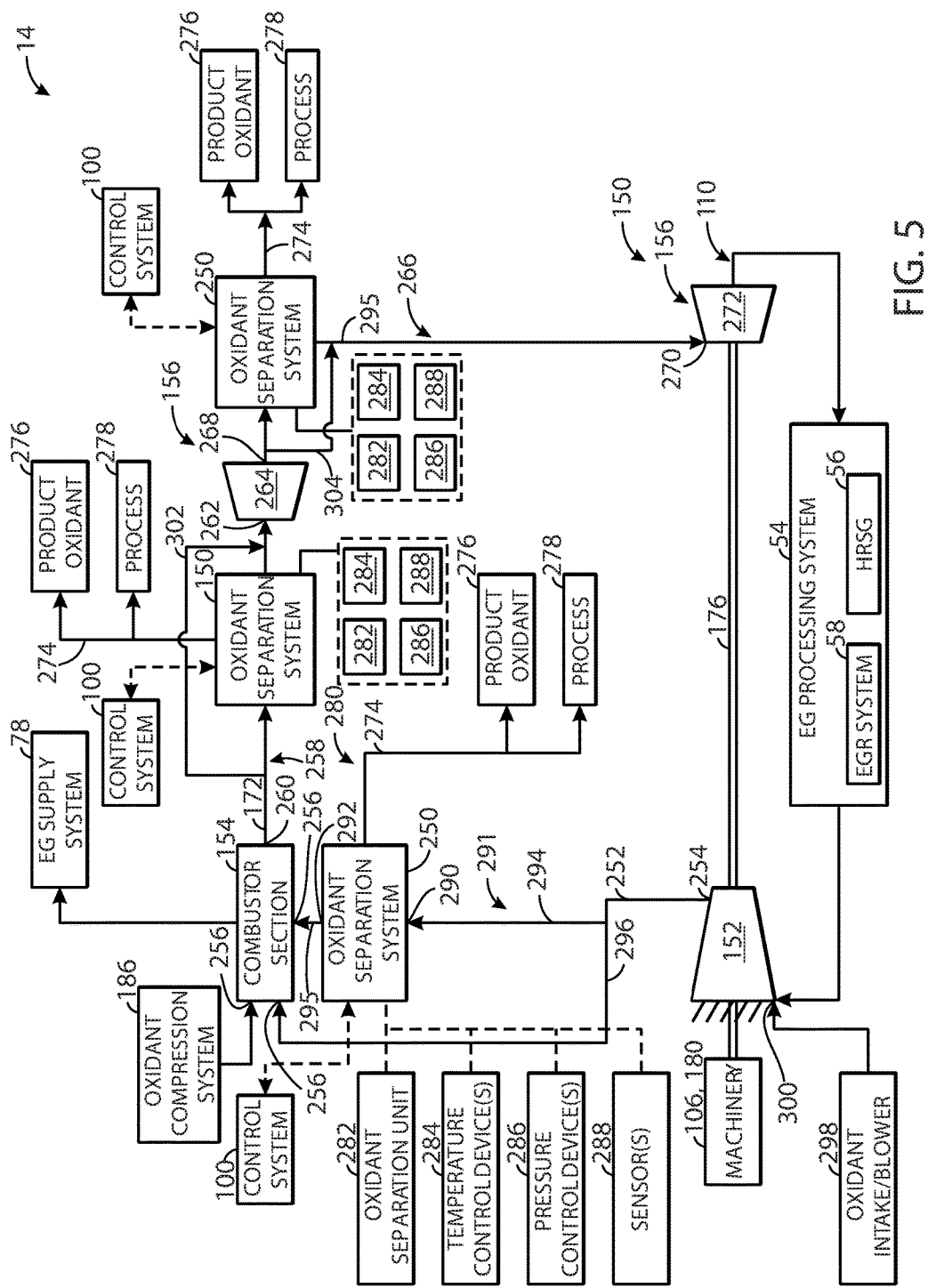
FIG. 5 is a schematic illustration of an embodiment of the turbine-based service system of FIGS. 1-3 having various oxidant separation systems positioned along various flow paths throughout the system.

FIG. 5 is a schematic representation of an embodiment of the turbine-based service system 14 in which one or more oxidant separation systems 250 are positioned along one or more flow paths of the turbine system 150. In a general sense, the oxidant separation systems 250 are configured to separate oxidant (e.g., oxygen) from other non-oxidant materials contained within various fluid mixtures (e.g., combustion products 172, exhaust gas 66, compressed exhaust gas), and store, compress, cool, and/or heat, the separated oxidant. The oxidant separation systems 250 are positioned along flow paths to enable the removal of oxidant from the fluid flowing along the respective flow path. Example positions for the oxidant separation systems 250 are depicted in the embodiment illustrated in FIG. 5. As discussed in detail below, the oxidant separation systems 250 remove oxidant from one or more flows to produce at least two flows: a flow of separated oxidant and a vitiated flow. As defined herein, a vitiated flow is intended to denote a flow in which substantially all oxidant has been removed (e.g., at least approximately 95%, 96%, 97%, 98%, 99%, or 99.5% of oxygen has been removed compared to the untreated flow, or between 90% and 100%, 95% and 100%, or 98% and 100% of the oxygen has been removed).

As depicted, one or more of the oxidant separation systems 250 may be located along a compressed fluid flow path 252 (e.g., a compressed EG fluid path, a compressed oxidant fluid path, or a combination thereof) extending from one or more outlets 254 of the compressor section 152 to one or more exhaust gas inlets 256 of the combustor section 154, along a combustion products flow path 258 extending from one or more combustor section outlets 260 to one or more turbine section inlets 262 (e.g., of a first turbine section 264), along a working fluid flow path 266 extending between stages of the turbine section 156 (e.g., between one or more outlets 268 of the first turbine section 264 and one or more inlets 270 of a second turbine section 272), at or between any number of stages of the turbine section 156, such as between 1, 2, 3, 4, 5, 6, 7, 8, 9, 10, or more stages, or any combination thereof. Additionally or alternatively, one or more of the oxidant separation systems 250 (or an oxidant separation unit, described below) may be positioned along the exhaust recirculation path 110 as one or more of the EG treatment components 192 (FIG. 3). Examples of such embodiments are described in detail below with respect to FIGS. 6-9.

Each of the oxidant separation systems 250 may include one or more devices that are particularly suited for the separation, compression, storage, and/or delivery of separated oxidant 274 as a product gas (e.g., product oxidant 276) and/or as a fluid utilized in a system process 278. For example, the separated oxidant 274 may be provided along one or more separated oxidant flow paths 280 as the product oxidant 276 to one or more storage vessels for provision as a product gas to a customer (e.g., a hospital and/or a chemical production facility). Additionally or alternatively, the separated oxidant 274 may be provided along the oxidant flow paths 280 to various processes 278, such as for gasification (e.g., to a gasifier), for wastewater treatment and/or water purification, or any one or a combination of other process in which the separated oxidant 274 (e.g., $O_2$) may be utilized In certain embodiments, the processes 278 may include provision of the separated oxidant to the combustor section 154, to the oxidant compression system 186, or any combination thereof. By way of non-limiting example, the separated oxidant 274 may be provided to the oxidant compression system 186, or between the oxidant compression system 186 and the combustor section 154 so as to generate a desired equivalence ratio for combustion. By way of example, the combustion equivalence ratio may be adjusted by the separated oxidant 274 (e.g., by controlling a flow of the separated oxidant 274 versus a flow of the fuel 70 and/or a fuel/oxidant mix) to levels that are non-stoichiometric, such as between approximately 0.35 and 0.95, between 0.4 and 0.9, between 0.5 and 0.8, or between 0.6 and 0.7. Indeed, while the separated oxidant 274 may adjust the fuel-oxidant mixture within the combustor section 154 to non-stoichiometric combustion ratios, the product gas that is supplied to the EG supply system 78 may nevertheless have a composition that approximates the composition of a combustion equivalence ratio of between 0.95 and 1.05 when using the oxidant separation system 250 in accordance with the present technique.

The oxidant separation performed within the oxidant separation systems 250 may be performed by any suitable oxidant separation device 282 or system, including but not limited to ion transport membranes (ITMs), molecular sieve zeolite membranes, mixed matrix membranes (e.g., organic-inorganic membranes), organic polymeric membranes, air separation units (ASUs), pressure swing adsorption units (PSAs), cryogenic gas separation units, or any combination thereof. In some embodiments, the oxidant separation units 282 may be ITMs, rather than other separation systems or units (e.g., ASUs, PSAs) due to the capability of ITMs to withstand the conditions (e.g., temperatures and pressures) that are present within the GT system 150. Indeed, in some embodiments, the ITMs may exhibit enhanced performance at certain temperatures and pressures that occur at various sections within the gas turbine system 150, such as at the locations illustrated in FIG. 5.

The oxidant separation systems 250 may also include temperature control devices 284 that suitably adjust a temperature of the fluid flow that is subjected to oxidant separation and/or the temperature of the separated oxidant 274. Such devices 284 may include cooling units (e.g., heat rejection units), heating units (e.g., combustion heaters, electric heaters), heat exchange units (e.g., direct and/or indirect heat exchange units), or any combination of these or similar components. The pressure of the fluid flow that is subjected to oxidant separation and/or the separated oxidant 274 also may be controlled by pressure-controlling components 286 of the oxidant separation systems 250. By way of non-limiting example, such components 286 may include, but are not limited to vents, compressors, blowers, vacuum units, aspirators, flow control valves, turbines, or any combination thereof.

The oxidant separation systems 250 may further include one or more sensors 288 to enable the monitoring and control of fluid entering into one or more respective inlets 290 of the separation systems 250, fluid along one or more flow paths within the oxidant separation systems 250, and/or fluid leaving one or more respective outlets 292 of the oxidant separation systems 250. By way of non-limiting example, the sensors 288 may include one or more $O_2$ sensors, temperature sensors, flow meters, pressure sensors, chemical analyzers (e.g., a gas chromatograph or similar separation and analysis device), or any combination thereof.

The oxidant separation systems 250 may individually include any one or a combination of the above devices, in addition to other features that are not expressly illustrated, such as flow control valves, diverter valves (e.g., for diverting flows within and/or around the oxidant separation systems 250), valve actuators, and so forth. Indeed, the components/devices 282, 284, 286, 288 may be arranged serially, in parallel, along one or more serial and/or parallel flow paths, or any combination thereof. The components/devices 282, 284, 286, 288 may be arranged in the order illustrated in FIG. 5, or in any suitable order. Further, the components/devices 282, 284, 286, 288 may be present at one or more locations within the oxidant separation systems 250. In other words, each of the components/devices 282, 284, 286, 288 may represent a single device, may be combined into one or more devices, or may each be present as a plurality of devices at one or more locations within the oxidant separation systems 250. Further, one or more of the components/devices 282, 284, 286, 288 may not be present at every one of the oxidant separation systems 250.

The operation of the devices of the oxidant separation systems 250 may be partially or totally controlled by the control system 100 (e.g., controller 118), for example in response to feedback generated by one or more of the sensors 288, and/or in response to feedback generated by one or more sensors of the EG supply system 78, the EG processing system 54, the compressor and/or turbine sections 152, 156, the combustor section 154, or any combination thereof. The control system 100 may control flows into, through, and out of the oxidant separation systems 250, pressures and temperatures of fluids flowing into, through, and out of the oxidant separation systems 250, or any other parameters of fluids entering, exiting, or flowing through the oxidant separation systems 250.

The turbine-based service system 14 may also include one or more bypass flow paths that are configured to flow a fluid around the oxidant separation systems 250. By way of example, the illustrated embodiment of FIG. 5 depicts a first bypass flow path 291 extending from the one or more outlets 254 of the compressor section 152 (and/or extending as a flow path diverging from the compressed fluid flow path 252) to the one or more inlets 256 of the combustor section 154 (or re-converging with the compressed fluid flow path 252 downstream of the oxidant separation system 250). The first bypass flow path 291 splits the compressed fluid flow path 252 into at least two portions—a first divergent path 294 that flows to the oxidant separation system 250 to generate a vitiated stream 295 and a second divergent path 296 that bypasses the oxidant separation system 250 and is allowed to enter into the combustor section 154 without undergoing oxidant separation.

In certain embodiments, it may be desirable to enable the second divergent path 296 of the compressed fluid to bypass the oxidant separation system 250 so as to retain a certain amount of oxidant for combustion. For example, as depicted, the turbine-based service system 14 may include an oxidant intake/blower 298 (e.g., an air blower) fluidly coupled to an oxidant intake 300 of the compressor section 152. The oxidant intake/blower 298 may intake an oxidant (e.g., ambient air) and blow the oxidant into the compressor section 152 for compression. In such embodiments, the compressor section 152 may generate a compressed oxidant/exhaust gas mixture as the compressed fluid exiting the one or more outlets 254. In certain embodiments, the oxidant intake/blower 298 may operate in addition to the oxidant compression system 186 (e.g., as an auxiliary oxidant supply system), or may altogether replace the oxidant compression system 186. Indeed, in one embodiment, the turbine-based service system 14 may not utilize a main oxidant compressor. Rather, in such an embodiment, the compressor section 152 simultaneously compresses oxidant taken in by the oxidant intake/blower 298 and the exhaust gas 60 recirculated along the exhaust recirculation path 110. In still further embodiments, the oxidant intake/bower 298 may work in concert with the EG processing system 54, such that the compressor section 152 intermittently compresses oxidant or exhaust gas. Embodiments where the oxidant separation system 250 is positioned between the combustor section 154 and the compressor section 152 are discussed in further detail below with respect to FIG. 8.

Additionally or alternatively, the turbine-based service system 14 may include a second bypass flow path 302 positioned so as to flow the combustion products 172 around the oxidant separation system 250 that is positioned between the combustor section 154 and the turbine section 156. As discussed in detail below with respect to FIG. 7, positioning the second bypass line 302 along the combustion products flow path 258 between the combustor section 154 and the first turbine section 264 may enable the control system 100 to tailor the composition of the fluid, the temperature and/or pressure of the fluid, or any combination thereof, that is provided to the first turbine section 264. In some embodiments, such control may be performed to enable a desired amount of work extraction from the combustion products 172 at the first turbine section 264.

A third bypass flow path 304 may be positioned along the working fluid flow path 266 in order to bypass the oxidant separation system 250 positioned between the first turbine section 264 and the second turbine section 272. As with the second bypass flow path 302, the positioning of the third bypass flow path 304 may be desirable to tailor one or more parameters of the fluid provided to the second turbine section 272, such as to enhance work extraction (e.g., the amount of extracted work). Furthermore, the second and third bypass flow paths 302, 304 may be utilized as a backup flow path in embodiments where the oxidant separation system 250 is non-operational, or is operating at its maximum capacity (or at a predetermined capacity level).

Figure 6:
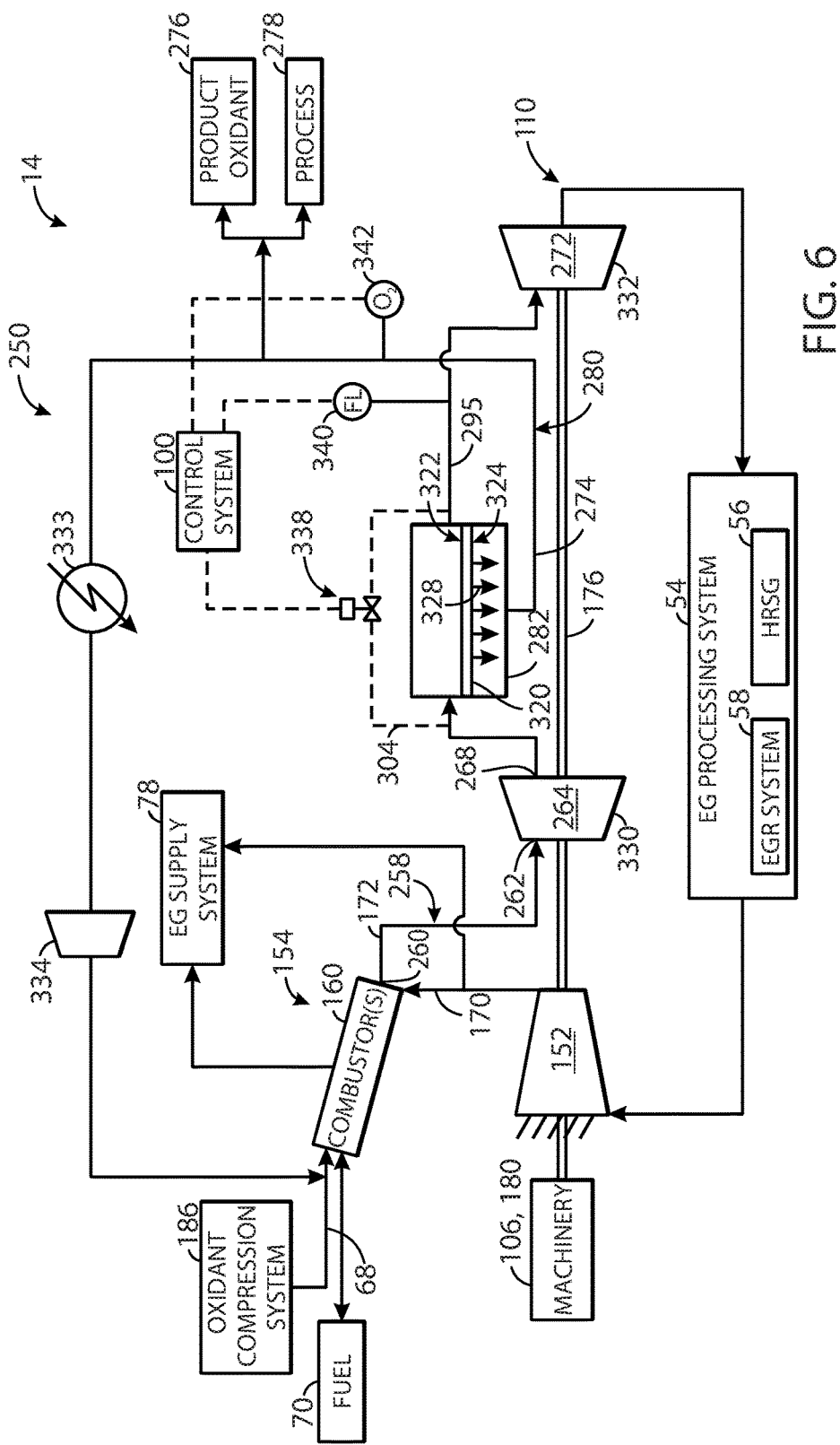
FIG. 6 is a schematic illustration of an embodiment of the turbine-based service system of FIGS. 1-3 having an oxidant separation unit positioned between turbine stages of a turbine section.

One embodiment of the turbine-based service system 14 utilizing one or more of the oxidant separation systems 250 is depicted in FIG. 6 as a schematic diagram. As illustrated, the oxidant separation system 250 includes at least one of the oxidant separation units 282 positioned along the working fluid flow path 266 extending between the first turbine section 264 and the second turbine section 272. The first turbine section 264 and the second turbine section 272 may be housed in first and second housings 330, 332, respectively, or in a common housing, or in three or more housings (e.g., in embodiments where the second turbine section 272 includes more than one section). In other words, the different stages of the turbine section 154 may be housed separately or all together in a single housing. In the illustrated embodiment, for example, the first turbine section 264 may include only a first turbine stage positioned within the first housing 330, and second and third turbine stages positioned within the second housing 332. However, the first turbine section 264 may include one or more turbine stages, such as 1, 2, 3, 4, 5, or more stages. Likewise, the second turbine section 272 may include one or more turbine stages, such as 1, 2, 3, 4, 5, 6, 7, 8, 9, 10, or more stages.

The turbine stages (e.g., a single wheel with one set of turbine blades) positioned within the first turbine section 264 may, in some embodiments, be of sufficient size so as to extract work from the combustion products 172 at the discharge temperatures and pressures of the combustors 160. The first turbine stage(s) in the first turbine section 264 may extract work from the combustion products 172 to cause rotation of the shaft 176 (or another machine component), thereby reducing a temperature of the combustion products 172 from a first temperature to a second temperature and a pressure from a first pressure to a second pressure. By way of non-limiting example, the first temperature may be between approximately 2000° F. and 3000° F. (approximately 1093° C. and 1650° C.), such as between approximately 2600° F. and 2800° F. (approximately 1427° C. and 1538° C.). In one embodiment, the temperature at the combustor outlet 260 may be approximately 2700° F. (approximately 1482° C.).

The second temperature of the combustion products 172, e.g., the temperature after work extraction by the first turbine section 264, may be a temperature at which the oxidant separation unit 282 enables a desired amount of oxidant extraction from the combustion products 172 (e.g., maximum oxidant extraction). In other words, in extracting work from the combustion products 172 to cause the temperature of the combustion products 172 to be reduced from the first temperature to the second temperature, the first turbine section 264 effectively reduces the temperature of the combustion products 172 from a temperature at which oxidant separation may be undesirably low (or high) to a temperature at which oxidant separation is desired (e.g., maximum oxidant extraction). By way of non-limiting example, the second temperature of the combustion products 172, e.g., the temperature of the combustion products 172 after having passed through the first turbine section 264, may be between approximately 1500° F. and 2100° F. (approximately 815° C. and 1149° C.), such as between approximately 1600° F. and 2000° F. (approximately 871° C. and 1093° C.).

The pressure of the combustion products 172 exiting the first turbine section 264 (e.g., a first stage of the turbine section 156) may also be particularly suitable for separation using certain oxidant separation units 282. Again, a pressure of the combustion products 172 may be reduced from a first pressure to a second pressure, where the first pressure is the pressure of the combustion products 172 before entry into the first turbine section 264 (e.g., at the inlet 262), and the second pressure is the pressure of the combustion products 172 upon exiting (e.g., at the outlet 268) of the first turbine section 264. By way of non-limiting example, the first pressure may be between approximately 150 pounds per square inch absolute (psia) and 350 psia (approximately 10.3 bar and 24.1 bar), and the second pressure may be between approximately 100 psia and 300 psia (approximately 6.9 bar and 20.7 bar). By way of further example, the second pressure of the combustion products 172 may be between approximately 110 psia and 180 psia (approximately 7.6 bar and 12.4 bar), or between approximately 130 psia and 150 psia (approximately 9 bar and 10.3 bar).

While these temperatures and pressures may be suitable for a number of different oxidant separation unit(s) 282, such as one or a combination of ITMs, molecular sieve zeolite membranes, mixed matrix membranes (e.g., organic-inorganic membranes), organic polymeric membranes, ASUs, PSAs, and/or cryogenic gas separation units as discussed above, in some embodiments ITMs may be particularly well-suited for oxidant (e.g., oxygen) separation at these temperatures and pressures. Indeed, in one embodiment, the temperature and pressure of the combustion products 172, having passed through the first turbine section 264, may each be within a range that is particularly well-suited for oxygen separation using one or more ITMs. However, any one or a combination of these other types of unit may be used in any combination in the system 14. For instance, the temperature of the combustion products 172 upon entry to the oxidant separation unit 282 may be between approximately 1600° F. and 2000° F. (approximately 871° C. and 1093° C.), and the pressure of the combustion products may be between approximately 130 psia and 150 psia (approximately 9 bar and 10.3 bar). These temperatures may be sufficient to cause oxygen to adsorb onto a membrane 320 of the ITMs, ionize, and transport across the membrane 320.

Indeed, as discussed herein, ITMs are intended to encompass separation units in which an ionized portion of a fluid (e.g., adsorbed and ionized oxygen) is transported through a membrane 320, where the transport results in the selective removal of the ionized portion from the fluid. In the present context, for example, ITMs selectively remove oxygen from a fluid (e.g., the combustion products 172) in order to reduce the concentration of oxygen in the combustion products 172. In some embodiments, the membrane 320 may be a ceramic membrane (e.g., a membrane made of one or more metal oxides) through which oxygen ions selectively diffuse. By way of general example, oxides of barium (Ba), bismuth (Bi), cobalt (Co), iron (Fe), calcium (Ca), lanthanum (La), gallium (Ga), strontium (Sr), or any other oxides or mixed oxides of group 4, 5, or 6 metals (i.e., groups 4, 5, or 6 of the periodic table), or any oxides or mixed metal oxides of alkali metals, alkaline earth metals, transition metals, rare earth metals, or any combination thereof, may be used as all or a part of the membrane 320. Indeed, in one embodiment of a ceramic membrane, the membrane 320 may be 100% selective for oxygen ions. In other words, the ceramic membrane may allow the permeation of only oxygen ions therethrough while completely blocking the passage of other fluid components through the membrane 320. The ITMs discussed herein may have one or more membranes 320, such as, by way of non-limiting example, between 1 and 1000 membranes. In embodiments where there are multiple membranes 320, the membranes may be arranged as a stack or in a similarly oriented relationship with one another (e.g., substantially parallel to one another and oriented crosswise with respect to the flow of oxygen therethrough). Furthermore, in embodiments in which multiple ITMs are used as separation units 282, they may be positioned in parallel, in series, or a combination thereof.

The membranes 320 may be capable of conducting electricity (e.g., may have a resistivity of less than 1 ohm-meters). Such conductivity may enable the membranes 320 to electrically reduce and oxidize the oxygen molecules upon adsorption of the oxygen in the incoming stream onto the membranes 320. In other words, the membranes 320 cause the oxygen to become ionized at particular temperatures and pressures. In one embodiment, the reduction process generates $O_2^-$ (i.e., the oxygen molecules are reduced to oxygen ions), which enables the oxygen molecules (in ionic form) to permeate through the membrane 320. The oxygen ions are then oxidized by the membrane 320 to re-generate neutral oxygen molecules. In some embodiments, the reduction of the oxygen may occur at a first side 322 of the membrane 320, and the oxidation of the oxygen ions may occur at a second side 324 of the membrane 320. The ionization may occur automatically at the particular temperature and pressures of the incoming stream to be oxygen-reduced when the oxygen adsorbs onto the membrane 320. In some embodiments, the first side 322 is at a higher pressure than the second side 324 due to the flow of only oxidant (oxygen) through the membrane 320. In accordance with present embodiments, this pressure difference causes the separated oxidant 274 to flow in a direction across the membrane 320, as depicted by arrows 328, while the remainder of the combustion products 172, vitiated combustion products 295, pass to the second turbine section 272.

Because the one or more oxidant separation units 282 (e.g., ITMs) are positioned between the combustor 160 and the exhaust gas recirculation path 110, the oxidant separation units 282 enable the combustors 160 to be run with non-stoichiometric conditions, and specifically under fuel-lean, oxidant-rich conditions. However, any combustion conditions (e.g., any combustion equivalence ratios) are presently contemplated. By way of non-limiting example, in accordance with the embodiments disclosed herein, the combustors 160 may, individually, be run at combustion equivalence ratios of less than approximately 0.95, such as between approximately 0.6 and 0.9, or between approximately 0.7 and 0.8. Therefore, the combustion products 172 will generally include a certain level of unused oxidant 68, and will generally be substantially free of unused fuel 70. In some embodiments, "substantially free of uncombusted fuel 70" is intended to denote that the level of uncombusted fuel 70 in the combustion products 172 is below approximately 1000 ppm, such as below approximately 500 ppm, 50 ppm, or 10 ppm (e.g., between approximately 500 ppm and 10 ppm), or under a threshold level that is defined by a particular end-use of the exhaust gas 60 (e.g., enhanced oil recovery). Indeed, such non-stoichiometric combustion may be desirable to enable the efficient use of the fuel 70, which may more costly to produce and isolate compared to the oxidant 68. For example, the fuel 70 may be from a pipeline, from one or more gasification units or plants, or a similar source. Such sources may utilize a number of resources including man-hours, equipment, and the like, to produce the fuel 70. On the other hand, in some embodiments, the oxidant 68 may simply be the oxygen from the ambient environment in which the gas turbine system 150 is located. Thus, the presence of the oxidant separation units 282 between the combustor 160 and the exhaust recirculation path 110 enables the benefits associated with fuel-lean combustion, while also enabling the benefits of producing the exhaust gas 60 associated with stoichiometric combustion (e.g., reduced oxidant levels for equipment cooling and/or enhanced oil recovery, such as below approximately 20 ppm, 15 ppm, or 10 ppm). TABLE 3 below illustrates, by way of non-limiting example, the ability of a single ITM to reduce oxygen concentrations in the combustion products 172. It should be noted that the present embodiments are not limited to the values set forth below, and that these values are intended to be examples only.

TABLE 3

| Equivalence Ratio | ITM Inlet, $O_2$ vol % | ITM Outlet, $O_2$ vol % |
|---|---|---|
| 0.81 | 2.20 | 0.50 |
| 0.845 | 1.75 | 0.40 |
| 0.885 | 1.30 | 0.30 |
| 0.955 | 0.45 | 0.10 |

As illustrated, when used in conjunction with an ITM, the combustors 160 may be able to operate at many different equivalence ratios, and the gas turbine 150 is nevertheless capable of producing combustion products 172 having relatively low levels of oxygen as the vitiated fluid 295. For instance, as depicted by the example values in Table 3, the combustors 160 may be able to operate at an equivalence ratio of 0.81, where 2.2% by volume of the combustion products 172 is oxygen upon entry to the ITM. After exiting the ITM, the combustion products 172 are 0.50% by volume oxygen. The levels of oxygen in the combustion products 172 are further reduced as the equivalence ratios approach stoichiometric conditions (e.g., between 0.95 and 1.05, where 1.0 represents exact stoichiometric combustion). Therefore, the ITM enables the combustors 160 to be operated at non-stoichiometric conditions, while also enabling the combustion products 172 to have stoichiometric-like oxygen levels. Again, any one or a combination of the combustors 160 may be operated with stoichiometric combustion conditions as well.

The separated oxygen 326 (or other oxidant) may flow along a separated oxidant flow path 280, which may lead to various end uses, such as recirculation back to the combustor(s) 160 (or otherwise combined with the oxidant 68), to another process 278 as described above, and/or to one or more storage tanks, pipelines, or the like, as the product oxidant 276. As illustrated, the separated oxidant flow path 280 passes into a heat exchange relationship with a heat exchanger 333 (as one of the temperature control device(s) 284). The heat exchanger 333 is configured to adjust a temperature of the separated oxidant 274 via direct or indirect heat exchange. In certain embodiments, the heat exchanger 333 may be configured to reduce the temperature of the separated oxidant 274 via indirect heat exchange with a cooling medium (e.g., boiler feedwater). By way of non-limiting example, the temperature of the separated oxidant 274 may be reduced by the heat exchanger 333 by between approximately 1% and 99%, such as between approximately 10% and 90%, 20% and 80%, 30% and 70%, or 40% and 60% (relative to flow of separated oxidant 274 entering the heat exchanger 332). On the other hand, the separated oxidant 274 may be heated via indirect heat exchange with a heating medium such that the temperature of the separated oxidant 274 is increased by between approximately 1% and 500%, such as between approximately 10% and 400%, 20% and 300%, 30% and 200%, or 40% and 100% (relative to the flow entering the indirect heat exchanger).

In certain embodiments, it may be desirable to reduce or increase a temperature of the separated oxidant 274 to a level at which a booster compressor 334, positioned along the separated oxidant flow path 280, is able to compress the separated oxidant 274 by a desired amount (e.g., within the design temperature range of the booster compressor 334). However, in other embodiments, the booster compressor 334 may be positioned upstream of the heat exchanger 333.

Regardless, the temperature of the separated oxidant 274 may be reduced or increased by an amount suitable for provision to the combustors 160, to the oxidant compression system 186, or any other use. For example, in some embodiments, the separated oxidant 274 may be provided directly to the oxidant compression system 186 after heat exchange at the heat exchanger 333, in which case the separated oxidant 274 may not necessarily be provided to the booster compressor 334 for compression. Additionally or alternatively, the separated oxidant 274 may undergo heat exchange at the heat exchanger 333, compression at booster compressor 334, and may be provided as the product oxidant 276, or may be provided to another process 278.

By way of example, the booster compressor 334 may compress the separated oxidant 274 by a ratio of between 1:1 and 1:1.5, such as by between approximately 5% and 50%, 10% and 40%, or 20% and 35%. In a general sense, the booster compressor 334 may compress the separated oxidant 274 by an amount appropriate for combination with the compressed oxidant generated by the oxidant compression system 186, by an amount appropriate for provision to one or more portions of the oxidant compression system 186 (e.g., between compression stages and/or at an entrance or exit of an intercooler). In still further embodiments, the separated oxidant 274 may be compressed by the booster compressor 334, and may subsequently have its pressure reduced by another feature, such as a valve, expander, Joule-Thomson valve, etc. In one embodiment, the separated oxidant 274 may not undergo compression before being provided to the oxidant compression system 186, or before being combined with the compressed oxidant generated by the oxidant compression system 186.

As noted above, the turbine-based service system 14 may also include the third bypass flow path 304. The control system 100 may control a flow of the combustion products 172 through the separation unit 282 using, for example, one or more flow control devices 338 (e.g., flow control valves and associated actuators) positioned along the third bypass flow path 304. For example, a ratio of the combustion products 172 that flow through the separation unit 282 to the combustion products 172 that bypass the separation unit 282 may be controlled based on data obtained from one or more of the sensors 288 (FIG. 5). In the illustrated embodiment, such sensors 288 may include a fuel sensor 340 disposed along the working fluid flow path 266 and an oxygen sensor 342 disposed along the separated oxidant flow path 280. However, in other embodiments, the fuel and/or oxygen sensors 340, 342 may be other types, such as flow sensors or the like.

The control system 100 may receive feedback from the fuel and/or oxygen sensors 340, 342, where the feedback is indicative of the composition of the combustion products 172. In embodiments where the combustion products 172 are substantially free of oxygen, for example if the control system 100 receives feedback from the oxygen sensor 342 that indicates that little or no oxygen has been separated, the control system 100 may cause substantially all of the combustion products 172 to be sent to the third bypass flow path 304.

Alternatively, in embodiments where the control system 100 determines that there is an amount of separated oxidant 274 that meets or exceeds a threshold amount, this may be indicative of a relatively large amount of residual oxidant in the combustion products 172. Accordingly, the control system 100 may maintain or increase the flow of the combustion products 172 into the separation unit 282 relative to the flow of the combustion products 172 along the third bypass flow path 330.

While the provision of the separation unit(s) 282 may be positioned between turbine stages of the turbine system 156 to take advantage of the particular temperature and pressure of the combustion products 172 in the manner discussed above with respect to FIG. 6, present embodiments also provide for one or more oxidant separation units 282 to be positioned entirely upstream of the turbine section 156. One such embodiment of the turbine-based service system 14 is depicted in FIG. 7, which includes an oxidant separation unit 282 positioned along the combustion products flow path 258 between the outlet 260 of the combustor system 154 and the inlet 262 of the turbine section 156 (e.g., upstream of all stages of the turbine section 156).

In the illustrated embodiment, the combustor section 154 receives oxidant 68 (e.g., compressed oxidant) from the oxidant compression section 186 and fuel 70 in order to generate a fuel/oxidant mixture for combustion at a particular equivalence ratio (e.g., between approximately 0.3 and 1.1, such as between 0.4 and 1.0, between 0.5 and 0.95, between 0.6 and 0.9). Additionally or alternatively, the combustor section 154 may receive a stream of separated oxidant 348 from the oxidant separation system 250, which includes the oxidant separation unit 282 and a separated oxidant system 350. The separated oxidant system 350 includes the remaining portions of the oxidant separation system 282, including but not limited to the temperature control devices 284, pressure control devices 286, sensors 288, or any combination thereof. The separated oxidant system 350 may also include one or more flow paths configured to flow the separated oxidant 274 through appropriate vessels, heat exchangers, compressors, blowers, treatment vessels, catalyst systems, and so forth, such that the separated oxidant 274 has a temperature, pressure, composition, and so on, that enables its use as a component for combustion within at least one combustor 160.

The products of combustion 172, as depicted, flow along the combustion products flow path 258 from the combustor section 154 and to the separation unit 282. In embodiments where the separation unit 282 includes one or more ITMs, the ITMs may be advanced ITMs that are able to operate at the temperatures and pressures of the combustion products 172. In further embodiments, one or more heat exchangers 352 may be positioned along the combustion products flow path 258 in order to reduce the temperature of the combustion products 172 to a desired operating temperature for the ITMs. The heat exchangers 352 positioned along the flow path 258 may utilize a cooling medium in order to directly or indirectly exchange heat with the combustion products 172. For example, the heat exchangers 352 may utilize steam generated by the HRSG 56 to generate a superheated steam for use in other heat exchange applications, or for use within a steam turbine for power generation. Another potential cooling medium includes exhaust gas generated by the turbine section 156, such as the exhaust gas generated at any point along the recycle path 110.

In the illustrated embodiment, the combustion products 172, having been cooled or not, are provided to the oxidant separation unit 282 in an amount determined by the bypass loop 302. Specifically, one or more flow control devices 354 may be controlled based on signals from the control system 100 (not shown for clarity) to adjust a flow of the combustion products 172 into the second bypass flow path 302, and, therefore, into the oxidant separation unit 282. The amount of combustion products 172 provided to the oxidant separation unit 282 may depend on a number of factors, including but not limited to measured oxidant levels in the combustion products 172, the use of exhaust gas by the EG supply system 78 (e.g., exhaust gas requirements), operating limits of the separation unit 282 and/or the separated oxidant system 350, oxidant requirements of the various processes 278, and so on.

In addition to or in lieu of the approaches described above, present embodiments also encompass approaches where one or more oxidant separation units 282 may be positioned along the compressed fluid flow path 252 extending between the outlet 254 of the compressor section 152 and at least one of the inlets 256 of the combustor section 154, as depicted in FIG. 8. In other words, the one or more oxidant separation units 282 operate on a compressed fluid 370 generated by the compressor section 152. As noted above, the compressed fluid flow path 252 may flow a compressed EG, a compressed oxidant, or a mixture of compressed oxidant and EG. In the illustrated embodiment, for example, the compressed fluid 370 is a compressed mixture including oxidant (e.g., oxidant) and recirculated EG.

The compressor section 152, which may include only one compressor (e.g., a single compressor casing enclosing one or more compression stages) or multiple compressors, may therefore include one or more oxidant inlets 372 and one or more recirculated exhaust gas inlets 374. By way of non-limiting example, the recirculated exhaust gas inlets 374 may receive the EG 60 and/or the EG 66 from the exhaust recirculation path 110, or may receive exhaust gas from another source (e.g., another gas turbine engine).

The one or more oxidant inlets 372 may receive oxidant from any number of sources, and are not particularly limited. However, certain sources may be desirable from an efficiency standpoint, and may include various devices capable of ingesting ambient air and treating the ambient air before provision to the compressor section 152. For instance, such devices may include various turbomachinery or similar features having air intakes. In the illustrated embodiment, the one or more oxidant inlets 372 receive a pressurized oxidant 376 (e.g., pressurized ambient air) generated by the oxidant intake/blower 298, which in the illustrated embodiment is an air blower 378. The air blower 278, as depicted, intakes the oxidant 68 (e.g., ambient air), and motivates the oxidant 68 toward the compressor section 152 as the pressurized oxidant 376.

The configuration depicted in FIG. 8, where the compressor section 152 intakes both oxidant and exhaust gas for compression, may be desirable for a number of reasons. By way of example, such a configuration may enable the oxidant compression system 186 and associated control systems and equipment to be eliminated, thereby potentially saving costs while also reducing the footprint of the turbine-based service system 14. Indeed, in the embodiment depicted in FIG. 8, the air blower 378 may be much smaller in size compared to oxidant compressors that may be used within the main oxidant compression system 186, and may have a concomitantly lower cost both in installation and operation. Furthermore, the air bower 378 may operate using a smaller driver compared to compressors of the oxidant compression system 186. However, it should be noted that the present embodiments also contemplate the use of axial and/or centrifugal compressors of any size and operational requirements in conjunction with the compressor section 152 (e.g., in addition to or in place of the air blower 378).

As an example of the difference between the illustrated air blower 378 and a main oxidant (e.g., air) compressor, the air blower 378 may pressurize the oxidant 68 by between 10% and 100%, such as between 20% and 80%, or 30% and 50%. In embodiments where the oxidant 68 is ambient air, for instance, the oxidant will have a pressure of about 14.7 pounds per square inch (approximately 1 bar), and the pressurized oxidant 376 (in this embodiment pressurized air) may have a pressure between about 16 psi and about 22 psi (between about 1.1 bar and about 1.5 bar), such as about 20 psi (1.4 bar). On the other hand, a main air compressor may compress the ambient air to much higher pressures, such as about 320 psi (22 bar), which is more than an order of magnitude higher.

While not bound by theory, it is believed that by first pressurizing the ambient air (or other oxidant intaken into the oxidant intake/blower 298) before compression at the compressor section 152, higher efficiency may be obtained in the compression process in generating the compressed fluid 370. Therefore, the entire turbine-based service system 14 may include only one main compressor that compresses both oxidant and recirculated exhaust gas to generate the compressed fluid 370. Thus, an exhaust gas compressor (also referred to as a recycle compressor) of the compressor section 152 may compress both the oxidant 68 and the exhaust gas 66. In certain embodiments, the air blower 378 (or oxidant intake/blower 298) may be at least partially driven by the shaft 176. In such embodiments, compressed and heated exhaust gas may be provided to the EG supply system via one or more conduits positioned downstream of the oxidant separation units 282.

The compressed fluid 370, which in the illustrated embodiment includes both exhaust gas and oxidant, may have a first temperature and pressure. In certain embodiments, by way of non-limiting example, the first temperature may be between approximately 600° F. and approximately 1100° F. (e.g., between approximately 300° C. and approximately 600° C.), such as between approximately 800° F. and approximately 1000° F. (e.g., between approximately 400° C. and approximately 550° C.), or between approximately 900° F. and 1000° F. (e.g., between approximately 500° C. and approximately 550° C.). The first pressure of the compressed fluid 370 may be between approximately 250 psi and approximately 400 psi (e.g., between approximately 17 bar and 28 bar), such as between approximately 300 psi and approximately 350 psi (e.g., between approximately 21 bar and approximately 25 bar). It should be noted that the compressed fluid 370 may be provided to the EG supply system 78, such as from an outlet of the compressor section 152.

As noted above, in certain embodiments, it may be desirable to provide a fluid from which oxidant (e.g., oxygen) will be separated at a temperature and/or pressure that is appropriate for the oxidant separation unit 282 to operate. For example, it may be desirable to provide a subject fluid to the oxidant separation unit 282 at a particular temperature and pressure (e.g., within a particular range of temperatures and/or pressures) at which the oxidant separation unit 282 will have maximum separation efficiency. Accordingly, the embodiment of the turbine-based service system 14 of FIG. 8 includes features that enable the compressed fluid 370 to be heated and/or pressurized to a level that is appropriate for the oxidant separation unit 282, which may be a design temperature of the oxidant separation unit 282 and/or a range of temperatures within a certain percentage range of the design temperature of the oxidant separation unit 282. By way of non-limiting example, the compressed fluid 370 may be provided to the oxidant separation unit 282 at a temperature that deviates no more than between 20% and 0.1%, 10% and 0.1%, or 5% and 0.1%, such as no more than 20%, 10%, 5%, or 1%, from the design temperature of the oxidant separation unit 282. The design temperature of the oxidant separation unit 282, in one embodiment, may be the temperature at which the oxidant separation unit 282 separates oxidant (e.g., oxygen) from the compressed fluid 370 at maximum efficiency, and/or separates a maximum amount of the oxidant from the compressed fluid 370.

The compressed fluid flow path 252, as noted above, splits into first and second divergent paths 294, 296, which flow the compressed fluid 370 through various heat exchange equipment and to the combustor section 154, respectively. The control system 100 may monitor the relative amounts of the compressed fluid 370 flowing through the first and second divergent paths 294, 296, and may adjust the flows through each portion based on any number of monitored parameters. For instance, the control system 100 may, by executing via one or more processors, instructions stored on a non-transitory medium, monitor the amount of oxidant relative to the amount of fuel 70 in the combustor section 154, and may adjust the relative amounts flowing through the first and second divergent paths 294, 296 so as to control the combustion equivalence ratio.

The control system 100 is communicatively coupled to a variety of flow control devices that enable the control system 100 to control the relative amounts of the compressed fluid 370 provided to the first and second divergent paths 294, 296. In the illustrated embodiment, for example, the control system 100 is communicatively coupled to a first valve 380 that enables the control of flow from the outlet 254 of the compressor section 152 and through the first and second divergent paths 294, 296. By way of example, the first valve 380 may be a three-way valve that is manually and/or automatically adjusted in response to control signals provided by the control system 100.

The control system 100 may be communicatively coupled to a variety of sensors that generate feedback provided to the control system 100. The feedback may be input into various control algorithms run by the control system 100 for any purpose, including controlling the combustion equivalence ratio within the combustor section 154 (e.g., the combustion equivalence ratio in any of the combustors 160), controlling the energy output by the turbine-based service system to account for changes in power grid requirements, and so forth. By way of example, the control system 100 is depicted as being communicatively coupled to a flow sensor 381 and an oxygen sensor 383 positioned along the second divergent path 296, and a sensor 385 positioned just downstream of the outlet 292 of the oxidant separation unit 282 along the first divergent path 294. The sensor 385 may be any suitable type of sensor that enables the control system 100 to determine an appropriate ratio of the vitiated stream 295 generated by the oxidant separation unit 282 to the compressed fluid 370 that does not undergo oxidant separation. For example, the sensor 385 may be a flow sensor, a fuel sensor, an oxygen sensor, a gas analysis unit, or the like. Furthermore, the sensor 385 is intended to represent one or more sensors, such that the one or more sensors may enable the control system 100 to receive feedback relating to the composition, flow, pressure, temperature, etc., of the vitiated stream 295.

The control system 100 may, in a general sense and as applicable to all discussions of monitoring and control, use one or more processors to execute one or more sets of instructions stored on a non-transitory storage medium. The instructions may be used to monitor feedback generated by sensors and perform certain control actions (e.g., the generation of one or more control signals) as a result of the feedback. By way of example, the instructions may be carried out to control flows to and from the separation systems 250, separation units 282, and so forth.

Any ratio of the relative flows through the first and second divergent paths 294, 296 is contemplated. By way of example, between approximately 1 and 100% of the flow may be provided to the first divergent path 294 and between approximately 1 and 100% of the flow may be provided to the second divergent path 296, where the percentages, when combined, total 100% (or less than 100% in embodiments where a release valve or other venting mechanism is present). The particular amount of compressed fluid 370 provided to the first and/or second portions 294, 296 may depend on the desired combustion equivalence ratio in the combustor section 154, the amount of product oxidant 276 that may be desired, the amount of exhaust gas exported via the EG supply system 78, or any combination thereof. In one embodiment, the amount of the compressed fluid 370 provided to the first divergent path 294 may be between approximately 30% and 50%, such as approximately 40%, while the amount of the compressed fluid 370 provided to the second divergent path 296 may be between approximately 70% and 50%, such as approximately 60%.

As noted above, the first divergent path 294 of the compressed fluid flow path 252 flows the compressed fluid 370 through one or more heat exchange mechanisms configured to enable the exchange of heat between the compressed fluid 370 and a heating medium, which may be steam (e.g., LP, MP, or HP steam) or may be a process fluid generated within the turbine-based service system 14. Indeed, it may be desirable for the heating medium to be a process stream so as to increase efficiency.

Because the temperature of the compressed fluid 370 may be relatively high (e.g., compared to the compressed fluid 370 just after compression) when it is provided to the oxidant separation unit 282, the separated oxygen 274 may also have a correspondingly relatively high temperature. Accordingly, as illustrated, in certain embodiments, the first divergent path 294 may be heat-integrated with one or more of the separated oxidant flow paths 280. In the illustrated embodiment, a first heat exchanger 382 heat-integrates the first divergent path 294 and the separated oxidant flow path 280. The illustrated first heat exchanger 382 is intended to represent one or more indirect heat exchangers configured to enable the transfer of thermal energy between the first divergent path 294 and the separated oxidant path 280. The first heat exchanger 382 may be any suitable heat exchanger capable of enabling the transfer of thermal energy between conduits, such as a shell and tube heat exchanger, plate heat exchanger, plate and shell heat exchanger, adiabatic wheel heat exchanger, plate fin heat exchanger, pillow plate heat exchanger, fluid heat exchanger, and the like.

Again, because the separated oxidant 274 will generally have a higher temperature than the compressed fluid 370 before the compressed fluid 370 has been heated by any other source, the separated oxidant 274 transfers heat to the compressed fluid 370, which results in a temperature increase of the compressed fluid 370 of at least 1%, such as at least 10% at least 20%, at least 50%, or at least 100%, or between approximately 1% and 100%, between approximately 10% and 80%, between approximately 20% and 60%, or between approximately 30% and 50%. By way of non-limiting example, the temperature of the compressed fluid 370 after passing through the first heat exchanger 382 may be increased to between approximately 1100° F. and 1500° F. (e.g., between approximately 550° C. and 850° C.), such as between approximately 1200° F. and approximately 1400° F. (e.g., between approximately 600° C. and 800° C.). Upon leaving the first heat exchanger 382, the compressed fluid 370 may be a first heated compressed fluid 384.

The first divergent path 294 may then flow the first heated compressed fluid 384 to a second heat exchanger 386, a combustion-based heater 388, or both. That is, in some embodiments, the first heated compressed fluid 384 may be provided to the second heat exchanger 386 but not the combustion-based heater 388 (or any other subsequent heat exchanger or heater), while in other embodiments the first heated compressed fluid 384 may be provided to the combustion-based heater 388 but not the second heat exchanger 386 (or any other heat exchanger or heater). In still further embodiments, the first heated compressed fluid 384 may be provided to both, depending on the temperature of combustion within the combustor section 154, the temperature of combustion within the combustion-based heater 388, or a combination of these and other factors (e.g., a measured temperature of the first heated compressed fluid 384).

In embodiments where the first heated compressed fluid 384 is provided to the second heat exchanger 386, the combustion products 172 produced within the combustor section 154 may further heat the first heated compressed fluid 384. Thus, the second heat exchanger 386 heat-integrates the first divergent path 294 with the combustion products flow path 258. The second heat exchanger 386 may be any suitable type of heat exchanger (e.g., direct or indirect), such as a shell and tube heat exchanger, plate heat exchanger, plate and shell heat exchanger, adiabatic wheel heat exchanger, plate fin heat exchanger, pillow plate heat exchanger, fluid heat exchanger, and the like.

This heat exchange results in a temperature increase of the first heated compressed fluid 384 of at least 1%, such as at least 10% at least 20%, at least 50%, or at least 100%, or between approximately 1% and 100%, between approximately 10% and 80%, between approximately 20% and 60%, or between approximately 30% and 50%. By way of non-limiting example, the temperature of the first heated compressed fluid 384 after passing through the second heat exchanger 386 may be increased to between approximately 1300° F. and 1800° F. (e.g., between approximately 700° C. and 1000° C.), such as between approximately 1500° F. and approximately 1700° F. (e.g., between approximately 850° C. and 950° C.). Upon leaving the second heat exchanger 386, the compressed fluid 370 may be a second heated compressed fluid 390.

In the illustrated embodiment, the second heat exchanger 386 is shown twice, for clarity. In particular, the second heat exchanger 386 is depicted as being positioned along the first divergent path 294, and receives the combustion products 172 as first combustion products (e.g., the combustion products at a first temperature) and outputs the combustion products 172 as second combustion products 392 (e.g., the combustion products 172 at a second temperature). By way of non-limiting example, the temperature of the combustion products 172 provided to the second heat exchanger 386 may be between approximately 2500° F. and 3000° F. (e.g., between approximately 1350° C. and approximately 1650° C.), such as between approximately 2600° F. and 2800° F. (e.g., between approximately 1400° C. and approximately 1550° C.).

The second heat exchanger 386 is also depicted as being positioned along the combustion products flow path 252, where the combustion products 172 enter the second heat exchanger 386 at a first temperature and leave the second heat exchanger 386 at a second temperature as the second combustion products 392. As noted above, the turbine-based service system 14 may utilize the combustion-based heater 388 to heat the first heated compressed fluid 384, in addition to or as an alternative to using the second heat exchanger 386. In still further embodiments, the combustion-based heater 388 may be used to heat the second heated compressed fluid 390. In such embodiments, the combustion-based heater 388 is downstream of the second heat exchanger 386 along the first divergent path 294.

The combustion-based heater 388 may include one or more combustors that are generally smaller than the combustors 160 of the combustor section 154. The combustion-based heater 388, as depicted, utilizes fuel 70 and an oxidant (e.g., ambient air, oxidant within the first heated compressed fluid 384, oxidant from the air blower 378) to heat the first heated compressed fluid 384 and/or the second heated compressed fluid 390, depending upon the particular configuration of the system 14. The heating may be through partial combustion of the first heated compressed fluid 384 and/or the second heated compressed fluid 390 in combination with the fuel 70, or may be an indirect heating where the first heated compressed fluid 384 and/or the second heated compressed fluid 390 is indirectly heated by the heat of combustion within the combustion-based heater 388.

Heating within the combustion-based heater 388 results in a temperature increase of the first heated compressed fluid 384 of at least 1%, such as at least 10% at least 20%, at least 50%, or at least 100%, or between approximately 1% and 100%, between approximately 10% and 80%, between approximately 20% and 60%, or between approximately 30% and 50%. By way of non-limiting example, the temperature of the first heated compressed fluid 384 after passing through combustion-based heater 388, may be increased to between approximately 1300° F. and 1800° F. (e.g., between approximately 700° C. and 1000° C.), such as between approximately 1500° F. and approximately 1700° F. (e.g., between approximately 850° C. and 950° C.). Upon leaving the combustion-based heater 388, the compressed fluid 370 may be a third heated compressed fluid 394. It should be noted that the use of first, second, and third, is used merely to facilitate description of the different temperatures of the compressed fluid 370. Accordingly, the third heated compressed fluid 394 may be generated directly from the compressed fluid 370, from the first heated compressed fluid 384, from the second heated compressed fluid 390, or any combination thereof.

The second heated compressed fluid 390, the third heated compressed fluid 394, or both, may be provided to the oxidant separation unit 282 at a temperature appropriate for oxidant separation. Indeed, in certain embodiments, the oxidant separation unit 282 of FIG. 8 may include an ITM having materials capable of separating oxygen from the remainder of the second heated compressed fluid 390 and/or the third heated compressed fluid 394, even at temperatures that are lower than those traditionally used for ITM separation. For instance, the ITM of the oxidant separation unit 282 may include advanced membrane materials that are capable of, or other ionizing features that enable the membranes to be capable of, separating oxygen from the remainder of the second heated compressed fluid 390 and/or the third heated compressed fluid 394 at temperatures between approximately 1000° F. and 1700° F. (e.g., between approximately 500° C. and approximately 950° C.), such as between approximately 1550° F. and 1650° F. (e.g., between approximately 800° C. and approximately 900° C.).

As illustrated, the oxidant separation unit 282 outputs the separated oxidant 274 along the separated oxidant flow path 280, which leads to the first heat exchanger 382 to generate the product oxidant 276 (which may be used as an export gas or in another process). As noted above, the separated oxidant 274 may have a temperature sufficient to impart thermal energy to the compressed fluid 370 at the first heat exchanger 382 to generate the first heated compressed fluid 384. The oxidant separation unit 282 also outputs the vitiated stream 295, which may have levels of oxidant lower than approximately 0.5% by volume.

The control system 100 may monitor various parameters of the vitiated stream 295, as noted above, in controlling the first valve 380. The control system 100 may also control a flow of the vitiated stream 295 to the EG supply system 78 and to the combustor section 154 using a second valve 398. Any split of the vitiated stream 295 between the EG supply system 78 and the combustor section 154 is presently contemplated. In this way, the split may be between fully open to the EG supply system 78 (i.e., all of the vitiated stream 295 goes to the EG supply system 78) and fully open to the combustor section 154 (i.e., all of the vitiated stream 295 goes to the combustor section 154). In some embodiments, the split may be between approximately 30% and 50% to the EG supply system 78 and between approximately 70% and 50% to the combustor section 154. The amount of the vitiated stream 295, which may be at a temperature of between approximately 1500° F. and 1700° F. (e.g., between approximately 850° C. and 950° C.), provided to the combustor section 154 may also be determined based on a desired amount of diluent within the combustors 160 of the combustor section 154. Indeed, because the vitiated stream 295 will contain substantially no oxidant or fuel, the vitiated stream 295, at the point of provision to the combustor section 154 (or prior to combination with the compressed fluid 370 along the second divergent path 296) acts as a combustion diluent that at least partially controls the heat release and/or emissions (e.g., NOx emissions) generated by the combustor section 154.

FIG. 9 illustrates an embodiment of the turbine-based service system 14 where the compressed fluid flow path 252 is heat-integrated with the exhaust gas recirculation path 110. As discussed above, the exhaust gas recirculation path 110 includes an EG processing system 54 having, among other things, various coolers, heat exchangers, and heat recovery devices that may reduce the temperature of the exhaust gas 60 before it reaches the compressor section 152. Accordingly, the exhaust gas recirculation path 110 may be heat-integrated with the compressed fluid flow path 252 upstream of the EG processing system 54, or upstream of any features that may reduce the temperature of the exhaust gas 60 by more than a predetermined amount, such as by more than 10%.

Specifically, the embodiment of the system 14 of FIG. 9 includes the first heat exchanger 382, which is discussed in detail above. The first heat exchanger 382 is depicted as positioned along the compressed fluid flow path 252 and upstream of the oxidant separation unit 282. As discussed above with respect to FIG. 8, because the separated oxidant 274 will generally have a higher temperature compared to the compressed exhaust gas 170, the first heat exchanger 382 effects the transfer of heat from the separated oxidant 274 to the compressed exhaust gas 170. By way of non-limiting example, the compressed exhaust gas 170 may exit the heat exchanger as a first heated compressed exhaust gas 400. As discussed above, the heating in the first heat exchanger 382 may result in a temperature increase of the compressed exhaust gas 170 of at least 1%, such as at least 10% at least 20%, at least 50%, or at least 100%, or between approximately 1% and 100%, between approximately 10% and 80%, between approximately 20% and 60%, or between approximately 30% and 50%. By way of non-limiting example, the temperature of the compressed exhaust gas 170 after passing through the first heat exchanger 382 may be increased to between approximately 1100° F. and 1500° F. (e.g., between approximately 550° C. and 850° C.), such as between approximately 1200° F. and approximately 1400° F. (e.g., between approximately 600° C. and 800° C.).

The first heated compressed exhaust gas 400 is then provided along the compressed fluid flow path 252 (e.g., an exhaust flow path) to a second heat exchanger 402, which heat integrates the exhaust recirculation path 110 with the compressed fluid path 252 (i.e., heat integrates the exhaust recirculation path 110 with the exhaust gas flow path, which may be considered as an exhaust gas diluent flow path). In the illustrated embodiment, the exhaust recirculation path 110 is heat-integrated with the compressed fluid path 252 by the second heat exchanger 402 upstream of the EG processing system 54, which includes the HRSG 56, as well as coolers, condensers, etc., which may cause the exhaust gas 60 to be cooled. Thus, rather than losing the thermal energy carried by the exhaust gas 60 to a cooling medium (e.g., boiler feedwater), this thermal energy is transferred to the first heated and compressed exhaust gas 400 to enable it to be worked upon at a desired temperature at the separation unit 282.

By way of non-limiting example, the second heat exchanger 402 may be any suitable type of heat exchanger (e.g., direct or indirect), such as a shell and tube heat exchanger, plate heat exchanger, plate and shell heat exchanger, adiabatic wheel heat exchanger, plate fin heat exchanger, pillow plate heat exchanger, fluid heat exchanger, and the like. Heat exchange within the second heat exchanger 402 results in a temperature increase of the first heated and compressed exhaust gas 400 of at least 1%, such as at least 10% at least 20%, at least 50%, or at least 100%, or between approximately 1% and 100%, between approximately 10% and 80%, between approximately 20% and 60%, or between approximately 30% and 50%. By way of non-limiting example, the temperature of the first heated and compressed exhaust gas 400, after passing through the second heat exchanger 402, may be increased to between approximately 1300° F. and 1800° F. (e.g., between approximately 700° C. and 1000° C.), such as between approximately 1500° F. and approximately 1700° F. (e.g., between approximately 850° C. and 950° C.). Upon leaving the second heat exchanger 402, the first heated and compressed exhaust gas 400 may be a second heated and compressed exhaust gas 404.

It should be noted that there may be additional heating units supplied along the compressed fluid flow path 252 so as to enable the compressed exhaust gas 170 to be heated to a temperature suitable for provision and oxidant separation within the oxidant separation unit 282. For example, a combustion-based heater similar to the combustion-based heater 388 of FIG. 8 may be provided for this purpose, and may be positioned at any point along the path 252, such as upstream of the first heat exchanger 382, between the first heat exchanger 382 and the second heat exchanger 402, downstream of the second heat exchanger 402, or the like. Furthermore, various flow control and pressure control devices may be positioned along the flow path as appropriate.

The second heated and compressed exhaust gas 404 is then provided along the compressed fluid flow path 252 to the separation unit 282, which generates the separated oxidant 274 and the vitiated stream 295 therefrom. As noted above with respect to FIG. 8, the flow of the vitiated stream 295 may be controlled by the control system 100 based on measurements from the sensor 385 (which is intended to represent one or more sensors). Specifically, the control system 100 may control a flow of the vitiated stream 295 to the EG supply system 78 and to the combustor section 154 using the second valve 398, where any split of the vitiated stream 295 between the EG supply system 78 and the combustor section 154 is presently contemplated.

As also depicted, the oxidant separation unit 282 generates the stream of separated oxidant 274, which is provided to the first heat exchanger 382. Subsequent to heat exchange therein, a resulting cooled separated oxidant 406 may be provided via a first path 408 for use as the product oxidant 276, to a second path 410 for use in combination with the oxidant 68 generated by the oxidant compression system 186, or a combination thereof. Specifically, the control system 100 may adjust an amount of the separated oxidant provided to the first and second paths 408, 410 using a third valve 412, which in one embodiment may be a three-way valve.

The control system 100 may control the flows through the paths 408, 410 based on any number of parameters or inputs, for example based on feedback obtained from first and second oxidant sensors 414, 416 positioned along the second path 410 and a compressed oxidant supply path 418, respectively. As depicted, the compressed oxidant supply path 418 extends between the oxidant compression system 186 and the combustor section 154, and the second path 410 joins the compressed oxidant supply path 418 upstream of the combustor section 154. In this way, the separated oxidant 274 (or the cooled separated oxidant 406) flowing along the second path 410 supplements the oxidant 68 generated by the oxidant compression system 186.

The sensors 414, 416 may be any appropriate type of sensor capable of monitoring flow, pressure, temperature, oxidant concentration, gas composition, and so forth. The control system 100 may execute one or more control algorithms (e.g., based on instructions stored on a non-transitory storage medium) that uses these monitored parameters to determine whether and how much to supplement the flow of the oxidant 68 generated by the oxidant compression system 186 with the oxidant flowing along the second path 410.

By way of non-limiting example, the split may be between fully open to the second path 410 (i.e., all of the cooled separated oxidant stream 406 goes to the combustor section 154) and fully open to the first path 408 (i.e., all of the cooled separated oxidant stream 406 leaves as the product oxidant 276). In some embodiments, the split may be between approximately 30% and 50% to the second path 410 and between approximately 70% and 50% to the first path 408.

As set forth above, the separated oxidant 274 generated by the oxidant separation units 282/oxidant separation systems 250 of the present disclosure may be provided to any one or a combination of different portions of the oxidant compression system 186. FIG. 10 depicts an example embodiment of the turbine-based service system 14 where one or more of the oxidant separation systems 250 provides streams of separated oxidant 274 to one or more portions of the oxidant compression system 186.

In the illustrated embodiment, the SEGR GT system 52, which may or may not be operated under stoichiometric conditions as discussed above, may include the one or more oxidant separation systems 250 in accordance with any of the embodiments discussed above with respect to FIGS. 5-9. The oxidant separation systems 250, again, may include various features for monitoring the separated oxidant 274, adjusting a temperature, pressure, and/or composition of the separated oxidant 274, and so on.

The oxidant separation system(s) 250 are depicted as providing a first stream of separated oxidant 420 to a main oxidant compressor (MOC) 422 of the oxidant compression system 186. The first stream of separated oxidant 420 may be provided to any one or a combination of compression stages, such as at an inlet 424 of the MOC 422 (e.g., before any compression stages), between compression stages of the MOC 422, or any combination thereof. The first stream of separated oxidant 420 may be at a temperature and pressure suitable for use within the MOC 422, and may be provided to a particular section of the MOC 422 depending on its temperature, pressure, composition, or any combination thereof. Generally, the MOC 422 may include any suitable type of oxidant compressor, such as an axial compressor, radial compressor, centrifugal compressor, or any combinations thereof. Indeed, the MOC 422 of FIG. 10 is intended to denote one or more oxidant compressors having one or more compressor casings, where the first stream of separated oxidant 420 (or multiple such streams) may be provided to any one or a combination of these compressors, at any one or a combination of compression stages.

Additionally or alternatively, the oxidant separation system(s) 250 may provide a second stream of separated oxidant 426 to a first compressed oxidant pathway 428 that flows compressed oxidant from the MOC 422 to an intercooler 430. Again, the oxidant separation system(s) 250 may adjust the temperature, pressure, and/or composition of the second stream of separated oxidant 426 to a level suitable for combination with the compressed oxidant generated by the MOC 422.

Generally, the intercooler 430 may be any type of intercooler suitable for use within the oxidant compression system 186. By way of example, the intercooler 430 may be a spray intercooler, an indirect heat exchanger, or any other suitable cooling device. The intercooler 430 may use a coolant 432 to reduce a temperature of the compressed oxidant generated by the MOC 422, or the combination of the compressed oxidant generated by the MOC 422 and the second stream of separated oxidant 426. Further, in one embodiment, the intercooler 430 may, in addition to or in lieu of using the coolant 432, may mix the compressed oxidant generated by the MOC 422 and the second stream of separated oxidant 426 so as to cool the compressed oxidant generated by the MOC 422 to a temperature suitable for provision to other downstream components.

Additionally or alternatively, the oxidant separation system(s) 250 may provide a third stream of separated oxidant 434 to a second compressed oxidant path 436 positioned between the intercooler 430 and a booster oxidant compressor (BOC) 438. This particular configuration may be desirable so as to reduce or altogether eliminate additional componentry that may otherwise be used in order to adjust a pressure and temperature of the third stream of separated oxidant 434 to a level suitable for provision to the SEGR GT system 52, such as the combustor section 154 (FIGS. 3-9).

For example, by providing the third stream of separated oxidant 434 to the second compressed oxidant path 436, reliance on the booster compressor 334 and/or the heat exchanger 332 may be reduced or altogether eliminated. That is, the cooled compressed oxidant exiting the intercooler 430 may effectively cool (or heat) the third stream of separated oxidant 434 by mixing, and the BOC 438 may then increase a pressure of the third stream of separated oxidant 434 (now combined with the compressed oxidant exiting the intercooler 430) to a desirable amount.

In a further embodiment, the oxidant separation system(s) 250 may provide a fourth stream of separated oxidant 440 to a third compressed oxidant pathway 442 that flows compressed oxidant from the BOC 438 to the SEGR GT system 52. Again, the oxidant separation system(s) 250 may adjust the temperature, pressure, and/or composition of the fourth stream of separated oxidant 440 to a level suitable for combination with the compressed oxidant generated by the BOC 438.

Any one or a combination of the first, second, third, and fourth separated oxidant streams 420, 426, 434, and 440 may be utilized, depending on the particular requirements of the oxidant compression system 186, the SEGR GT system 52, the combustor section 154, or any combination thereof. Furthermore, any one or a combination of the first, second, third, and fourth separated oxidant streams 420, 426, 434, and 440 may be utilized depending on various monitored parameters associated with these streams, such as their respective temperatures, pressures, flow rates, etc. The control system 100 may, in certain embodiments, control the flow of separated oxidant 274 along any one or a combination of these streams 420, 426, 434, and 440 depending on whether the monitored parameters associated with them are suitable for combination with the oxidant flow paths of the oxidant compression system 186.

Additional Description

As set forth above, the present embodiments provide systems and methods for using oxidant separation systems to control the amount of oxidant present within the combustion products produced by a gas turbine engine. It should be noted that any one or a combination of the features described above may be utilized in any suitable combination. Indeed, all permutations of such combinations are presently contemplated. By way of example, the following clauses are offered as further description of the present disclosure:

Embodiment 1

A system, comprising: a gas turbine system, comprising: a turbine driven by combustion products produced by a turbine combustion system; and a separation unit positioned between turbine stages of the turbine, wherein the separation unit separates oxygen out of the combustion products.

Embodiment 2

The system of embodiment 1, wherein the separation unit comprises an ion transport membrane.

Embodiment 3

The system of embodiments 1 or 2, wherein the ion transport membrane is only permeable to oxygen.

Embodiment 4

The system of any preceding embodiment, wherein the separation unit comprises a ceramic membrane.

Embodiment 5

The system of any preceding embodiment, wherein the turbine comprises an inlet side and an outlet side where the turbine receives the combustion products and outputs an exhaust gas, respectively, and the separation unit is positioned between a first stage positioned closest to the inlet side and a second stage positioned immediately downstream from the first stage.

Embodiment 6

The system of any preceding embodiment, wherein the turbine comprises first and second housings, wherein the first housing comprises at least a first turbine stage and the second housing comprises at least a second turbine stage, wherein the separation unit is positioned between the first and second housings.

Embodiment 7

The system of any preceding embodiment, wherein the turbine combustion system is configured to combust a fuel/oxidant mixture at a combustion equivalence ratio of less than 0.95 such that the combustion products produced by the turbine combustion system comprise unused oxidant.

Embodiment 8

The system of any preceding embodiment, wherein the combustion equivalence ratio is between approximately 0.6 and 0.9.

Embodiment 9

The system of any preceding embodiment, wherein the turbine combustion system is configured to combust a fuel/oxidant mixture in the presence of an exhaust gas diluent.

Embodiment 10

The system of any preceding embodiment, comprising an exhaust gas compressor configured to supply the exhaust gas diluent by compressing an exhaust gas.

Embodiment 11

The system of any preceding embodiment, comprising an exhaust gas recirculation system configured to recirculate the exhaust gas along an exhaust gas recirculation path extending from an outlet of the turbine to an exhaust gas intake of the exhaust gas compressor.

Embodiment 12

The system of any preceding embodiment, wherein the separation unit comprises an oxygen outlet configured to flow the oxygen separated out of the combustion products.

Embodiment 13

The system of any preceding embodiment, comprising a separated oxygen path extending between the oxygen outlet and a compressed oxidant flow path, wherein the compressed oxidant flow path extends between a main oxidant compressor and a compressed oxidant inlet of the turbine combustion system.

Embodiment 14

The system of any preceding embodiment, comprising a flow path having a first portion extending from a first turbine stage of the turbine to the separation unit, a second portion extending through the separation unit, and a third portion extending from the separation unit to a second turbine stage of the turbine.

Embodiment 15

The system of any preceding embodiment, comprising a bypass loop extending from the first portion of the flow path, around the second portion of the flow path, and to the third portion of the flow path.

Embodiment 16

The system of any preceding embodiment, comprising a flow control unit disposed along the bypass loop and configured to adjust a flow of the combustion products, and one or more sensors positioned along the third portion of the combustion product flow path.

Embodiment 17

The system of any preceding embodiment, comprising a control system having one or more tangible, non-transitory, machine-readable media collectively storing instructions that, when executed by a processor, are configured to: receive feedback from the one or more sensors, wherein the feedback is indicative of a fuel concentration of the combustion products, an oxidant concentration of the combustion products, or a combination thereof; and adjust the flow control unit based on the feedback to control a first amount of the combustion products flowing to the separation unit versus a second amount of the combustion products flowing through the bypass loop.

Embodiment 18

A system, comprising: a gas turbine system, comprising: a turbine combustion system comprising one or more turbine combustors configured to combust a fuel/oxidant mixture in the presence of an exhaust gas diluent to generate combustion products; a turbine driven by the combustion products; a flow path extending from the turbine combustion system and through the turbine; and a separation unit positioned along the flow path, wherein the separation unit separates oxygen out of the combustion products.

Embodiment 19

The system of embodiment 18, wherein the separation unit is positioned between the turbine combustion system and the turbine, or between turbine stages of the turbine, wherein the separation unit comprises a membrane that is only permeable to oxygen.

Embodiment 20

The system of embodiments 18 or 19, wherein at least one of the one or more turbine combustors are configured to combust the fuel/oxidant mixture at a combustion equivalence ratio of less than 0.95 fuel to oxidant such that the combustion products comprise unused oxidant.

Embodiment 21

The system of any preceding embodiment, comprising: an exhaust gas compressor configured to generate the exhaust gas diluent by compressing an exhaust gas; and an exhaust gas recirculation system configured to recirculate the exhaust gas along an exhaust gas recirculation path extending from an outlet of the turbine to an exhaust gas intake of the exhaust gas compressor.

Embodiment 22

The system of any preceding embodiment, comprising a catalyst unit disposed along the exhaust recirculation path, wherein the catalyst unit is configured to reduce a concentration of oxygen in the exhaust gas exiting the turbine.

Embodiment 23

The system of any preceding embodiment, wherein the separation unit comprises an oxygen outlet configured to flow the oxygen separated out of the combustion products.

Embodiment 24

The system of any preceding embodiment, comprising a separated oxygen path extending between the oxygen outlet and a compressed oxidant flow path, wherein the oxidant flow path extends between a main oxidant compressor and a compressed oxidant inlet of the turbine combustion system.

Embodiment 25

A system, comprising: a gas turbine system, comprising: a turbine combustion system comprising one or more turbine combustors configured to combust a fuel/oxidant mixture in the presence of an exhaust gas diluent to generate combustion products; a turbine driven by the combustion products; an exhaust gas compressor driven by the turbine, wherein the exhaust gas compressor is configured to compress a recirculated exhaust gas recirculated from an outlet of the turbine to generate the exhaust gas diluent; an exhaust gas flow path extending from the exhaust gas compressor to the turbine combustion system; and a separation unit positioned along the exhaust gas diluent flow path, wherein the separation unit comprises a membrane that separates oxygen out of the exhaust gas diluent.

Embodiment 26

The system of embodiment 25, comprising a separated oxygen flow path extending from the separation unit configured to flow the separated oxygen.

Embodiment 27

The system of embodiments 25 or 26, comprising a heat exchanger positioned along the exhaust gas flow path and heat-integrating the exhaust flow path with the separated oxygen flow path.

Embodiment 28

The system of any preceding embodiment, comprising a combustion product flow path extending from the turbine combustion system and through the turbine, wherein the exhaust flow path and the combustion product flow path are in a heat exchange relationship with one another.

Embodiment 29

The system of any preceding embodiment, comprising a heater positioned along the exhaust gas flow path and upstream of the separation unit, wherein the heater is configured to pre-heat the exhaust gas diluent to a temperature sufficient for oxygen separation at the separation unit.

Embodiment 30

The system of any preceding embodiment, comprising an exhaust gas recirculation path configured to recirculate exhaust gas generated from the combustion products in the turbine to an inlet of the exhaust gas compressor, wherein the exhaust recirculation path and the exhaust gas flow path are in a heat exchange relationship with one another.

Embodiment 31

A system, comprising: a gas turbine system, comprising: a turbine combustion system that combusts a fuel-oxidant mixture in the presence of an exhaust gas to produce combustion products; a turbine driven by the combustion products received along a combustion products path extending from the turbine combustion system to the turbine; a compressor that compresses a recirculated exhaust gas received from a recirculation path to supply the exhaust gas to the turbine combustion system along a compressed exhaust gas path, wherein the recirculation path extends from the turbine to the compressor and the compressed exhaust gas path extends from the compressor to the combustor; and a separation unit positioned along a path of the turbine, along the combustion products path, along the recirculation path, along the compressed exhaust gas path, or any combination thereof, wherein the separation unit selectively removes oxygen from a fluid flowing along the respective path.

Embodiment 32

A method, comprising: in a gas turbine system: combusting a fuel-oxidant mixture in a combustor of a turbine combustion system in the presence of an exhaust gas to produce combustion products having oxygen; driving a turbine using the combustion products received along a combustion products path extending from the turbine combustion system to the turbine; compressing a recirculated exhaust gas using a compressor, wherein the recirculated exhaust gas is received from a recirculation path extending from the turbine to the compressor; supplying the compressed exhaust gas to the turbine combustion system along a compressed exhaust gas path extending from the compressor to the combustor; and separating oxygen out of the recirculation path, out of the compressed exhaust gas path, or any combination thereof, using a separation unit that selectively removes oxygen from a fluid flowing along the respective path.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:
1. A system, comprising:
a gas turbine system, comprising:
  a turbine comprising first and second turbine stages driven by combustion products produced by a turbine combustion system;
  a separation unit positioned between the first and second turbine stages of the turbine, wherein the combustion products comprise oxygen when produced by the turbine combustion system, and the separation unit separates the oxygen out of the combustion products, wherein the separation unit comprises an oxygen outlet configured to flow the oxygen separated out of the combustion products;
  a flow path having a first portion extending from the first turbine stage of the turbine to the separation unit, a second portion extending through the separation unit, a third portion extending from the separation unit to the second turbine stage of the turbine, and a bypass loop, wherein the bypass loop extends from the first portion of the flow path to the third portion of the flow path and around the second portion of the flow path; and
  a separated oxygen path extending between the oxygen outlet of the separation unit and a location along a compressed oxidant flow path, wherein the location is downstream of a main oxidant compressor and upstream of a turbine combustor of the turbine combustion system relative to a flow through the main oxidant compressor.

2. The system of claim 1, wherein the separation unit comprises an ion transport membrane.

3. The system of claim 2, wherein the ion transport membrane is only permeable to the oxygen within the combustion products.

4. The system of claim 1, wherein the separation unit comprises a ceramic membrane.

5. The system of claim 1, wherein the turbine comprises an inlet side and an outlet side where the turbine receives the combustion products and outputs an exhaust gas, respectively, and the first stage is positioned closest to the inlet side and the second stage positioned immediately downstream from the first stage.

6. The system of claim 1, wherein the turbine comprises first and second housings, wherein the first housing comprises at least the first turbine stage and the second housing comprises at least the second turbine stage, wherein the separation unit is positioned between the first and second housings.

7. The system of claim 1, wherein the turbine combustion system is configured to combust a fuel/oxidant mixture at a combustion equivalence ratio of less than approximately 0.95 such that the combustion products produced by the turbine combustion system comprise unused oxidant.

8. The system of claim 7, wherein the combustion equivalence ratio is between approximately 0.6 and 0.9.

9. The system of claim 1, comprising:
an exhaust gas compressor configured to supply an exhaust gas diluent to the turbine combustion system by compressing an exhaust gas, and the turbine combustion system is configured to combust a fuel/oxidant mixture in the presence of the exhaust gas diluent; and
an exhaust gas recirculation system configured to recirculate the exhaust gas along an exhaust gas recirculation path extending from an outlet of the turbine to an exhaust gas intake of an exhaust gas compressor.

10. The system of claim 9, wherein the exhaust gas recirculation system comprises a catalyst unit disposed along the exhaust recirculation path, wherein the catalyst unit is configured to reduce a concentration of oxygen in the recirculated exhaust gas.

11. The system of claim 1, comprising:
a flow control unit disposed along the bypass loop and configured to adjust a flow of the combustion products, and one or more sensors positioned along the third portion of the combustion product flow path; and a control system having one or more tangible, non-transitory, machine-readable media collectively storing instructions that, when executed by a processor, are configured to:
  receive feedback from the one or more sensors, wherein the feedback is indicative of a fuel concentration of the combustion products, an oxidant concentration of the combustion products, or a combination thereof; and
  adjust the flow control unit based on the feedback to control a first amount of the combustion products flowing to the separation unit versus a second amount of the combustion products flowing through the bypass loop.

12. A system, comprising: a gas turbine system, comprising:
  an oxidant compression system configured to supply an oxidant;
  a turbine combustion system comprising one or more turbine combustors configured to combust a fuel/oxidant mixture in the presence of an exhaust gas diluent to generate combustion products comprising oxygen;
  a turbine driven by the combustion products;
  a flow path extending from the turbine combustion system and through the turbine;
  a separation unit positioned along the flow path downstream of one or more stages of the turbine, wherein the separation unit separates the oxygen out of the combustion products, wherein the separation unit comprises an oxygen outlet configured to flow the oxygen separated out of the combustion products;
  a separated oxygen path extending between the oxygen outlet of the separation unit and a location along a compressed oxidant flow path, wherein the location is downstream of a main oxidant compressor and upstream of the one or more turbine combustors of the turbine combustion system relative to a flow through the main oxidant compressor; and
  an exhaust gas compressor positioned along the flow path downstream of the turbine, wherein the exhaust gas compressor is configured to generate the exhaust gas diluent by compressing the combustion products; and
  wherein the flow path comprises a first portion extending from a first turbine stage of the turbine to the separation unit, a second portion extending through the separation unit, a third portion extending from the separation unit to a second turbine stage of the turbine, and a bypass loop, wherein the bypass loop extends from the first portion of the flow path to the third portion of the flow path and around the second portion of the flow path.

13. The system of claim 12, wherein the separation unit is positioned between turbine stages of the turbine, and the separation unit comprises a membrane that is only permeable to oxygen.

14. The system of claim 13, comprising:
  a flow control unit disposed along the bypass loop and configured to adjust a flow of the combustion products along the bypass loop;
  one or more sensor positioned along the third portion of the flow path; and
  a control system configured to receive feedback from the one or more sensors; and to adjust the flow control unit based on the feedback to control the flow of the combustion products along the bypass loop.

15. The system of claim 12, wherein at least one of the one or more turbine combustors are configured to combust the fuel/oxidant mixture at a combustion equivalence ratio of less than 0.95 fuel to oxidant such that the combustion products comprise unused oxidant.

16. The system of claim 12, comprising:
  an exhaust gas recirculation system configured to recirculate the exhaust gas along an exhaust gas recirculation path extending from an outlet of the turbine to an exhaust gas intake of the exhaust gas compressor; and
  a catalyst unit disposed along the exhaust recirculation path, wherein the catalyst unit is configured to reduce a concentration of oxygen in the exhaust gas exiting the turbine.

17. A system, comprising:
  a gas turbine system, comprising:
    a turbine comprising first and second turbine stages driven by combustion products produced by a turbine combustion system;
    a separation unit positioned between the first and second turbine stages of the turbine, wherein the combustion products comprise oxygen when produced by the turbine combustion system, and the separation unit separates the oxygen out of the combustion products, wherein the separation unit comprises an oxygen outlet configured to flow the oxygen separated out of the combustion products;
    a separated oxygen path extending between the oxygen outlet of the separation unit and a location along a compressed oxidant flow path, wherein the location is downstream of a main oxidant compressor and upstream of a turbine combustor of the turbine combustion system relative to a flow through the main oxidant compressor; and
    a booster compressor disposed on the separated oxygen path, wherein the booster compressor is configured to compress the flow of the oxygen separated out of the combustion products between the oxygen outlet of the separation unit and the location along the compressed oxidant flow path; and
    a flow path having a first portion extending from the first turbine stage of the turbine to the separation unit, a second portion extending through the separation unit, a third portion extending from the separation unit to the second turbine stage of the turbine, and a bypass loop, wherein the bypass loop extends from the first portion of the flow path to the third portion of the flow path and around the second portion of the flow path.

* * * * *